(12) United States Patent
Levine

(10) Patent No.: US 11,187,217 B2
(45) Date of Patent: *Nov. 30, 2021

(54) METHOD AND SYSTEM FOR METERING FLUID FLOW FROM A FLUID SOURCE BASED ON A COUNT OF PUMP STROKES

(71) Applicant: FIZE RESEARCH LTD, Modiin (IL)

(72) Inventor: Noam Levine, Modiin (IL)

(73) Assignee: FIZE RESEARCH LTD., Modiin (IL)

( * ) Notice: Subject to any disclaimer, the term of this patent is extended or adjusted under 35 U.S.C. 154(b) by 200 days.

This patent is subject to a terminal disclaimer.

(21) Appl. No.: 16/252,878

(22) Filed: Jan. 21, 2019

(65) Prior Publication Data

US 2020/0003202 A1 Jan. 2, 2020

Related U.S. Application Data

(63) Continuation of application No. 13/574,997, filed as application No. PCT/IB2012/050067 on Jan. 5, 2012, now Pat. No. 10,240,590.

(Continued)

(51) Int. Cl.
| | |
|---|---|
| *F04B 23/02* | (2006.01) |
| *F04B 19/22* | (2006.01) |
| *F04B 41/02* | (2006.01) |
| *F04B 49/06* | (2006.01) |
| *F04B 13/00* | (2006.01) |

(Continued)

(52) U.S. Cl.
CPC .............. *F04B 23/02* (2013.01); *F04B 13/00* (2013.01); *F04B 19/22* (2013.01); *F04B 23/025* (2013.01); *F04B 41/02* (2013.01); *F04B 43/0009* (2013.01); *F04B 43/12* (2013.01); *F04B 49/065* (2013.01); *F04B 49/106* (2013.01); *F04B 49/12* (2013.01); *G01F 3/16* (2013.01); *G01F 15/005* (2013.01); *G01F 23/603* (2013.01); *F04B 1/34* (2013.01); *F04B 17/044* (2013.01); *F04B 43/08* (2013.01); *Y10T 137/85978* (2015.04)

(58) Field of Classification Search
CPC ... F04B 43/0009; F04B 23/023; G01F 23/603
See application file for complete search history.

(56) References Cited

U.S. PATENT DOCUMENTS 3,126,740 A * 3/1964 Blakeman ................. G01F 3/16
73/251
4,321,953 A * 3/1982 Grothoff ................ A61M 11/02
141/2

(Continued)

*Primary Examiner* — Nathan C Zollinger
*Assistant Examiner* — Timothy P Solak
(74) *Attorney, Agent, or Firm* — Kligler & Associates Patent Attorneys Ltd

(57) ABSTRACT

Disclosed are a method, device and system for a fluid flow meter. According to some embodiments of the present invention, a fluid flow meter that has a fluid pump to displace fluid with one or more pumping strokes of one or more pumping stroke types wherein each of the stroke types displaces a known volume of fluid from a fluid reservoir. A sensor functionally associated with the fluid reservoir and adapted to generate a signal indicative of a fluid pumping condition within the fluid reservoir, and circuitry to trigger one or a sequence of strokes of the pump in response to a signal from the sensor that the triggering condition within the fluid reservoir has been met.

13 Claims, 37 Drawing Sheets

Related U.S. Application Data

(60) Provisional application No. 61/429,897, filed on Jan. 5, 2011.

(51) Int. Cl.
*G01F 23/60* (2006.01)
*G01F 3/16* (2006.01)
*G01F 15/00* (2006.01)
*F04B 43/12* (2006.01)
*F04B 49/10* (2006.01)
*F04B 43/00* (2006.01)
*F04B 49/12* (2006.01)
*F04B 17/04* (2006.01)
*F04B 43/08* (2006.01)
*F04B 1/34* (2006.01)

(56) References Cited

U.S. PATENT DOCUMENTS

| | | | | |
|---|---|---|---|---|
| 5,563,584 | A * | 10/1996 | Rader | A61M 5/1684 128/DIG. 13 |
| 6,478,189 | B1 * | 11/2002 | Mooney | B01F 5/0498 222/1 |
| 10,240,590 | B2 * | 3/2019 | Levine | F04B 49/065 |
| 2001/0023710 | A1 * | 9/2001 | Tung Kong | B64G 1/402 137/572 |
| 2004/0252146 | A1 * | 12/2004 | Naka | B41J 2/17566 347/6 |

* cited by examiner

METHOD AND SYSTEM FOR METERING FLUID FLOW FROM A FLUID SOURCE BASED ON A COUNT OF PUMP STROKES

FIELD OF THE INVENTION

The present invention relates to the field of fluid flow metering. More specifically, the present invention relates to systems, apparatuses, devices and methods that may enable and facilitate the measuring of fluid flow, based on the displacement of known fluid amounts.

BACKGROUND OF THE INVENTION

In many cases it is required to measure the flow rate and volume of liquids and gasses. In many applications the flow rate may be very low (several ml/h), in other cases the flow rate may be very high (cubic meters per second) and in some cases the flow rate may not be stable and can fluctuate over time. Furthermore, measuring volumetric flow rate of gas introduces a special challenge since gases are compressible and change their volume when placed under pressure or different temperature. A volume of gas under one set of pressure and temperature conditions is not equivalent to the same gas under different conditions.

Applications for accurate fluid flow measurement exist in analysis, such as HPLC (High Performance Liquid Chromatography), in the semiconductor industry such as for precise material dosing, in the medical field such as for accurate drug delivery, in automotive such as for gasoline flow measurement.

However, in some applications there is a need for measuring fluid flow in a very wide dynamic range while maintaining absolute measurement accuracy. For example, measuring the water flow rate at two points along a water line and comparing the readings from both measurements can indicate the existence of a leak in the line. In order to be able to identify very small leaks, the flow meter is supposed to have absolute accuracy at the entire measuring range of the meter. If the accuracy of the flow meter would be a relative accuracy (a percentage of the flow), then at low flow rates small leaks could be identified, but at high flow rates only large leaks will be identifiable. For instance, if the accuracy of the flow meter is 0.1%, then at flow rates of 1 Liter/minute a leak of 1 ml/minute can be identified, but at a flow rate of 1,000 Liter/minute only leaks as large as 1 Liter/minute will be identified.

Accordingly, there is a need in the field of fluid flow measuring for flow measuring systems, apparatuses, devices and methods that may enable and facilitate the measuring of fluid flow, based on the displacement of known fluid amounts; and may allow for the flow of liquids and/or gases to be metered under various conditions and for various applications, while providing substantially accurate flow estimation, possibly with absolute accuracy (i.e. accuracy that is not dependent on the flowing fluid amount).

SUMMARY OF THE INVENTION

The present invention is a fluid flow meter. According to some embodiments of the present invention, a fluid flow meter may comprise (1) a pump adapted to pump a substantially near fixed amount (e.g. volume) of fluid per pumping cycle, which pumping cycle may include a set of pumping strokes, not all of which strokes may be of the same volume; (2) optionally a fluid collection reservoir which may include an inlet and an outlet, or may alternatively include an inlet/outlet, any of which may be connected to the pump directly or through a fluid conduit, (3) at least one sensor which may be functionally associated with the fluid collection reservoir and/or with the pump; and (4) a control circuit/logic (controller) that may be adapted to trigger one or more pumping cycles, or a partial pumping cycle, in response to a signal from the at least one sensor. The signal of the at least one sensor may indicate a fluid amount (e.g. level or threshold) collected in the reservoir or in the pump. The controller may include estimating logic circuitry (e.g. dedicated counters and/or code running on a processor) for estimating the amount/volume of fluid pumped through the pump, wherein the estimation may be at least partially based on a count of pumping cycles and/or pumping strokes. The estimated pumped volume may be calculated by multiplying the known/substantially-near-fixed volume per given stroke and/or cycle with the number of given strokes and/or cycles, and by summing the multiplied values. Clock circuitry functionally associated with the estimating logic may facilitate a flow rate estimation, wherein the flow rate may be measured/estimated by determining the amount of fluid pumped (provided by counting pump cycles or strokes) over a given period of time (indicated by the clock circuitry).

According to embodiments, the controller may include non-volatile memory (NVM) for storing: (1) operational parameters, (2) operational logs, and (3) calibration data indicative of one or more physical characteristics of the: (a) pump, (b) reservoir, (c) sensor and/or (d) conduit. According to further embodiments calibration data for any given physical characteristic of any flow meter component (e.g. volume per given stroke and/or given cycle of the pump) may be a single value or a set of values indicating the given physical characteristic across any one or more of a range of: (1) operational durations, (2) operational cycles, (3) environmental conditions. For example, each stroke of a four stroke pump according to embodiments may pump a different amount of fluid, and the amount pumped by each stroke may be stored in the NVM. The NVM may store a single value per stroke (optionally for an entire pumping cycle) or the NVM may store a set of values per given stroke (e.g. second stroke of a pumping cycle), wherein each value may be associated with a different one or set of operational factors such as: (1) operational duration, (2) elapsed/endured operational cycles, (3) environmental conditions (e.g. temp), and (4) any other single or combination of factors which may affect the pumped volume of the given stroke.

BRIEF DESCRIPTION OF THE DRAWINGS

The subject matter regarded as the invention is particularly pointed out and distinctly claimed in the following portion of the description. The invention, however, both as to organization and method of operation, together with objects, features, and advantages thereof, may best be understood by reference to the following description when read with the accompanying drawings in which:

Figure 1:
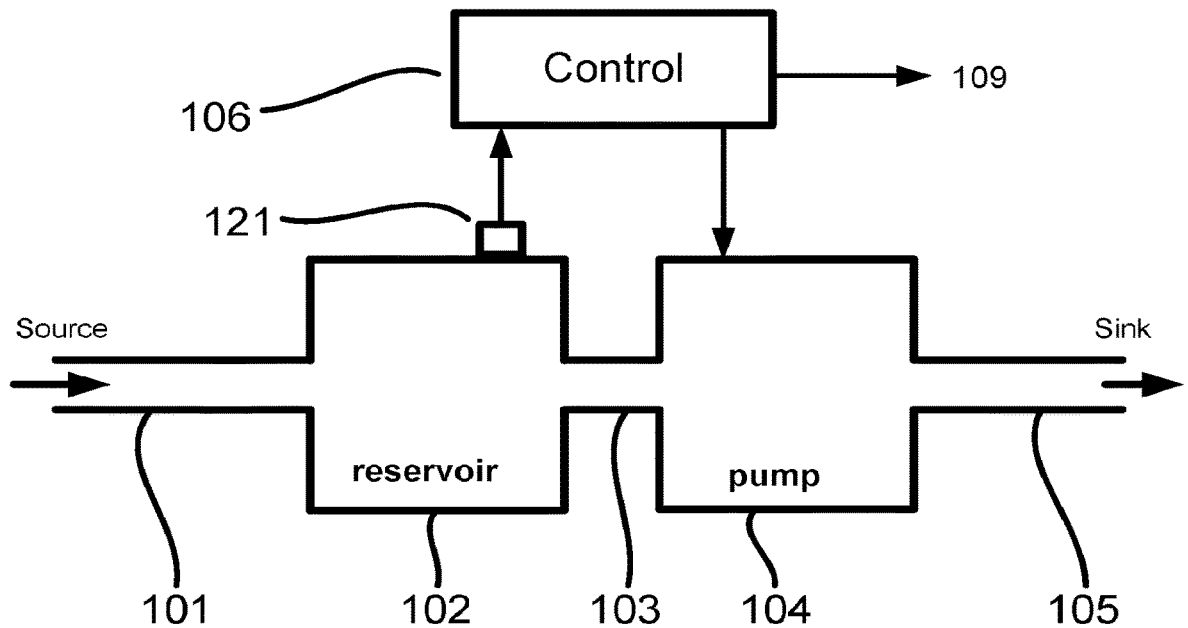
FIG. 1 is a functional block diagram of an exemplary flow meter or flow metering assembly, wherein the pump is downstream from the reservoir and is adapted to pump a known/substantially-near-fixed amount of fluid out of the reservoir per given pumping stroke and/or per given pumping cycle, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well known methods, procedures, and components have not been described in detail so as not to obscure the present invention.

The terms up, ascend or rise, and down or descend, and/or any other corresponding terms, when explained in the different embodiments of the invention and in connection with the figures of this document, refer to the part of the system, apparatus or device, as the case may be, that is closer to the top or bottom of the figure. When the term 'up', 'ascend' or 'rise' is used, the meaning is towards the part of the system, apparatus or device, as the case may be, that is closer to the top of the figure. When the term 'down' or 'descend' is used, the meaning is towards the part of the system, apparatus or device, as the case may be, that is closer to the bottom of the figure. The actual system, apparatus or device may be oriented in any way. If for example it will be physically oriented upside-down from the way it is drawn in the figure, then the term 'up' will physically mean down, while the term 'down' will physically mean up. Upstream means the end from which fluid is coming from. Downstream means the end to which fluid is flowing to. Unless specifically stated otherwise, as apparent from the following discussions, it is appreciated that throughout the specification discussions utilizing terms such as "processing", "computing", "calculating", "determining", or the like, refer to the action and/or processes of a processor, computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such apparatus may be specially constructed for the desired purposes, or it may comprise a general-purpose processor or computer selectively activated or reconfigured by a computer program stored in the computer or in associated memory. Such a computer program may be stored in a computer readable storage medium, such as, but not limited to, any type of disk including floppy disks, optical disks, CDROMs, magnetic-optical disks, read-only memories (ROMs), random access memories (RAMs) electrically programmable read-only memories (EPROMs), electrically erasable and programmable read only memories (EEPROMs), FLASH memories, magnetic or optical cards, or any other type of media suitable for storing electronic instructions, and capable of being coupled to a computer system bus or I/O.

The processes and displays presented herein are not inherently related to any particular computer, processor or other apparatus. Various general-purpose systems may be used with programs in accordance with the teachings herein, or it may prove convenient to construct a more specialized apparatus to perform the desired method. The desired structure for a variety of these systems will appear from the description below.

In addition, embodiments of the present invention are not described with reference to any particular programming language. It will be appreciated that a variety of programming languages may be used to implement the teachings of the inventions as described herein. Furthermore, a programming language may not at all be used and the processing may be done by way of microcode, state machine, or other logic, whether working in concert with a programming language or not.

The detailed description set forth below in connection with the drawings is intended merely as a description of embodiments of the invention, and is not intended to represent the only form in which the present invention may be constructed or utilized. The description sets forth the ideas, designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

The principles of the present invention may be implemented for measuring high flow rates (e.g. cubic meters per second) of liquid or gas as well as very low flow rates (e.g. micro liters per hour) of the same. It will now be explained how the present invention may be implemented with the different embodiments, arrangements, and configurations. The different embodiments can be implemented with variations, modifications, alternatives, and alterations. These variations, modifications, alternatives, and alterations of the various embodiments, arrangements, and configurations may be used alone or in combination with one another as will become more readily apparent to those of ordinary skill in the art. The embodiments of the present invention will be discussed for several different cases and applications, those of ordinary skill in the art may implement the principles discussed in the present invention for other cases or applications.

The present invention is a fluid flow meter. According to some embodiments of the present invention, a fluid flow meter may comprise (1) a pump adapted to pump a substantially near fixed amount (e.g. volume) of fluid per pumping cycle, which pumping cycle may include a set of pumping strokes, not all of which strokes may be of the same volume; (2) optionally a fluid collection reservoir which may include an inlet and an outlet, or may alternatively include an inlet/outlet, any of which may be connected to the pump directly or through a fluid conduit, (3) at least one sensor which may be functionally associated with the fluid collection reservoir and/or with the pump; and (4) a control circuit/logic (controller) that may be adapted to trigger one or more pumping cycles, or a partial pumping cycle, in response to a signal from the at least one sensor. The signal of the at least one sensor may indicate a fluid amount (e.g. level or threshold) collected in the reservoir or in the pump. The controller may include estimating logic circuitry (e.g. dedicated counters and/or code running on a processor) for estimating the amount/volume of fluid pumped through the pump, wherein the estimation may be at least partially based on a count of pumping cycles and/or pumping strokes. The estimated pumped volume may be calculated by multiplying the known/substantially-near-fixed volume per given stroke and/or cycle with the number of given strokes and/or cycles, and by summing the multiplied values. Clock circuitry functionally associated with the estimating logic may facilitate a flow rate estimation, wherein the flow rate may be measured/estimated by determining the amount of fluid pumped (provided by counting pump cycles or strokes) over a given period of time (indicated by the clock circuitry).

According to embodiments, the controller may include non-volatile memory (NVM) for storing: (1) operational parameters, (2) operational logs, and (3) calibration data indicative of one or more physical characteristics of the: (a) pump, (b) reservoir, (c) sensor and/or (d) conduit. According to further embodiments calibration data for any given physical characteristic of any flow meter component (e.g. volume per given stroke and/or given cycle of the pump) may be a single value or a set of values indicating the given physical characteristic across any one or more of a range of: (1) operational durations, (2) operational cycles, (3) environmental conditions. For example, each stroke of a four stroke pump according to embodiments may pump a different amount of fluid, and the amount pumped by each stroke may be stored in the NVM. The NVM may store a single value per stroke (optionally for an entire pumping cycle) or the NVM may store a set of values per given stroke (e.g. second stroke of a pumping cycle), wherein each value may be associated with a different one or set of operational factors such as: (1) operational duration, (2) elapsed/endured operational cycles, (3) environmental conditions (e.g. temp), and (4) any other single or combination of factors which may affect the pumped volume of the given stroke.

According to some embodiments of the present invention, a flow meter or flow metering assembly may include a reservoir to collect fluid exiting a fluid source, a sensor to indicate a volume (actual or threshold) of fluid in the reservoir and a controller to trigger one or more pumping strokes/cycles of a pump upon receiving an indication from the sensor that a specific volume of fluid has collected (e.g. at or above a static or dynamically determined threshold level), the pump may be downstream from the reservoir and may be adapted to pump a known/substantially-near-fixed amount of fluid out of the reservoir per given pumping stroke and/or per given pumping cycle.

According to some embodiments of the present invention, a flow meter or flow metering assembly may include a reservoir to receive and temporarily collect fluid displaced from a fluid source by a fluid pump, the pump may be upstream from the reservoir and may be adapted to displace a known/substantially-near-fixed amount of fluid into the reservoir per given pumping stroke and/or per given pumping cycle, a sensor may indicate a volume (actual or threshold) of fluid in the reservoir, and a controller may trigger one or more pumping strokes/cycles of the pump upon receiving an indication from the sensor that the volume of fluid in the reservoir is at or below a static or dynamically determined threshold level.

According to some embodiments of the present invention, a flow meter or flow metering assembly may include a reservoir to collect fluid, a sensor to indicate a volume (actual or threshold) of fluid in the reservoir and a controller to trigger one or more pumping strokes/cycles of a pump upon receiving an indication from the sensor that a specific volume of fluid has collected or emptied (e.g. at or above/below a static or dynamically determined threshold level); wherein the pump may be directly connected to the reservoir and/or may share a common wall/divider/partition with it (i.e. no conduit between the two), and may be adapted to pump a known/substantially-near-fixed amount of fluid out of, or into the reservoir per given pumping stroke and/or per given pumping cycle.

According to some embodiments of the present invention, a flow meter or flow metering assembly may include a reservoir to collect fluid, a sensor to indicate a volume (actual or threshold) of fluid in the reservoir and a controller to trigger one or more pumping strokes/cycles of a pump upon receiving an indication from the sensor that a specific volume of fluid has collected or emptied (e.g. at or above/below a static or dynamically determined threshold level), the pump may be connected to the reservoir through an elongated conduit/hose and may be adapted to pump a known/substantially-near-fixed amount of fluid out of, or into the reservoir per given pumping stroke and/or per given pumping cycle.

According to some embodiments of the present invention, a flow meter/assembly may include a sensor that may comprise a float structure whose upward displacement closes an electric switch upon reaching specific floating height, and a pump that may be a piston based pump comprising a piston, a piston actuator and unidirectional flow valves at the pump inlet and outlet.

According to some embodiments of the present invention, a flow meter/assembly may comprise a piston type sensor structure whose upward displacement closes an electric switch upon reaching a specific displaced state.

According to some embodiments of the present invention, a flow meter/assembly configuration may comprise a sensor that may be functionally associated with a pump which may be positioned downstream of a reservoir. The pump may be of a piston type pump and may include: (a) an inlet unidirectional valve with a first biasing force (i.e. lower than force exerted by the fluid to be metered), an outlet unidirectional valve with a second biasing force which is greater than the first biasing force (i.e. greater than force exerted by the fluid to be metered), a piston type sensor. The reservoir may be biased by a biasing structure (e.g. a spring biased piston) having a biasing force higher than that of the pump inlet valve, such that fluid entering the reservoir under positive pressure is directed into the pump chamber. Fluid entering the pump chamber while the piston actuator is inactive (i.e. in idle mode) may cause the pump piston to rise. Upon the pumping piston reaching a threshold level, a switch type (binary) sensor which may be functionally associated with the pump piston may be triggered, thereby causing a controller to activate the piston actuator and start a discharge phase of the piston type pump. During the discharge, collected fluid in the pumping chamber may be forced to exit through the pump outlet unidirectional valve. Since the pump's unidirectional inlet valve is forced shut during discharge, fluid entering the biased reservoir may displace the biasing structure, which biasing structure later may urge fluid collected in the reservoir (during discharge) into the pumping chamber once the discharge phase is completed and the piston actuator is deactivated.

According to some embodiments of the present invention, a flexible reservoir and sensor assembly may have a native/relaxed (non-filled) state, such that a functionally associated switch/binary sensor is not closed/triggered, and a stretched/strained (filled) state, such that a functionally associated switch/binary sensor is closed/triggered, thereby may cause a functionally associated controller to initiate anyone of the pumping sequences described in connection with each of the embodiments mentioned within this application and bring the flexible reservoir towards a native/relaxed (non-filled) state.

According to some embodiments of the present invention, a flexible reservoir and sensor assembly may have a native/relaxed (filled) state, such that a functionally associated switch/binary sensor is closed/triggered, thereby may cause a controller to initiate anyone of the pumping sequences described in connection with each of the embodiments mentioned within this application, and bringing the flexible reservoir into a stretched (non-filled) state where the lower internal pressure (partial vacuum) may cause one of the reservoir walls to deform inward and away from a sensor trigger point.

According to some embodiments of the present invention, there may be provided a combination of a flexible reservoir with a pump and a sensor assembly. The flexible reservoir may have a native/relaxed (non-filled) state, such that a functionally associated switch/binary sensor is not closed/triggered; and a stretched/strained (filled) state, such that a functionally associated switch/binary sensor is closed/triggered. According to embodiments, wherein fluid source is at positive pressure, the pump's actuator may remain idle as fluid is driven through the inlet and a first unidirectional valve and into the reservoir through its inlet, causing the flexible reservoir to fill and at least one of its walls/sides, or part(s) thereof to stretch. The closing/triggering of the functionally associated switch/binary sensor may cause a controller to activate the actuator and initiate a pumping sequence by pushing down the stretched wall and thus discharging a known/substantially-near-fixed amount of fluid from the pump/reservoir through a second unidirectional valve of greater resistance on the reservoir's outlet, which may have prevented the escape of the positively pressurized fluid as it was filling up the reservoir. According to embodiments, wherein fluid source is at a negative pressure, the pump's actuator may pull up and may cause/assist the driving of fluid through the inlet and a first unidirectional valve and into the reservoir through its inlet. The closing/triggering of the functionally associated switch/binary sensor may cause a controller to activate the actuator and initiate a discharge sequence by pushing down and thus discharging a known/substantially-near-fixed amount of fluid from the pump/reservoir through a second unidirectional valve on the reservoir's outlet. The second unidirectional valve may have prevented fluid from entering the reservoir through the outlet as fluid was being pulled into the reservoir by the pulling of the actuator, the second valve on the reservoir's outlet was sealed as a result of the negative pressure created in the reservoir.

According to some embodiments of the present invention, there may be provided a combination of a flexible reservoir with a pump and a sensor assembly. According to embodiments of the present invention, the flexible reservoir may have a native/relaxed (filled) state, such that the functionally associated switch/binary sensor is closed/triggered; and a stretched/strained (non-filled) state, such that the functionally associated switch/binary sensor is not closed/triggered. According to embodiments, the pump's actuator may remain idle as fluid is driven through the inlet and a first unidirectional valve and into the reservoir through its inlet by its positive source pressure and/or by the suction force caused by the flexible reservoir expanding towards its native/relaxed position. The closing/triggering of the functionally associated switch/binary sensor may cause a controller to trigger the actuator and initiate a pumping sequence by pushing down and thus discharging a known/substantially-near-fixed amount of fluid from the pump/reservoir through a second unidirectional valve.

According to some embodiments of the present invention, a flexible reservoir and sensor assembly may have a native/relaxed (filled) state, such that a functionally associated switch/binary sensor is not closed/triggered; and a stretched/strained (non-filled) state, such that the functionally associated switch/binary sensor is closed/triggered, thereby may cause a controller to initiate anyone of the pumping sequences described in connection with each of the embodiments mentioned within this application and bring the flexible reservoir towards a native/relaxed (filled) state.

According to some embodiments of the present invention, a flexible reservoir and sensor assembly may have a native/relaxed (non-filled) state, such that a functionally associated switch/binary sensor is closed/triggered, thereby may cause a controller to initiate anyone of the pumping sequences described in connection with each of the embodiments mentioned within this application and bring the flexible reservoir into a stretched/strained (filled) state such that the functionally associated switch/binary sensor is not closed/triggered.

According to some embodiments of the present invention, various sensor types may be provided, such as a button type sensor which may be closed/triggered by a float sensor assembly, a piston sensor assembly and/or a flexible reservoir type sensor assembly. As the float/piston assembly rises and/or as the flexible reservoir or a portion thereof flexes or relaxes out, they may apply force against the button type sensor and close/open)/trigger it, thereby may cause a controller to initiate anyone of the pumping sequences described in connection with each of the embodiments mentioned within this application. Another type of sensor may be an optical sensor which may be triggered by a float sensor assembly, a piston sensor assembly and/or a flexible reservoir type sensor assembly. As the float/piston assembly rises and/or as the flexible reservoir or a portion thereof flexes or relaxes in or out, they may shift a mirror or a prism or any other reflecting/refracting/blocking element, thus causing a light beam from a light source to hit/stop-hitting an optical-sensor, and/or to change the light intensity hitting the light sensor, which may cause the triggering of the sensor, thereby may cause a controller to initiate anyone of the pumping sequences described in connection with each of the embodiments mentioned within this application.

According to some embodiments of the present invention, a flexible accordion-like shaped reservoir or pump/reservoir and button type sensor assembly may be provided. The flexible reservoir may have a native/relaxed or squeezed/strained, non-filled state, such that a functionally associated switch/binary sensor is not closed/triggered; and a stretched/strained or native/relaxed filled state, such that the functionally associated switch/binary sensor is closed/triggered, thereby may cause a controller to initiate anyone of the pumping sequences described in connection with each of the embodiments mentioned within this application and bring the flexible reservoir towards a native/relaxed or squeezed/strained non-filled state.

According to some embodiments of the present invention, there is provided a flexible tube-like shaped reservoir which may have a native/relaxed state, an outwards-stretched/strained (filled) state and a vacuumed/inwards stretched/strained (non-filled) state.

According to some embodiments of the present invention, a rigid conduit tube-like shaped reservoir with a flexible retrofit diaphragm may be provided. The conduit tube-like shaped reservoir may have an opening over which the flexible retrofit diaphragm may be positioned/attached.

According to some embodiments of the present invention, the rigid conduit tube-like shaped reservoir's flexible retrofit diaphragm may be positioned/attached over its opening and may have an outwards-stretched/strained (filled) state, a native/relaxed (non-filled/semi-filled) state and a vacuumed/inwards-stretched/strained (non-filled) state.

According to some embodiments of the present invention, there may be provided a flexible conduit tube-like shaped pump which may have a native/relaxed (filled) state wherein the pump actuator is not activated (i.e. not pressing onto the tube), a strained (non-filled) state wherein the pump actuator is activated (pressing onto the tube).

According to some embodiments of the present invention, a fluid flow meter may combine the flexible tube-like shaped reservoir and a flexible conduit tube-like shaped pump. The combined fluid flow meter's flexible tube-like shaped reservoir may have a native/relaxed (non-filled) state with a functionally associated switch/binary sensor not closed/triggered, and a stretched/strained (filled) state with its functionally associated switch/binary sensor closed/triggered.

According to some embodiments of the present invention, an operation cycle of a fluid flow meter combining a flexible tube-like shaped reservoir and a flexible conduit tube-like shaped pump may include: A first stage wherein the flexible tube-like shaped reservoir is in a native/relaxed (non-filled) state and the flexible conduit tube-like shaped pump is in a native/relaxed (filled) state. A switch/binary sensor is not closed/triggered and the actuator is not activated. A second stage wherein the flexible tube-like shaped reservoir has been filled with fluid from the source and is in a stretched/strained (filled) state, and the flexible conduit tube-like shaped pump is in a native/relaxed (filled) state. The switch/binary sensor has been closed/triggered by the stretched/strained (filled) flexible tube-like shaped reservoir and the actuator is about to initiate its actuating cycle. And a third stage wherein the flexible tube-like shaped reservoir is filled with fluid and is in a stretched/strained (filled) state, the switch/binary sensor is closed/triggered and the actuator is activated and has completed a first step of its actuating cycle by descending onto and pressing the flexible conduit tube-like shaped pump to its squeezed/strained (non-filled) state.

The squeezing of the flexible conduit tube-like shaped pump may cause at least part of the fluid previously contained in the pump to flow out of the pump to the sink side. The activated actuator may then complete its operation cycle by ascending back towards its initial position. The ascending of the actuator may allow for the flexible conduit tube-like shaped pump to return to its native/relaxed (filled) state while filling up by sucking fluid or letting fluid in from the stretched/strained (filled) flexible tube-like shaped reservoir and into its tube-like shaped body. The displacement of fluid from the reservoir and into the pump may take place as a result of the positive pressure in the stretched/strained reservoir and/or the negative pressure in the squeezed/strained tube of the pump returning to its native/relaxed (filled) state. Once it has completed the third stage of its operation cycle the combined fluid flow meter is now back in its initial position.

According to some embodiments of the present invention, a flow meter or flow metering assembly may include an enlarged reservoir to accommodate the collection of bursts of fluid exiting a fluid source, wherein a pump is downstream from the reservoir and is adapted to pump a known/substantially-near-fixed amount of fluid out of the reservoir per given pumping stroke and/or per given pumping cycle.

According to some embodiments of the present invention, a flow meter or flow metering assembly may include an enlarged reservoir to accommodate the consumption of bursts of fluid by a fluid sink, wherein a pump is upstream from the reservoir and is adapted to pump a known/substantially-near-fixed amount of fluid into the reservoir per given pumping stroke and/or per given pumping cycle.

According to some embodiments of the present invention, a flow meter or flow metering assembly may include a set of two or more pumps, wherein each of the pumps is adapted to displace either a similar or a different amount of fluid per pumping cycle and/or stroke, that may be used to pump fluid into or out of a reservoir. Pumps of larger pump-cycle/stroke amount may be used for higher fluid flow rates estimation, whereas smaller pump-cycle/stroke amount pumps may be used where lower fluid flow rates are to be estimated, while allowing for a more accurate estimation of the flowing amount (e.g. down to a 1 pumping stroke amount). Pumps of various pumping-cycle amounts may be used in combination in order to enable uninterrupted measuring of high fluid flow rates, while allowing for more accurate flow rate estimation by switching to and engaging pumps of smaller pump-cycle/stroke amounts, for example, as fluid flow rate decreases.

According to some embodiments of the present invention, a flow meter or flow metering assembly including a set of two or more pumps, may include a non-binary/continuous/analog sensor (e.g. a potentiometer) that may indicate the substantially near instantaneous amounts of fluid in the reservoir, and may respectively be used by a controller to engage pump(s) of corresponding pump-cycle amounts. According to some embodiments, the non-binary/continuous sensor may be implemented in the form of a triangular window that may rise or descend as fluid level in the reservoir changes (e.g. connected to the reservoir's float, piston or flexible diaphragm). A light source and a light sensor may be positioned on opposite sides of the triangular window. As the triangular window rises or descends as fluid level in the reservoir changes, the amount of light passing through the window and sensed by the light sensor may accordingly increase or decrease and pump(s) of a corresponding volume per pump-cycle may be engaged.

According to some embodiments of the present invention, a flow meter or flow metering assembly may include two or more sets of reservoirs and pumps which may be connected in a cascade configuration, wherein a first set of a reservoir and a pump may meter flow, while one or more sets of a reservoir and a pump may regulate sink side downstream back pressure and/or source pressure. The pump of a first set may pump fluid, out of its respective reservoir each time the sensor associated with the first reservoir is triggered. Accordingly, an increasing downstream fluid pressure may be created by the pump of the first set pushing fluid downstream into the reservoir of the second set. In addition, or alternatively, the pressure in the reservoir of the first set may change while the pump of the first set is pumping fluid out of its corresponding reservoir due to fluid entering the reservoir of the first set during a pumping cycle or stroke and/or due to fluid being pumped out of the reservoir. One or more additional sets of reservoirs, sensors and pumps may be used in order to regulate the pressure at the inlet and/or outlet of the pump of the first set. The controller may activate the one or more pumps of the at least one additional sets in order to regulate the pressure in the reservoir of the at least one additional sets and/or in the reservoir of the first set, so that the pump of the first set may experience a substantially near constant pressure, or a substantially near known pressure profile.

According to some embodiments of the present invention, a flow meter or flow metering assembly may include a first set of a reservoir and a pump, and one or more sets of a reservoir and a valve. A first set of a reservoir and a pump may meter the flow, while one or more second sets of a reservoir and a valve may regulate sink side downstream back pressure, and/or source pressure. Once a pressure sensor in the reservoir of a second set, senses that the pressure in the reservoir is out of some predetermined boundaries, it may signal to a functionally associated controller which, in response may trigger the opening of its respective valve and the release of at least some of the fluid from the reservoir of the second set, until the pressure in the reservoir of the second set goes back to the pressure within the given boundaries threshold, therefore keeping the pressure in the reservoir of the second set within certain boundaries.

According to some embodiments of the present invention, a flow meter may combine a piston type pump/reservoir and pressure sensor assembly with a downstream pressure stabilizing reservoir. The piston type pump/reservoir and pressure sensor assembly may include: an inlet unidirectional valve, an outlet unidirectional valve with a biasing force and a pump/reservoir chamber pressure sensor. The pump/reservoir chamber may be biased by a biasing structure (e.g. a spring biased piston) having a biasing force higher than that of the pump inlet valve, such that fluid entering the assembly under positive pressure is directed into the pump/reservoir chamber. Fluid entering the pump/reservoir chamber while the piston actuator is inactive (i.e. in idle mode) may cause the pump/reservoir piston to rise against the resistance of a piston movement resisting element (e.g. a spring). The pump/reservoir chamber pressure sensor may measure the pressure in the pump/reservoir chamber providing pressure indicative signals to a functionally associated controller. Upon reaching a pressure threshold level, the controller which may also be functionally associated with the pump piston, may trigger the activation of the piston actuator and start a discharge phase of the piston type pump. During the discharge, collected fluid in the pumping chamber may be forced to exit through the pump outlet unidirectional valve. Since the pump's unidirectional inlet valve is forced shut during discharge, fluid in the pump chamber may be forced through the outlet unidirectional valve and into the downstream pressure stabilizing reservoir. During discharge, the pressure in the pump's chamber and in the pressure stabilizing chamber may grow. Upon receiving a pressure signal from the pressure sensor indicating that a threshold stabilized pressure in the pump has been reached, the controller which may also be functionally associated with a controllable valve at the pressure stabilizing reservoir's outlet, may trigger the opening of the controllable valve allowing at least some of the fluid to flow out of the pressure stabilizing reservoir to the sink side. Upon receiving a pressure signal indicating that the pressure has dropped to/beyond a threshold stabilized pressure, the controller may trigger the closing of the controllable valve preventing further fluid from flowing out of the reservoir.

According to some embodiments of the present invention, a flow meter assembly may include a pneumatics/hydraulics based pump and reservoir sensor. The pneumatic/hydraulic flow meter assembly may include a flexible reservoir chamber and a flexible pump chamber. The flexible reservoir chamber may be positioned within a tank containing hydraulic liquid or pneumatic gas with a hydraulic/pneumatic liquid/gas containing tube connected to a hydraulic/pneumatic pressure sensor that may possibly be positioned at a remote location. The hydraulic/pneumatic pressure sensor may send signals indicative of the pressure to a functionally associated controller. As fluid from the source side of the assembly enters the flexible reservoir chamber through its inlet and causes it to stretch out, the surrounding hydraulic liquid or pneumatic gas in the tank may get pressurized. Once a signal indicating that a threshold pressure has been sensed by the hydraulic/pneumatic pressure sensor, is received by the controller, it may trigger the operation of a functionally associated hydraulic/pneumatic compressor connected by a hydraulic/pneumatic liquid/gas containing tube to a second tank containing hydraulic liquid or pneumatic gas, possibly positioned at a remote location (e.g. in proximity to the reservoir), in which the flexible pump chamber is positioned. The hydraulic/pneumatic pressure in the second tank may cause the flexible chamber of the pump to squeeze in, causing at least some of the fluid contained in the pump chamber to flow out of the assembly outlet to the sink side. A set of unidirectional valves at the inlet and outlet of the pump may direct the fluid flow towards the sink side of the assembly while preventing it from flowing back through the conduit connecting the reservoir and the pump and towards/into the reservoir chamber. As the squeezed pump chamber returns to its non-squeezed position it may create negative pressure in its chamber and thus refill by drawing additional fluid from the reservoir chamber through the conduit and into its chamber.

According to some embodiments of the present invention, there may be provided a flow meter/assembly, wherein the inlet from which source fluid enters the flow meter/assembly, is positioned on the conduit between a reservoir and a pump. According to some embodiments of the present invention, there may be provided a flow meter/assembly, wherein the outlet from which fluid exits the flow meter/ assembly to the sink, is positioned on the conduit between a reservoir and a pump.

According to some embodiments of the present invention, a flow meter assembly may include two fluid channels wherein a first channel may include a pump and a second channel may include a dynamic separating element/object positioned within a chamber. Fluid flowing through the fluid flow meter may flow from the inlet of the flow meter into the chamber causing the chamber side which is in fluid contact with the inlet of the fluid flow meter to fill and therefore may cause a substantially similar amount of fluid from the chamber side which is in fluid contact with the outlet of the fluid flow meter to be pushed out through the outlet of the fluid flow meter in such a way that it may seem as if the fluid actually flowed through the chamber. The dynamic separating element/object positioned within the chamber may prevent the flow and passage of fluid from one side of the chamber to the other. Fluid flow from the source may create pressure buildup which may cause the dynamic separating object to move/slide/travel within the chamber away from the source side and towards the sink side, wherein the movement of the dynamic separating element/object beyond a threshold point or distance may trigger a sensor/switch to send a signal to a functionally associated controller. In response, the controller may trigger the operation of the first channel pump, causing it to initiate a single or a set of pumping stroke(s) and/or cycle(s), of known/substantially-near-fixed amount of fluid, from the first channel source side to the first channel sink side. The pumping of fluid may cause a drop in fluid pressure in the source side of the assembly and possibly an increase in fluid pressure in the sink side of the assembly. The pressure difference may cause the dynamic separating object to move/slide/travel within the chamber back to, or towards, its initial position, allowing for pressure to be built again on the source side of the assembly.

According to some embodiments of the present invention, the second channel may include a dynamic separating object adapted to move/slide/travel within the second channel itself (e.g. the tube of the second channel) rather than inside a chamber.

According to some embodiments of the present invention, there may be provided a flow meter/assembly, wherein the separating object is in the form of a flexible sheet/membrane attached to the walls/sides of the second channel. The sheet/membrane may have an initial position wherein higher pressure on the sink side of the assembly may cause it to stretch/convex towards the source side; and a sensor/switch triggering position wherein pressure buildup on the source side may cause it to stretch/convex towards the sink side.

According to some embodiments of the present invention, there may be provided a flow meter/assembly, wherein the separating flexible sheet/membrane or element/object is positioned within a chamber, and a channel—somewhere along which a pump is positioned, leads from the chamber side of the separating flexible sheet/membrane (or element/object) closer to the source, to the chamber side of the separating flexible sheet/membrane (or element/object) closer to the sink. Fluid displaced from the source side of the flexible sheet/membrane of the chamber by the pump may be routed through the channel back into the chamber on the sink side of the flexible sheet/membrane.

According to some embodiments of the present invention, there may be provided a flow meter/assembly, wherein at least a portion of the second channel may be narrower than the rest of the channel. Accordingly, the dynamic separating object adapted to move/slide/travel within the second channel itself (e.g. the tube of the second channel) may be likewise narrower, which may cause it to move/slide/travel a longer distance through its channel, than it would have travelled in a non-narrowing channel, in response to a similar change in pressure between the source and sink sides of the channel.

According to some embodiments of the present invention, various sensor types may be implemented for sensing the movement of a dynamic separating object. According to some embodiments, an optical sensor comprising a light source and a light sensor may be implemented. As the dynamic separating object travels through the channel beyond a certain point it may block the light beam from the light source to be at least partially blocked. The light sensor, sensing the lack or decrease of light may send a signal to a functionally associated controller which may trigger the operation of a pump. According to some embodiments, a magnetic field based sensor comprising a coil and a metallic/magnetic dynamic separating object may be implemented. As the dynamic separating object travels through the channel beyond a certain point it may change one or more characteristics of the magnetic field sensed by the coil. The coil, sensing the change(s) in the magnetic field may send a signal to the controller which may trigger the operation of the pump.

According to some embodiments of the present invention, a control circuit may be of a degenerated form wherein the control circuit is composed of just an electrical wire. Upon the sensor determining that a fluid volume condition (e.g. fluid reaching a predefined level in a reservoir) has been met, it may send a signal to the control circuit which may forward that signal to another device and/or to a pump to command it to strike one or more stroke(s).

According to some embodiments of the present invention, there is provided a fluid flow meter for measuring fluid (liquid or gas) flow (e.g. volumetric), that may comprise: at least one reservoir, at least one sensor, at least one pump, and a control circuit.

According to some other embodiments of the present invention, there is provided a fluid flow meter for measuring fluid (liquid or gas) flow (e.g. volumetric), that may comprise at least one pump, at least one sensor, and a control circuit.

According to some embodiments of the present invention, there may be provided a reservoir that may comprise a chamber, an inlet port and an outlet port. According to some embodiments of the present invention, there may be a reservoir that may comprise a chamber and an inlet/outlet port. According to some embodiments of the present invention, the inlet port and the outlet port, or, the inlet/outlet port may be in fluid contact with the chamber of the reservoir. According to some embodiments of the present invention, the reservoir chamber may be adapted to store fluid (liquid or gas) in it. According to some embodiments of the present invention, the reservoir chamber may have a fixed internal volume. According to some embodiments of the present invention, the reservoir chamber may be adapted to change its internal volume as a result of fluid filling the chamber (i.e. input flow into the chamber is greater than the output flow out of the chamber) or as a result of fluid emptying the chamber (i.e. input flow into the chamber is smaller than the output flow out of the chamber). According to some embodiments of the present invention, the reservoir chamber or part of it may be made of a rigid material.

According to some embodiments of the present invention, the reservoir chamber or part of it may be made of a flexible or elastic material. According to some embodiments of the present invention, the reservoir chamber may expand and shrink and its internal volume may grow bigger or smaller as a result of fluid filling or emptying the chamber. According to some embodiments of the present invention, part of, or all of, at least one of the walls/sides of the reservoir chamber may be a diaphragm. According to some embodiments of the present invention, the reservoir may comprise a piston that may move back and forth in the chamber and change the chamber's internal volume as a result of fluid filling or emptying the chamber.

According to some embodiments of the present invention, there may be means (e.g. a spring) that may apply force on the piston to reduce the chamber's internal volume. According to some embodiments of the present invention, there may be means (e.g. a spring) that may apply force on the piston to increase the chamber's internal volume. According to some embodiments of the present invention, the reservoir may be constructed in a way allowing it to apply suction force to suck fluid into the chamber (for example, by a diaphragm covering a chamber and stretched into the chamber, or by a spring pulling a piston). According to some embodiments of the present invention, the reservoir may be constructed in a way allowing it to apply pressure to push out fluid contained in the chamber (for example, by a diaphragm covering a chamber and stretched out of the chamber, or by a spring pushing a piston).

According to some embodiments of the present invention, the reservoir chamber may be made of a flexible or elastic material. According to some embodiments of the present invention, the reservoir chamber may be a flexible or elastic tube. According to some embodiments of the present invention, the reservoir may comprise a float that may float on the liquid in the chamber. According to some embodiments of the present invention, the interior of the reservoir chamber may be in fluid contact with the surrounding atmosphere, other than from its inlet or outlet ports. According to some embodiments of the present invention, the interior of the reservoir chamber may be isolated (i.e. with no fluid contact) from the surrounding atmosphere.

According to some embodiments, maximum reservoir chamber volume (or maximal reservoir volume) may be defined as the amount/volume of fluid contained in the reservoir chamber when the reservoir chamber is at its maximum capacity. Minimum reservoir chamber volume (or minimal reservoir volume) may be defined as the amount/volume of fluid remaining in the reservoir chamber after all possible fluid was sucked out or pushed out of the reservoir chamber. Reservoir chamber volume (or reservoir volume) is the difference between the 'Maximum reservoir chamber volume' and the 'Minimum reservoir chamber volume', or in other words, it is the amount of fluid the reservoir can be filled with when it contains a minimum reservoir amount/volume of fluid. For the sake of simplicity of the description, the term 'reservoir chamber' may be simply referred to as 'reservoir'. In places where a distinction between the two may be required, both or one of the terms may be used.

The reservoir may contain a large volume of fluid such as for example, a pool which may contain thousands of cubic meters of liquid, or it may contain a small amount of fluid such as for example, a micro syringe which may contain a few micro-liters of fluid, or even MEMS based reservoir which may contain nano-liters of fluid.

According to some embodiments of the present invention, the sensor, used for estimating whether the pump or the reservoir is full or empty to a certain level, may be designed in various ways. For instance, according to some embodiments of the present invention, the sensor may be a capacitive type sensor. A capacitive type of sensor may operate in one of several ways such as by having a dielectric material which may be adapted to move with, or proportional to, the movement of an active element of the pump/reservoir (e.g. piston, diaphragm, plunger). Movement of the active element may move the dielectric material in the gap in-between a two plate capacitor, causing the capacitor's capacitance to change. The capacitor's capacitance may determine the shift of the active element which may be indicative of the amount of fluid in the pump/reservoir.

According to some other embodiments of the present invention, the sensor may be an inductive type sensor. An inductive type of sensor may operate in one of several ways such as by having a ferromagnetic material which may be adapted to move with, or proportional to, the movement of the active element of the pump/reservoir (e.g. piston, diaphragm, plunger). Movement of the active element may move the ferromagnetic material in a bore at the core of the coil, causing the inductance of the coil to change. The coil's inductance may determine the shift of the active element which may be indicative of the amount of fluid in the pump/reservoir.

According to some other embodiments of the present invention the sensor may be an optical type sensor. An optical type sensor may operate in one of several ways such as by having an opaque rod which may be adapted to move with, or proportional to, the movement of the active element of the pump/reservoir (e.g. piston, diaphragm, plunger). Movement of the active element may move the rod which may interrupt a light-beam projected by a light source such as a Light Emitting Diode (LED) and illuminating a photo-detector/sensor such as a photo-diode or photo transistor. The light intensity detected/sensed by the photo-detector may determine the shift of the active element which may be indicative of the amount of fluid in the pump/reservoir.

According to some other embodiments of the present invention, the sensor may be a resistive type sensor. A resistive type sensor may operate in one of several ways such as by having a variable resistor which may be adapted to move with, or proportional to, the movement of the active element of the pump/reservoir (e.g. piston, diaphragm, plunger). Movement of the active element may move the variable resistor, causing the resistance of the resistor to change. The resistor's resistance may determine the shift of the active element which may be indicative of the amount of fluid in the pump/reservoir.

According to some embodiments of the present invention the sensor may be a pressure transducer. A pressure transducer based sensor may be used in different ways, for example, in a compressible type of fluid such as gas, the reservoir may be constructed from a rigid or flexible material, the gas entering the reservoir may increase the pressure and gas extracted from the reservoir may decrease the pressure. A pressure transducer placed in fluid contact with the interior of the reservoir chamber may estimate the pressure inside the reservoir chamber, the estimated pressure may be indicative of the amount of fluid in the reservoir. In another example(s), the pressure transducer may not need to be in fluid contact with the interior of the reservoir chamber, such as in the case when the reservoir is constructed from a first chamber made of flexible material and placed inside a second chamber filled with fluid in between the interior of the second chamber and the exterior of the first chamber. The pressure transducer may be in fluid contact with the fluid in the second chamber. The pressure in the second chamber may equate the pressure in the first chamber, and therefore measuring the pressure of the fluid in the second chamber may be indicative of the amount of fluid in the first chamber. In another example, when a reservoir or pump with an active element is being used, the active element may apply force on the fluid, for example by means of a spring, as shown for example in FIG. 7; or for example by a diaphragm, as shown for example in FIGS. 8-13; or for example by the reservoir or pump elasticity, as shown for example in FIG. 17. In these cases the pressure in the reservoir or pump may be indicative of the amount of fluid in the reservoir or pump and therefore estimating the pressure in the reservoir or pump may provide information regarding the amount of fluid in the reservoir or pump.

According to some embodiments of the present invention the sensor may be a strain gage. A strain gage based sensor may be used in different ways, for example by attaching it to the chamber's wall and measuring the strain which may result from internal pressure in the chamber (i.e. reservoir's and/or pump's).

According to some embodiments of the present invention the sensor may be an ultrasonic transducer. An ultrasonic type sensor may operate in one of several ways such as by being placed at the top of a reservoir containing liquid, and transmitting ultrasonic waves towards the liquid surface. The time it takes the ultrasonic waves to reach the liquid surface and bounce back to the ultrasonic transducer may be indicative of the liquid surface height and hence may be indicative of the amount of fluid in the reservoir.

According to embodiments of the present invention, the sensor may also comprise a temperature sensing element (e.g. thermocouple) for estimating the temperature of the fluid. Fluid temperature estimation may be required for better estimating the fluid volume and/or for calibration compensation purposes. According to embodiments of the present invention, the sensor may also comprise a viscosity sensing element for estimating the viscosity of the fluid. Fluid viscosity estimation may be required for better estimating the fluid flow/volume and/or for calibration compensation purposes.

According to some embodiments of the present invention, there may be a sensor adapted to indicate that the volume of fluid in a reservoir has risen to, or beyond, a predefined amount/volume. According to some embodiments of the present invention, the sensor may be adapted to indicate that the volume of fluid in a reservoir has diminished to, or beyond, a predefined amount. According to some embodiments of the present invention, the predefined amount/volume of fluid may be equal to or greater than the sum of a pump's chamber volume (defined below) and the minimum reservoir volume. According to some embodiments of the present invention, the predefined amount of volume may be equal to or less than the maximum reservoir volume minus a pump's chamber volume (defined below). According to some embodiments of the present invention, the sensor adapted to indicate that the amount of fluid in a reservoir is higher or lower than a predefined amount, may further be adapted to send a signal indicating so, to a control circuit (control logic/controller). According to some embodiments of the present invention, there may be a sensor adapted to estimate the amount of fluid in a reservoir and send a signal indicative of said amount to the control circuit (controller).

According to some embodiments, the amount of fluid in the reservoir can be measured in various ways. For example, one way may be weighing the reservoir; another way may be by having a piston in the reservoir chamber which may move in accordance with the amount of fluid in the chamber, the piston movement may cause an electrical circuit to be closed (e.g. by pressing a switch); or may cause an obstruction of a light beam emitted from a light source (e.g. LED) to a light sensor (e.g. phototransistor, photodiode, photo-resistor), the change in light intensity may be a function of the amount of fluid in the chamber; or the piston movement may cause a movement of a variable resistor (potentiometer), a variable capacitor or a variable inductor, which may cause their respective resistance/capacitance/inductance to change as a function of the amount of fluid in the chamber; or the chamber may have a diaphragm which may press onto a strain-gage as a result of pressure in the chamber which may be proportional to the amount of fluid in the chamber; or the liquid level in the reservoir may be estimated using ultrasonic waves. Those of ordinary skill in the art may realize that there may be other ways to estimate the amount of fluid in a reservoir. Any method, component or device which is known today or which may be devised in the future for estimating the amount of fluid in a reservoir, may be used as a sensor.

According to some embodiments of the present invention, the sensor may comprise an electrical switch. According to some embodiments of the present invention, the sensor may comprise electrical contacts. According to some embodiments of the present invention, the sensor may comprise a light sensor. According to some embodiments of the present invention, the sensor may comprise a capacitor. According to some embodiments of the present invention, the sensor may comprise a resistor. According to some embodiments of the present invention, the sensor may comprise a coil. According to some embodiments of the present invention, the sensor may comprise a pressure transducer. According to some embodiments of the present invention, the sensor may comprise a strain gage. According to some embodiments of the present invention, the sensor may comprise an ultrasonic transducer.

According to some embodiments of the present invention, the pump may be a positive displacement pump such as a peristaltic pump, a reciprocating pump such as a syringe or piston or diaphragm pump, pulsating type or cyclic type of pump, or any other type of pump known today or that may be devised in the future. According to some embodiments of the present invention, the pump may be characterized by its ability, upon being commanded, to strike a single pumping stroke, and by its ability to pump a substantially similar volume of fluid in each stroke. According to some embodiments of the present invention, the pump may be characterized by its ability, upon being commanded, to pump a series of volumes (a cycle) as part of a series of a known number of pumping strokes, in which each volume in the series of volumes (each stroke volume in the cycle) may be substantially similar to the corresponding volume in the previous series of pumped volumes (previous cycle). According to some embodiments of the present invention, the pump may be characterized by its ability, upon being commanded, to strike a single pumping stroke out of a series of strokes, in which each volume pumped in the single pumping stroke out of the series of strokes may be substantially similar to the corresponding volume pumped in the previous single pumping stroke out of the series of pumped volumes. According to some embodiments of the present invention, the pump may be characterized by its ability, upon being commanded, to pump a stroke which volume may be selected out of a fixed number of volumes.

According to some embodiments, the pump chamber may be defined as the part of the pump that may be adapted to contain the fluid that may be displaced in each cycle/stroke. According to some embodiments of the present invention, a pump may have one chamber. According to some embodiments of the present invention, a pump may have two or more chambers that may displace fluid sequentially (i.e. in each stroke the next chamber is activated until a cycle is completed and starts over again). According to some embodiments of the present invention, a pump may have two or more chambers that may displace fluid nearly simultaneously. According to some embodiments of the present invention, a pump may have two or more chambers that may displace fluid from a chamber selectively upon a command selecting one of the chambers. Maximum pump chamber volume may be defined as the volume of fluid contained in the pump chamber when the pump is at the end of the charging (intake) phase of a stroke. Minimum pump chamber volume may be defined as the volume of fluid contained in the pump chamber when the pump is at the end of the discharge phase of a stroke. Pump chamber volume may be defined as the difference between the 'Maximum pump chamber volume' and the 'Minimum pump chamber volume, or in other words, the amount of fluid the pump charges or discharges in each stroke of the respective chamber, or the amount of fluid the pump displaces in each stroke. For the sake of simplicity of the description, the term 'pump chamber' may be simply referred to as 'pump'. In places where a distinction between the two may be required, both or one of the terms may be used.

According to some embodiments of the present invention, the pump may be a peristaltic pump. According to some embodiments of the present invention, the peristaltic pump may be a rotary peristaltic pump. According to some embodiments of the present invention, the peristaltic pump may be a linear peristaltic pump. According to some embodiments of the present invention, the peristaltic pump may be actuated by a stepper motor. According to some embodiments of the present invention, the peristaltic pump may be actuated by solenoids. According to some embodiments of the present invention, the peristaltic pump may be actuated electrically. According to some embodiments of the present invention, the peristaltic pump may be actuated pneumatically. According to some embodiments of the present invention, the peristaltic pump may be actuated hydraulically.

According to some embodiments of the present invention, the pump may be a reciprocating type pump. According to some embodiments of the present invention, the reciprocating pump may be a piston pump. According to some embodiments of the present invention, the reciprocating pump may be a plunger pump. According to some embodiments of the present invention, the reciprocating pump may be a membrane or diaphragm pump. According to some embodiments of the present invention, the reciprocating pump may be a syringe pump. According to some embodiments of the present invention, the reciprocating pump chamber may be made of a flexible or elastic material. According to some embodiments of the present invention, the reciprocating pump chamber may be a flexible or elastic tube.

According to some embodiments of the present invention, the reciprocating pump may include suction and discharge valves. According to some embodiments of the present invention, the suction and/or discharge valves may be unidirectional valves. According to some embodiments of the present invention, the suction and/or discharge valves may be electrically actuated. According to some embodiments of the present invention, the suction and/or discharge valves may be pneumatically actuated. According to some embodiments of the present invention, the suction and/or discharge valves may be hydraulically actuated. According to some embodiments of the present invention, the suction and/or discharge valves may open or close due to the force of the fluid flowing through them. According to some embodiments of the present invention, the suction and/or discharge valves may open or close due to a mechanical force (such as a spring) applied on them. According to some embodiments of the present invention, the reciprocating pump may be actuated by a stepper motor. According to some embodiments of the present invention, the reciprocating pump may be actuated by one or more solenoids. According to some embodiments of the present invention, the reciprocating pump may be actuated pneumatically. According to some embodiments of the present invention, the reciprocating pump may be actuated hydraulically. According to some embodiments of the present invention, the reciprocating pump may be actuated electrically.

According to some embodiments of the present invention, the pump chamber may be charged with fluid during an intake phase, and discharged during a discharge phase. According to some embodiments of the present invention, the pump actuator may cause a suction force to be applied into the pump chamber during the intake phase. According to some embodiments of the present invention, the pump actuator may cause a positive pressure force to be applied into the pump chamber during the discharge phase. According to some embodiments of the present invention, the pump actuator may apply no force during the intake phase. According to some embodiments of the present invention, the pump actuator may apply no force during the discharge phase. According to some embodiments of the present invention, the pump actuator may cause a suction force to be applied into the pump chamber during the intake phase, and may cause a positive pressure force to be applied into the pump chamber during the discharge phase.

According to some embodiments of the present invention, upon receiving a signal from the sensor, the control circuit may send a signal to the pump instructing it to perform one or more pumping strokes/cycles. According to some embodiments of the present invention, the control circuit may calculate a delay time between receiving a signal from the sensor and sending a signal to the pump. According to some embodiments of the present invention, the control circuit may count the number of pumping strokes/cycles. According to some embodiments of the present invention, the control circuit may transmit a signal to another device indicating that a pumping stroke/cycle has occurred and optionally also transmit a signal indicating the stroke type. According to some embodiments of the present invention, by multiplying the number of pumping strokes/cycles by the amount of pumped volume in each stoke/cycle, the amount of fluid which flowed through the pump may be estimated. According to some embodiments of the present invention, the control circuit may calculate the amount of fluid which flowed through the pump and transmit a signal indicative of that amount to another device. According to some embodiments of the present invention, by multiplying the pumping stroke/cycle frequency by the amount of pumped volume in each stroke/cycle, the fluid flow rate of fluid displaced by the pump may be estimated. According to some embodiments of the present invention, the control circuit may calculate the fluid flow rate of fluid displaced by the pump and transmit a signal indicative of that rate to another device.

According to some embodiments of the present invention, there may be a sensor adapted to estimate when a pump contains a volume of fluid which may be substantially near a predefined amount. According to some embodiments of the present invention, the sensor may further be adapted to send a signal indicating so, to a control circuit (control logic). According to some embodiments of the present invention, there may be a sensor adapted to estimate the amount of fluid in a pump and send a signal indicative of said amount to the control circuit.

According to some embodiments, the amount of fluid in the pump's chamber can be measured in various ways. For example, one way may be weighing the pump; another way may be by having the pump piston move according to the amount of fluid in the pump chamber, the piston movement may cause an electrical circuit to be closed (e.g. by pressing a switch); or may cause an obstruction of a light beam emitted from a light source (e.g. LED) to a light sensor (e.g. phototransistor, photodiode, photo-resistor), the change in light intensity may be a function of the amount of fluid in the pump chamber; or the piston movement may cause a movement of a variable resistor (potentiometer) or variable capacitor or variable inductor, which may cause their respective resistance/capacitance/inductance to change as a function of the amount of fluid in the chamber; or the pump's chamber may have a diaphragm which may press onto a strain-gage as a result of pressure in the chamber which may be proportional to the amount of fluid in the chamber. Those of ordinary skill in the art may realize that there may be other ways to estimate the amount of fluid in a pump. Any method, component or device which is known today or which may be devised in the future for estimating the amount of fluid in a pump, may be used as a sensor.

According to some embodiments of the present invention, the sensor may comprise an electrical switch. According to some embodiments of the present invention, the sensor may comprise electrical contacts. According to some embodiments of the present invention, the sensor may comprise a light sensor. According to some embodiments of the present invention, the sensor may comprise a capacitor. According to some embodiments of the present invention, the sensor may comprise a resistor. According to some embodiments of the present invention, the sensor may comprise a coil. According to some embodiments of the present invention, the sensor may comprise a pressure transducer. According to some embodiments of the present invention, the sensor may comprise a strain gage. According to some embodiments of the present invention, the sensor may comprise an ultrasonic transducer.

According to some embodiments of the present invention, there may be a volumetric fluid flow meter which may comprise a pump, a channel/vessel divided into two parts (e.g. chambers), each having an inlet/outlet port, or separate inlet and an outlet ports, a sensor, and control circuit.

According to some embodiments of the present invention, the channel may be divided into two chambers by a separating element/object which may obstruct fluid from passing from one chamber of the channel/vessel into the other chamber, the element/objet may, however, be able to travel/wander in a free, or substantially near free manner within the channel/vessel, in a way that the volume of one chamber may become bigger on the expense of the volume of the other chamber becoming smaller. According to some embodiments of the present invention, the inlet of the fluid flow meter may be fluidly connected to the inlet of the pump and to one chamber of the channel/vessel, and the outlet of the fluid flow meter may be fluidly connected to the outlet of the pump and to the other chamber of the channel/vessel.

According to some embodiments of the present invention, fluid flowing through the fluid flow meter may flow from the inlet of the flow meter into the channel/vessel causing the chamber which is in fluid contact with the inlet of the flow meter to fill and therefore may cause a substantially similar amount of fluid from the other chamber to be pushed out through the outlet of the flow meter in such a way that it may seem as if the fluid actually flowed through the channel/vessel. According to some aspects of the present invention, when fluid flows into the chamber which is in fluid contact with the inlet of the flow meter, the volume of that chamber may increase and the volume of the chamber which is in fluid contact with the outlet of the flow meter may decrease causing fluid to flow out through the outlet. According to some embodiments of the present invention, the sum of the volumes of both chambers may be substantially near constant. According to some embodiments of the present invention, the separating element/object in the channel/vessel may separate the channel/vessel into the two chambers (obstructing object). According to some embodiments of the present invention, the change in volume of both chambers may be done by movement of the separating element/object (obstructing object).

According to some embodiments of the present invention, the change in volume of both chambers may cause the separating element/object to move. According to some embodiments of the present invention, the filling of one chamber may cause the separating element/object to move in a way that the chamber's volume may increase and the other chamber's volume may decrease. According to some embodiments of the present invention, the emptying of one chamber may cause the separating element/object to move in a way that the chamber's volume may decrease and the other chamber's volume may increase. According to some embodiments of the present invention, there may be a sensor which may determine that the separating element/object reached or passed a certain predetermined point and send a signal indicating so to the control circuit.

According to some embodiments of the present invention, upon receiving a signal from the sensor, the control circuit may send a command to the pump instructing it to pump a single or multiple pumping strokes or cycles. According to some embodiments of the present invention, upon receiving a signal from the control circuit, the pump may pump fluid from the chamber which is in fluid contact with the inlet of the flow meter, causing that chamber's volume to decrease, and into the chamber which is in fluid contact with the outlet of the flow meter, causing its volume to increase. According to some embodiments of the present invention, the change in volume of the two chambers resulting from the pumping of the pump may cause the separating object to move away from the sensor and back towards its initial position. According to some embodiments of the present invention, the control circuit may count the number of pump strokes/cycles in order to calculate the volume and flow rate of fluid which flowed through the flow meter.

According to some embodiments of the present invention, the control circuit may be adapted to control the operation of the one or more pumps. According to some embodiments of the present invention, the control circuit may be adapted to receive a signal from the one or more sensors indicative of the amount of fluid in the one or more reservoirs. According to some embodiments of the present invention, the control circuit may be adapted to receive a signal from the one or more sensors indicative of the amount of fluid in the one or more pumps. According to some embodiments of the present invention, upon receiving a signal from a sensor, the control circuit may send a signal to a pump instructing it to perform one or more pumping strokes/cycles. According to some embodiments of the present invention, upon determining that the amount of fluid in a reservoir is substantially close to a predefined amount, the control circuit may send a signal to a pump instructing it to perform one or more pumping strokes/cycles. According to some embodiments of the present invention, upon determining that the amount of fluid in a pump is substantially close to a predefined amount, the control circuit may send a signal to a pump instructing it to perform a pumping stroke. According to some embodiments of the present invention, the control circuit may calculate a delay time between receiving a signal from a sensor and sending a signal to a pump. According to some embodiments of the present invention, the control circuit may count the number of pumping strokes/cycles. According to some embodiments of the present invention, the control circuit may send a signal associated with each pumping stroke/cycle to another device, or it may send a signal indicating the number of elapsed pumping strokes/cycles. According to some embodiments of the present invention, the control circuit may calculate the estimated amount of fluid that flowed through the flow meter. According to some embodiments of the present invention, by multiplying the number of pumping strokes/cycles by the amount of pumped volume in each stroke/cycle, the amount of fluid which flowed through the pump may be estimated.

According to some embodiments of the present invention, the control circuit may calculate the estimated amount of fluid displaced by the pump and transmit a signal indicative of that amount to another device. According to some embodiments of the present invention, by multiplying the pumping stroke/cycle frequency by the amount of pumped volume in each stroke/cycle, the fluid flow rate through the pump may be estimated. According to some embodiments of the present invention, the control circuit may calculate the estimated fluid flow rate of fluid displaced by the pump and transmit a signal indicative of that rate to another device. According to some embodiments of the present invention, the control circuit may send a signal indicative of the stroke/cycle frequency of the pump, or it may send a signal indicative of the fluid flow rate. According to some embodiments of the present invention, the control circuit may calculate the estimated fluid flow rate through the flow meter. According to some embodiments of the present invention, the control circuit may use calibration parameters to calculate the flow. According to some embodiments of the present invention, the calibration parameters may be stored in a nonvolatile memory.

Throughout the specification of the present invention the terms control-circuit, control-logic, controller and control may be alternatively used to describe a commanding and/or processing unit that may: trigger various operations/operation-scenario(s) of one or more flow meter pump(s), valve(s), and/or other flow meter component(s); receive/register/process/communicate any type of data related to amount(s) of fluid in a reservoir, a pump, a combined reservoir/pump, a channel and/or other flow meter component(s); and/or receive/register/process/communicate any type of data related to a flow meter enabling/supporting/controlling apparatus such as sensors, valves, calibration parameters, hydraulic/pneumatic systems, and/or other flow meter related component(s).

Furthermore, the commanding and/or processing unit may receive/register/process/communicate environmental conditions such as temperature, barometric pressure, and humidity. It may also receive/register/process/communicate measured fluid physical parameters such as temperature, pressure, and viscosity. Such a commanding and/or processing unit may be realized mechanically, electrically, electronically, digitally, by analog circuitry, optically and/or in any other way or manner, known today or to be devised in the future. Furthermore, the realization of at least some of the described embodiments, and variations thereof, may not necessitate the use of a particular type of such commanding and/or processing unit and in some cases the commanding and/or processing unit may degenerate even just to a simple electrical contact.

At least some of the drawings described in the specification include an arrow (numbered [109]) originating at, and pointing away from, the commanding and/or processing unit (control [106]). This arrow may represent data communicated (e.g. to other devices) by the commanding and/or processing unit, and may include fluid amount(s), fluid flow rate(s), number/time of pump stroke(s)/cycle(s) performed and/or any other processed or non-processed data that may be relevant to fluid flow metering. Furthermore, for simplicity and clarity reasons the commanding and/or processing unit is not shown in all drawings, however, embodiments of at least some of these drawings may nevertheless include such unit(s), and these units may likewise communicate data to other devices.

In some implementations of the pump there may be differences between the pump chamber volumes of one pump to another. These differences may be due to variations in value or size of different components from which the pump is constructed and may result from inaccuracies during the manufacturing process. One cause may be a difference in the physical size of the mechanical elements that construct the pump. For example, the pump's chamber may have a volume of (pi*r$^2$*w) where 'pi' is 3.14 . . . , 'r' is the chamber's radius, and 'w' is the chamber's length. As an example let's assume a nominal radius of 1 mm and a manufacturing variation of 0.1 mm, in this case the error in volume may be $(1^2-0.9^2)/1^2$ which is a 19% error. Another cause may be alignment accuracy of the manufacturing process. Each of these as well as other factors may contribute to the inaccuracy of the measurement. In order to have accurate measurements, the measuring device may be calibrated. Calibration information may be stored in the control circuit or in a nonvolatile memory associated with the control circuit, or the physical size of the pump chamber volume may be adjusted (such as with a calibration screw) to be substantially near a given value.

According to some embodiments of the present invention, the pump may be calibrated. According to some embodiments of the present invention, the pump may be calibrated mechanically (e.g. by turning a screw which may adjust the pump's chamber internal volume). According to some embodiments of the present invention, the pump may be calibrated electrically (e.g. by adjusting a potentiometer). According to some embodiments of the present invention, the pump may be calibrated and a calibration parameter may be extracted and stored in the control circuit. According to some embodiments of the present invention, the pump may be calibrated and a calibration parameter may be extracted and stored in a nonvolatile memory functionally associated with the control circuit.

In some implementations of the sensor there may be a need to calibrate the sensor so that it may more accurately send a signal to the control circuit when the amount of fluid in a reservoir or in a pump reaches a predefined amount. In some implementations of the sensor there may be a need to calibrate the sensor so that it may send a signal to the control circuit indicative of the amount of fluid in the reservoir or pump. According to some embodiments of the present invention, the sensor may be calibrated. According to some embodiments of the present invention, the sensor may be calibrated mechanically (e.g. by turning a screw which may adjust the position of the sensor). According to some embodiments of the present invention, the sensor may be calibrated electrically (e.g. by adjusting a potentiometer).

According to some embodiments of the present invention, the sensor may be calibrated and a calibration parameter may be extracted and stored in the control circuit. According to some embodiments of the present invention, the sensor may be calibrated and a calibration parameter may be extracted and stored in a nonvolatile memory functionally associated with the control circuit.

According to some embodiments of the present invention, the pump may pump fluid into the reservoir. According to some embodiments of the present invention, the pump may pump fluid out of the reservoir. According to some embodiments of the present invention, the reservoir may suck fluid from the pump. According to some embodiments of the present invention, the reservoir may push fluid into the pump. According to some embodiments of the present invention, the measured fluid may be forced into the reservoir by its pressure. According to some embodiments of the present invention, the measured fluid may be forced into the pump by its pressure. According to some embodiments of the present invention, the measured fluid may be forced out of the reservoir by suction force. According to some embodiments of the present invention, the measured fluid may be forced out of the pump by suction force. According to some embodiments of the present invention, the reservoir chamber's internal volume may be larger than the pump chamber's internal volume.

According to some embodiments of the present invention, there may be provided a fluid flow meter for measuring fluid (liquid or gas) volumetric flow, which may comprise a reservoir, a sensor, a pump, and control circuit. According to some embodiments of the present invention, the reservoir may be attached to the inlet of the pump in a way that the interior of the reservoir chamber is in fluid communication with the inlet of the pump and the fluid may flow from the flow meter's inlet into the reservoir, from the reservoir to the pump chamber and from the pump chamber to the, flow meter's outlet.

According to some embodiments of the present invention, the reservoir may be attached to the outlet of the pump in a way that the interior of the reservoir chamber is in fluid communication with the outlet of the pump and the fluid may flow from the flow meter's inlet into the pump chamber, from the pump chamber to the reservoir and from the reservoir to the flow meter's outlet. According to some embodiments of the present invention, the sensor may sense the amount of fluid in the reservoir and send a signal indicative of that amount to the control circuit.

According to some embodiments of the present invention, the control circuit may receive a signal indicative of the amount of fluid in the reservoir and control the operation of the pump. According to some embodiments of the present invention, upon determining that the reservoir has filled to, or beyond, an amount substantially near a predefined amount, or that the reservoir has emptied to, or beyond, an amount substantially near a predefined amount, the control circuit may send a signal instructing the pump to perform a pumping cycle/stroke. According to some embodiments of the present invention, the control circuit may receive from the sensor a signal indicative of the amount of fluid in the reservoir, and may instruct the pump to perform a pumping cycle/stroke.

According to some embodiments of the present invention, there may be provided a flow meter for measuring fluid flow rate and/or volume which may comprise a pump such as described hereinabove, a sensor and control circuit. According to some embodiments of the present invention, the pump chamber may be filled with fluid as a result of the pressure of fluid which is in fluid communication with the pump inlet. According to some embodiments of the present invention, the pump's chamber may be filled by/with-the-assistance-of the suction produced by a spring or other force applied to an active element of the pump (e.g. piston, diaphragm, plunger, or other moving part depending on the pump type). According to some embodiments of the present invention, there may be a sensor adapted to indicate that the pump chamber has filled with fluid to an amount which may be substantially near a predefined amount. According to some embodiments of the present invention, upon sensing that the pump chamber has filled to, or beyond, an amount which may be substantially near a predefined amount, the sensor may send a signal to the control circuit. According to some embodiments of the present invention, there may be a sensor adapted to gauge the amount of fluid in the pump and send a signal indicative of that amount to the control circuit. According to some embodiments of the present invention, upon receiving a signal from the sensor, the control circuit may send a signal to the pump which may cause its active element (e.g. piston, diaphragm, plunger, or other moving part depending on the pump type) to perform a discharge stroke phase.

According to some embodiments of the present invention, there may be provided a flow meter for measuring fluid flow rate and/or volume which may comprise a pump such as described hereinabove, a sensor and control circuit. According to some embodiments of the present invention, the pump may perform a suction stroke phase for filling the pump chamber with fluid. According to some embodiments of the present invention, the fluid may flow out of the pump by suction force applied to the outlet port of the pump. According to some embodiments of the present invention, the fluid may flow out of the pump (discharged) by a force (e.g. spring) applied to an active element of the pump (e.g. piston, diaphragm, plunger, or other moving part depending on the pump type). According to some embodiments of the present invention, there may be a sensor adapted to indicate that the pump chamber has emptied to, or beyond, an amount which may be substantially near a predefined amount. According to some embodiments of the present invention, upon sensing that the pump chamber has emptied to, or beyond, an amount which may be substantially near a predefined amount, the sensor may send a signal to the control circuit. According to some embodiments of the present invention, there may be a sensor adapted to gauge the amount of fluid in the pump and send a signal indicative of that amount to the control circuit. According to some embodiments of the present invention, upon receiving a signal from the sensor, the control circuit may send a signal to the pump which may cause its active element (e.g. piston, diaphragm, plunger, or other moving part depending on the pump type) to perform a suction stroke phase.

According to some embodiments of the present invention, there may be provided a flow meter for measuring fluid flow rate and/or volume which may comprise a reservoir, a sensor, a control circuit and at least two pumps such as those described hereinabove. According to some embodiments of the present invention, at least two of the two or more pumps may have a substantially similar internal chamber volume. According to some embodiments of the present invention, the pumps may have different internal chamber volumes.

According to some embodiments of the present invention, the inlets of all pumps may be connected to one another in a way that all pumps share a common inlet. According to some embodiments of the present invention, each of the two or more pumps may be able to suck fluid from the common inlet. According to some embodiments of the present invention, fluid may flow into each of the two or more pumps from the common inlet. According to some embodiments of the present invention, the outlets of all pumps may be connected to one another in a way that all pumps may share a common outlet. According to some embodiments of the present invention, each of the two or more pumps may be able to discharge fluid to the common outlet. According to some embodiments of the present invention, fluid may flow from each of the two or more pumps to the common outlet. According to some embodiments of the present invention, the reservoir may be attached to the common inlet of the pumps in a way that the interior of the reservoir chamber may be in fluid communication with the common inlet of the pumps, so that fluid may flow from the flow meter's inlet into the reservoir and from the reservoir to at least one of the pumps' chambers and from the at least one of the pumps' chambers to the flow meter's outlet. According to some other embodiments of the present invention, the reservoir may be attached to the common outlet of the pumps in a way that the interior of the reservoir chamber may be in fluid communication with the common outlet of the pumps, so that fluid may flow from the flow meter's inlet into at least one of the pumps' chambers and from the at least one pumps' chambers to the reservoir and from the reservoir to the flow meter's outlet. According to some embodiments of the present invention, the sensor may sense the amount of fluid in the reservoir and send a signal indicative of that amount to the control circuit.

According to some embodiments of the present invention, the control circuit may receive a signal indicative of the amount of fluid in the reservoir and control the pumps' operation. According to some embodiments of the present invention, the amount of fluid in the reservoir may determine which pump or pumps is/are to be activated. According to some embodiments of the present invention, the control circuit may operate one or more of the smaller internal chamber volume pump(s) when it receives from the sensor a signal indicating that the reservoir contains a small amount of fluid. According to some embodiments of the present invention, the control circuit may operate one or more of the larger internal chamber volume pump(s) when it receives from the sensor a signal indicating that the reservoir contains a large amount of fluid. According to some embodiments of the present invention, the control circuit may operate the smaller internal chamber volume pump(s) when it receives from the sensor a signal indicating that the reservoir contains a large amount of fluid. According to some embodiments of the present invention, the control circuit may operate the larger internal chamber volume pump(s) when it receives from the sensor a signal indicating that the container contains a small amount of fluid. According to some embodiments of the present invention, the control circuit may operate the pumps according to the amount of fluid in the reservoir. According to some embodiments of the present invention, the control circuit may operate the pumps according to the cycle frequency in which the other pumps are currently pumping.

According to some embodiments of the present invention, the control circuit may operate the pumps according to the frequency in which the other pumps are currently pumping and the fluid volume in the reservoir. According to some embodiments of the present invention, when a pump pumps at a frequency which is above a defined upper threshold frequency, the control circuit may activate another pump. According to some embodiments of the present invention, the other pump may be activated in addition to the pump that reached the defined upper threshold frequency. According to some embodiments of the present invention, the other pump may be activated instead of the pump that reached the defined upper threshold frequency. According to some embodiments of the present invention, the other pump may have a larger internal chamber volume than the pump that reached the defined upper threshold frequency. According to some embodiments of the present invention, the other pump may have a substantially similar internal chamber volume as the pump that reached the defined upper threshold frequency. According to some embodiments of the present invention, when a pump pumps at a frequency which is below a defined lower threshold frequency, the control circuit may activate another pump. According to some embodiments of the present invention, the other pump may be activated in addition to the pump that reached the defined lower threshold frequency. According to some embodiments of the present invention, the other pump may be activated instead of the pump that reached the defined lower threshold frequency. According to some embodiments of the present invention, the other pump may have a smaller internal chamber volume than the pump that reached the defined lower threshold frequency. According to some embodiments of the present invention, the other pump may have a substantially similar internal chamber volume as the pump that reached the defined lower threshold frequency.

According to some embodiments of the present invention, the control circuit may use hysteresis when starting to activate the other pump. According to some embodiments of the present invention, the control circuit may use hysteresis when stopping the activation of a pump that reached the threshold value. According to some embodiments of the present invention, the hysteresis may be applied on the reservoir volume. According to some embodiments of the present invention, the hysteresis may be applied on the cycle pumping frequency of at least one of the pumps.

According to some embodiments of the present invention, the control circuit may estimate the amount of fluid that flowed through the flow meter by calculating the sum-of-products of the multiplication of the number of elapsed pumping cycles of each pump, by the internal chamber volume of each of the corresponding pumps. According to some embodiments of the present invention, the control circuit may estimate the fluid flow rate through the flow meter by calculating the sum-of-products of the multiplication of each pump's cycle frequency, by the internal chamber volume of each of the corresponding pumps. According to some embodiments of the present invention, the control circuit may send a signal indicative of the flow rate and/or volume to another device.

According to some embodiments, the two or more pumps described above may be substituted by at least one pump having at least two chambers in which each chamber may be activated independently. According to some embodiments of the present invention, at least two of the two or more chambers may have a substantially similar internal volume. According to some embodiments of the present invention, the chambers may have different internal volumes. According to some embodiments, the control circuit may control/activate each of the pump chambers separately as if they were part of separate pumps.

According to some embodiments of the present invention, there may be provided a fluid flow meter for measuring fluid (liquid or gas) volumetric flow which may comprise at least one reservoir, at least one sensor, control circuit and at least two pumps. According to some embodiments of the present invention, the at least one reservoir and the at least two pumps may be connected in a cascade connection in a way that the outlet of a reservoir may be attached to the inlet of the next downstream pump in the cascade, and the inlet of that reservoir may be attached to the outlet of the previous upstream pump in the cascade. The outlet of a pump may be attached to the inlet of the next downstream reservoir in the cascade, and the inlet of that pump may be attached to the outlet of the previous upstream reservoir in the cascade. The inlet of the first upstream pump or reservoir in the cascade may be attached to the inlet port of the flow meter, and the outlet of the last downstream pump or reservoir in the cascade may be attached to the outlet port of the flow meter. Fluid may flow from the inlet port of the flow meter to the first pump or reservoir in the cascade and from the first pump or reservoir to the next reservoir or pump in the cascade until the last reservoir/pump, and from the outlet of the last pump or reservoir in the cascade to the outlet port of the flow meter.

According to some embodiments of the present invention, the sensor(s) may estimate the amount of fluid and/or the pressure in at least one of the reservoirs in the cascade. According to some embodiments of the present invention, the sensor(s) may estimate the amount of fluid and/or the pressure in at least one of the pumps in the cascade. According to some embodiments of the present invention, the sensor(s) may send a signal indicative of the estimated amount of fluid and/or pressure to the control circuit. According to some embodiments of the present invention, the control circuit may control the operation of the pump(s) in a way that at least one pump is used to estimate the amount of fluid it displaced by counting the number of pumping cycles/strokes and multiplying it by the pump chamber(s) volume, or to estimate the flow rate of the fluid it displaced by multiplying the pump's pumping stroke/cycle frequency by the pump chamber(s) volume. According to some embodiments of the present invention, the control circuit may control the operation of the pump(s) in a way that the pressure in at least one of the reservoirs may be within predetermined boundaries, by pumping fluid into the reservoir or out of the reservoir when the pressure in the reservoir is out of the predefined boundaries.

According to some embodiments of the present invention, there may be provided a fluid flow meter for measuring fluid (liquid or gas) volumetric flow, which may comprise at least one reservoir, at least one sensor, at least one pump, at least one valve, and control circuit. According to some embodiments of the present invention, the at least one reservoir and the at least one pump may be connected in a cascade connection in a way that the outlet of a reservoir may be attached to the inlet of the next downstream pump in the cascade, and the inlet of that reservoir may be attached to the outlet of the previous upstream pump in the cascade. The outlet of a pump may be attached to the inlet of the next downstream reservoir in the cascade, and the inlet of that pump may be attached to the outlet of the previous upstream reservoir in the cascade. According to some embodiments of the present invention, the cascade may further include a valve which may be connected at one end to the inlet port of the flow meter and at its other end to the inlet port of the first upstream reservoir in the cascade. According to some embodiments of the present invention, the control circuit may control the opening and closing of the valve. According to some embodiments of the present invention, the control circuit may control the operation of the valve in a way that the pressure in the first reservoir in the cascade is within predetermined boundaries, by opening the valve and letting fluid flow into the reservoir when the pressure in the reservoir is out of the predefined boundaries.

According to some embodiments of the present invention, the cascade may include a valve connected at its one end to the outlet port of the flow meter and at its other end to the outlet port of the last downstream reservoir in the cascade. According to some embodiments of the present invention, the control circuit may control the opening and closing of the valve. According to some embodiments of the present invention, the control circuit may control the operation of the valve in a way that the pressure in the last reservoir in the cascade may be within predetermined boundaries, by opening the valve and letting fluid flow out of the reservoir when the pressure in the reservoir is out of the predefined boundaries.

According to some embodiments of the present invention, there is provided a fluid flow meter for measuring fluid (liquid or gas) volumetric flow, which may comprise at least one reservoir, at least one sensor, at least one pump, at least one valve, and control circuit. According to some embodiments of the present invention, the at least one reservoir, the at least one valve, and the at least one pump may be connected in a cascade connection in a way that the outlet of a reservoir may be attached to the inlet of the next downstream pump or valve in the cascade, and the inlet of that reservoir may be attached to the outlet of the previous upstream pump or valve in the cascade. The outlet of a pump may be attached to the inlet of the next downstream reservoir in the cascade, and the inlet of that pump may be attached to the outlet of the previous upstream reservoir in the cascade. The outlet of a valve may be attached to the inlet of the next downstream reservoir in the cascade, and the inlet of that valve may be attached to the outlet of the previous upstream reservoir in the cascade. According to some embodiments of the present invention, the inlet of the first upstream pump or reservoir or valve in the cascade may be attached to the inlet port of the flow meter, and the outlet of the last downstream pump or reservoir or valve in the cascade may be attached to the outlet port of the flow meter.

According to some embodiments of the present invention, the control circuit may control the opening and closing of the at least one valve. According to some embodiments of the present invention, the control circuit may control the operation of the at least one valve in a way that the pressure in the reservoir attached to the valve's inlet, or to the valve's outlet, may be within predetermined boundaries, by opening the valve and letting fluid flow into, or out of, the reservoir when the pressure in the reservoir is out of the predefined boundaries.

According to some embodiments of the present invention, the pump and the reservoir may be substantially near each other. According to some embodiments of the present invention, the reservoir chamber may be directly connected to the pump chamber. According to some embodiments of the present invention, the reservoir chamber and the pump chamber may be constructed as one piece. For instance, the pump chamber and the reservoir chamber may be made of one tube, in which one part of the tube may be the reservoir chamber, and another part of the tube may be the pump chamber. According to some embodiments of the present invention, the pump and the reservoir may be integral.

According to some embodiments of the present invention, the pump may be connected to the reservoir through some length of tube/channel. According to some embodiments of the present invention, the measured fluid may flow from the reservoir's outlet to the pump's inlet through some length of tube. According to some other embodiments of the present invention, the measured fluid may flow from the pump's outlet to the reservoir's inlet through some length of tube/channel. According to some embodiments of the present invention, the control circuit may be located near the reservoir. According to some embodiments of the present invention, the control circuit may be located near the pump. According to some embodiments of the present invention, the control circuit may be located at any place between the pump and the reservoir or in any other location.

FIG. 1 is a functional block diagram of an exemplary flow meter or flow metering assembly including a reservoir (102) to collect fluid exiting a fluid source, a sensor (121) to indicate a volume (actual or threshold) of fluid in the reservoir and a controller (106) to trigger one or more pumping strokes/cycles of a pump (104) upon receiving an indication from the sensor that a specific volume of fluid has collected (e.g. at or above a static or dynamically determined threshold level), wherein the pump (104) is downstream from the reservoir (102) and is adapted to pump a known/substantially-near-fixed amount of fluid out of the reservoir per given pumping stroke and/or per given pumping cycle;

In FIG. 1 there is shown, in accordance with some embodiments of the present invention, an exemplary fluid meter comprising a reservoir (102) connected to a pump (104) through a connecting tube/conduit (103). The fluid may flow from the source side through the inlet (101) to the outlet (105) on the sink side of the meter. The reservoir (102) may be adapted to fill up with fluid flowing in from the source through inlet (101). A sensor (121) may be functionally associated with the reservoir and adapted to estimate the amount of fluid in the reservoir and send a signal indicative of the amount to control circuit (106), alternatively, the sensor may be adapted to estimate/indicate whether the fluid volume in the reservoir has reached, is about to reach or is above, a predefined threshold amount and send a signal indicating so to the control circuit. In response to a sensor signal indicative of one of the above fluid amounts being met, or upon the control circuit determining that the fluid volume in the reservoir has reached, is about to reach or is above, a predefined threshold amount according to a reservoir fluid volume estimation signal it may receive from the sensor (121), the control circuit may send a signal to the pump (104) to perform one or more pumping cycles and/or pumping strokes which will pump a substantially near fixed/known amount(s) of fluid from the reservoir (102), through the outlet (105) and to the sink side; this process may then be repeated. The flow rate may be calculated by summing up the amounts pumped during a given period of time and dividing the result by that time period (e.g. 10 pumping cycles of 6 liters each within a 5 minute time period–(10*6)/5=12 liters per minute).

Figure 2:
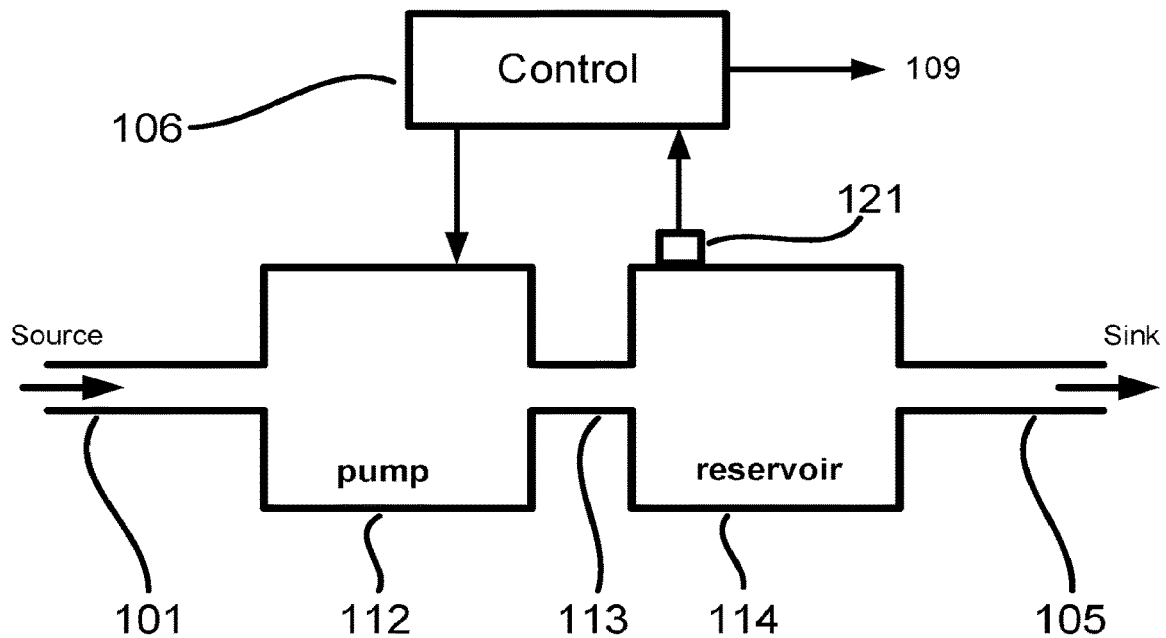
FIG. 2 is a functional block diagram of an exemplary flow meter or flow metering assembly, wherein the pump is upstream from the reservoir, in accordance with some embodiments of the present invention.

FIG. 2 is a functional block diagram of an exemplary flow meter or flow metering assembly including a reservoir (114) to receive and temporarily collect fluid displaced from a fluid source by a fluid pump (112), wherein the pump (112) is upstream from the reservoir (114) and is adapted to displace a known/substantially-near-fixed amount of fluid into the reservoir per given pumping stroke and/or per given pumping cycle, a sensor (121) to indicate a volume (actual or threshold) of fluid in the reservoir, and a controller (106) to trigger one or more pumping strokes/cycles of the pump upon receiving an indication from the sensor that the volume of fluid in the reservoir is at or below a static or dynamically determined threshold level.

In FIG. 2 there is shown, in accordance with some embodiments of the present invention, an exemplary fluid meter comprising a pump (112) connected to a reservoir (114) through a connecting tube/conduit (113). The fluid may flow from the source side through the inlet (101) and exit the flow meter through the outlet (105) to the sink side. A sensor (121) may be functionally associated with the reservoir and adapted to estimate the amount of fluid in the reservoir and send a signal indicative of the amount to control circuit (106), alternatively, the sensor may be adapted to estimate/indicate whether the fluid volume in the reservoir has diminished to, is about to diminish to or is under, a predefined threshold amount and send a signal indicating so to the control circuit (106). In response to a sensor signal indicative of one of the above fluid amounts being met, or upon the control circuit determining that the fluid volume in the reservoir has diminished to, is about to diminish to or is under, a predefined threshold amount according to a reservoir fluid volume estimation signal it may receive from the sensor (121), the control circuit may send a signal to the pump (112) to perform one or more pumping cycles and/or pumping strokes which will pump a substantially near fixed/known amount(s) of fluid from the source side through the inlet (101) and into the reservoir (114); this process may then be repeated as fluid amount in the reservoir (114) diminishes to one of the above threshold amounts. Fluid pumped into the reservoir (114) may flow out of the reservoir through the outlet (105) to the sink side of the flow meter. The flow rate may be calculated by summing up the amounts pumped during a given period of time and dividing the result by that time period.

Figure 3:
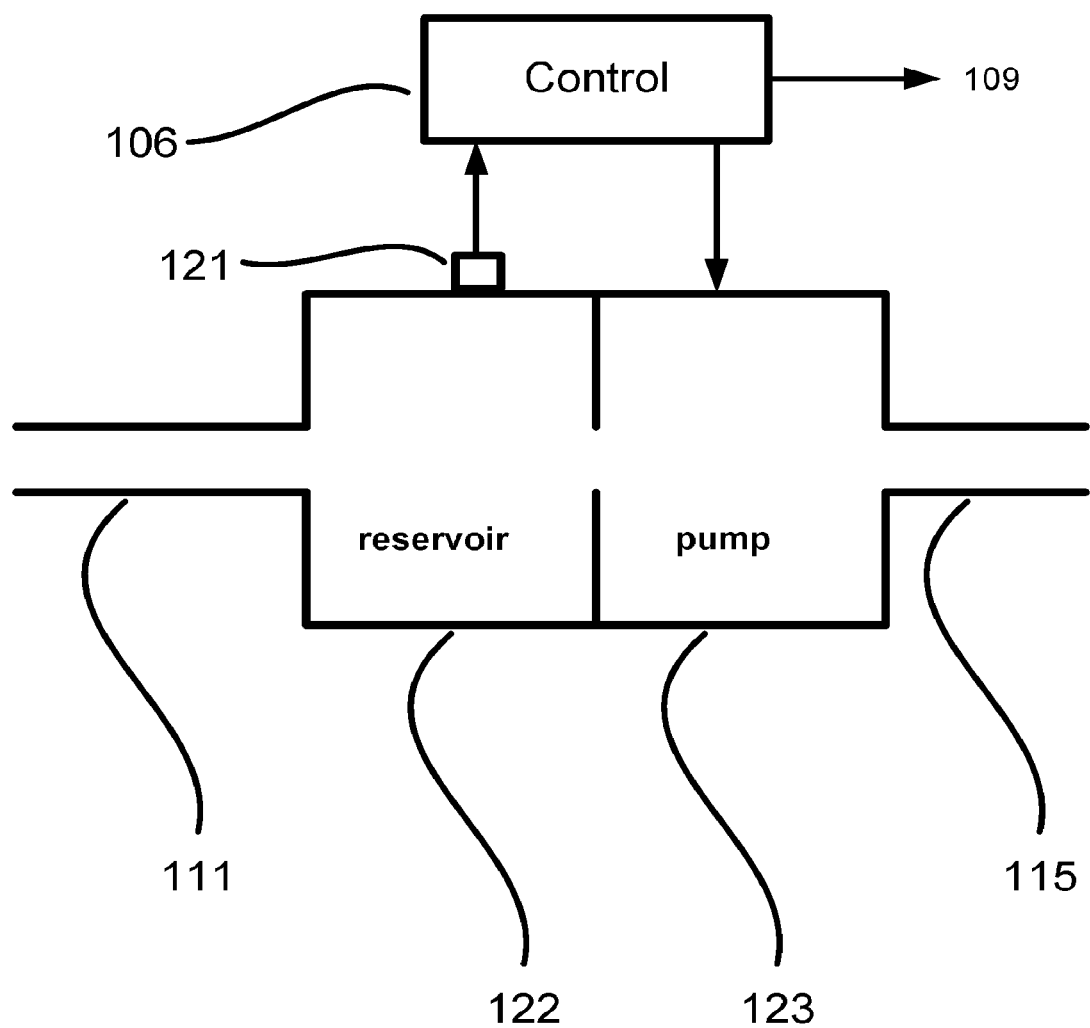
FIG. 3 is a functional block diagram of an exemplary flow meter or flow metering assembly, wherein the pump is directly connected to the reservoir, in accordance with some embodiments of the present invention.

FIG. 3 is a functional block diagram of an exemplary flow meter or flow metering assembly including a reservoir (122) to collect fluid, a sensor (121) to indicate a volume (actual or threshold) of fluid in the reservoir and a controller (106) to trigger one or more pumping strokes/cycles of a pump (123) upon receiving an indication from the sensor that a specific volume of fluid has collected or emptied (e.g. at or above/below a static or dynamically determined threshold level); wherein the pump (123) is directly connected to the reservoir (122) and/or shares a common wall/divider/partition with it (i.e. no conduit between the two), and is adapted to pump a known/substantially-near-fixed amount of fluid out of, or into the reservoir per given pumping stroke and/or per given pumping cycle;

In FIG. 3 there is shown, in accordance with some embodiments of the present invention, an exemplary fluid meter comprising a reservoir (122) and a pump (123), wherein the reservoir (122) and the pump (123) are directly connected to each other. According to some embodiments, the inlet of the device is conduit 111 and the outlet is conduit 115, and the fluid may flow from the inlet (111), fill the reservoir (122), and upon receiving a signal from the sensor (121) that the reservoir has been filled to a level substantially near a predetermined volume, the control circuit (106) may trigger the pump (123) to pump one or more pumping strokes/cycles of fluid from the reservoir to the outlet (115). According to other embodiments, the inlet of the device is conduit 115 and the outlet may be conduit 111. Upon receiving a signal from the sensor (121) that the reservoir has been emptied to a level substantially near a predetermined volume, the control circuit (106) may trigger the pump (123) to pump one or more pumping strokes/cycles of fluid from the inlet (115) to the reservoir (122). The fluid may then flow from the reservoir to the outlet (111).

Figure 4:
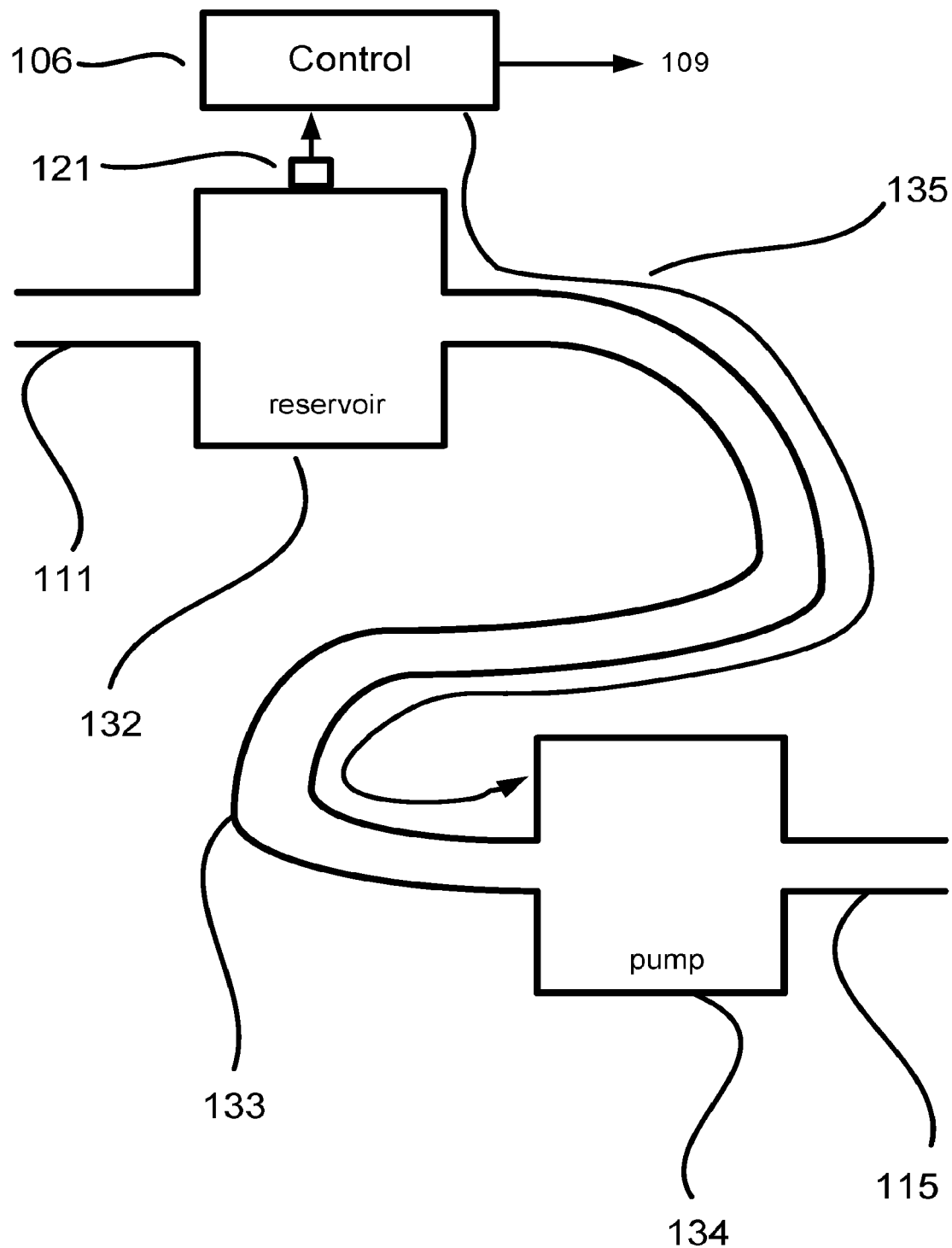
FIG. 4 is a functional block diagram of an exemplary flow meter or flow metering assembly, wherein the pump is connected to the reservoir through an elongated conduit/hose, in accordance with some embodiments of the present invention.

FIG. 4 is a functional block diagram of an exemplary flow meter or flow metering assembly including a reservoir (132) to collect fluid, a sensor (121) to indicate a volume (actual or threshold) of fluid in the reservoir and a controller (106) to trigger one or more pumping strokes/cycles of a pump (134) upon receiving an indication from the sensor that a specific volume of fluid has collected or emptied (e.g. at or above/below a static or dynamically determined threshold level), wherein the pump is connected to the reservoir through an elongated conduit/hose (133) and is adapted to pump a known/substantially-near-fixed amount of fluid out of, or into the reservoir per given pumping stroke and/or per given pumping cycle;

In FIG. 4 there is shown, in accordance with some embodiments of the present invention, an exemplary fluid meter wherein the reservoir (132) and the pump (134) are connected to each other through some length of tubing (133). According to this example the reservoir can be placed in one location while the pump may be placed in a different, possibly remote, location. The control circuit (106) may be placed near the pump (134) or near the reservoir (132) or in a different, possibly remote, place. According to some embodiments the fluid may flow into conduit (111), through the reservoir (132), the pump (134), and out through conduit (115). According to some other embodiments the fluid may flow in the reverse direction, into conduit (115), through the pump (134), the reservoir (132), and out through conduit (111).

Figure 5:
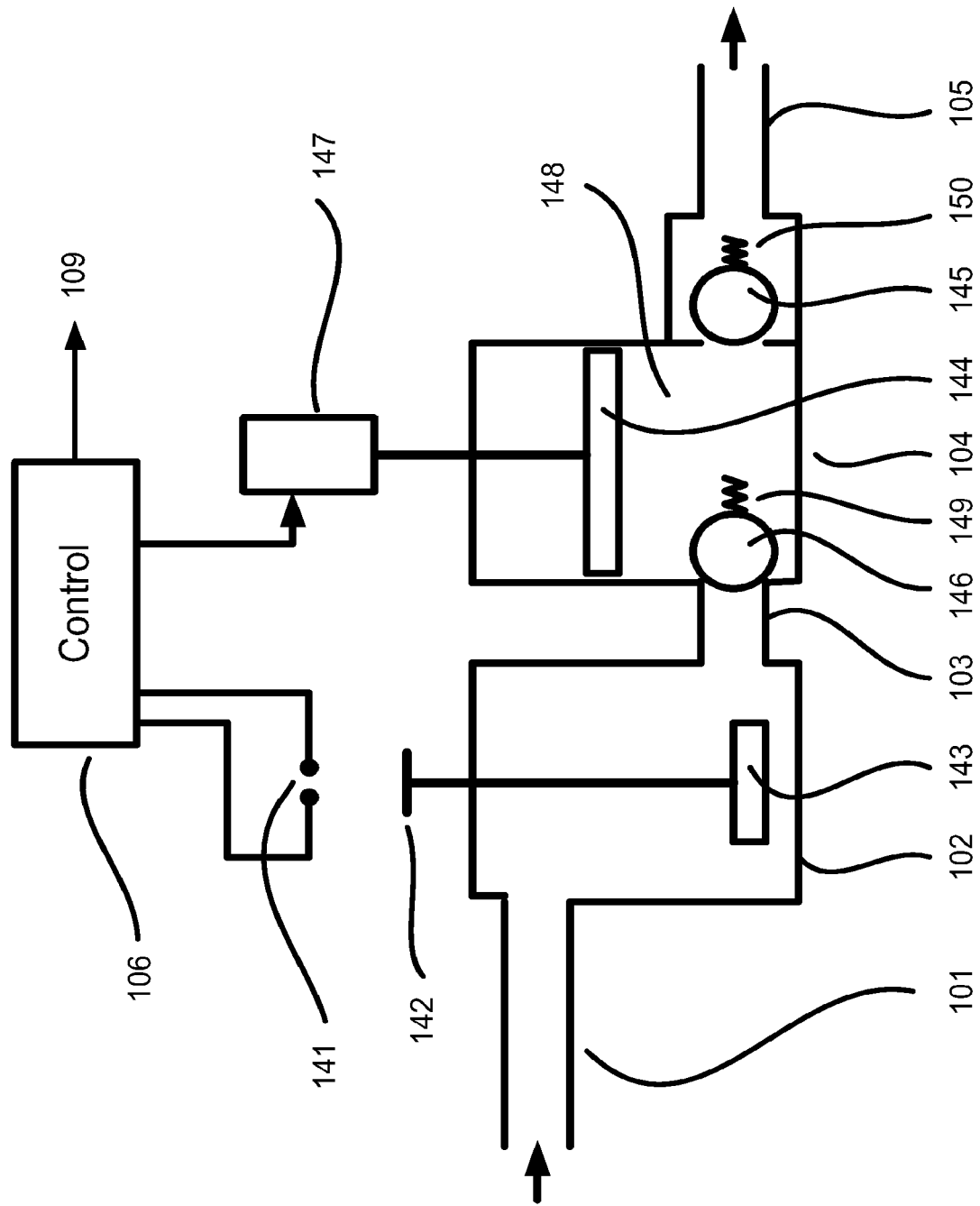
FIG. 5 is a functional block diagram exemplifying a specific embodiment of the flow meter/assembly of FIG. 1, wherein the sensor is comprised of a float structure, in accordance with some embodiments of the present invention.

FIG. 5 is a functional block diagram exemplifying a specific embodiment of the flow meter/assembly of FIG. 1, wherein the sensor is comprised of a float structure whose upward displacement closes an electric switch upon reaching specific floating height, and wherein said pump is a piston based pump with a piston, a piston actuator and unidirectional flow valves at the pump inlet and outlet;

In FIG. 5 there is shown, in accordance with some embodiments of the present invention, an exemplary fluid meter wherein measured fluid may flow into the reservoir (102) through a conduit (101). According to this example, the reservoir (102) comprises a float (143) that may float on the fluid in the reservoir. When fluid flows into the reservoir, the float may rise and may cause the electrical connector/contactor (142) to short-circuit electric switch/contacts (141). When the electrical circuit between electric switch/contacts (141) is closed, a signal may be sent to the control circuit (106) which in turn, may send a signal to the pump (104) actuator (147). According to some embodiments the pump (104) may be a reciprocating type of pump such as a piston, syringe, plunger or membrane (diaphragm) pump. According to some embodiments upon receiving a signal from the control circuit (106), the pump may perform at least one pumping stroke/cycle by either, first sucking and then discharging, or it may first discharge and then suck, as part of each stroke. In the example of FIG. 5 a piston (144) pump is shown. During each pumping stroke the pump may perform a suck phase and discharge phase, or first discharge the fluid which was sucked in the previous stroke and then suck. A sucking operation may include having the actuator (147) pull up the piston (144), this may cause the pressure in the pump chamber/space (148) below the piston to decrease and perform a suction operation. Since during a suction operation the pressure in the reservoir may be higher than the pressure in the pump's chamber/space (148), the pump's inlet unidirectional valve (146) may open and let fluid flow from the reservoir (102) into the pump's chamber/space (148) until the pressure in the pump's chamber/space (148) equals to the pressure in the reservoir. When the piston (144) reaches its top position in the pumping stroke, the pump's chamber/space (148) may be full with fluid sucked from the reservoir and the fluid level in the reservoir (102) may decrease causing the float (143) to decline and the circuit between switch/contacts (141) to open. A discharge operation may include having the actuator (147) push down the piston (144), this may cause the fluid contained in the pump's chamber/space (148) to push open the pump's outlet unidirectional valve (145) and flow out through conduit (105). Springs (149) and/or (150) are optional and may be used in some embodiments to hold the inlet (146) and/or outlet (145) valves respectively, in a normally closed position. According to some embodiments, one or both of the valves may be held closed due to the fluid's pressure.

Figure 6:
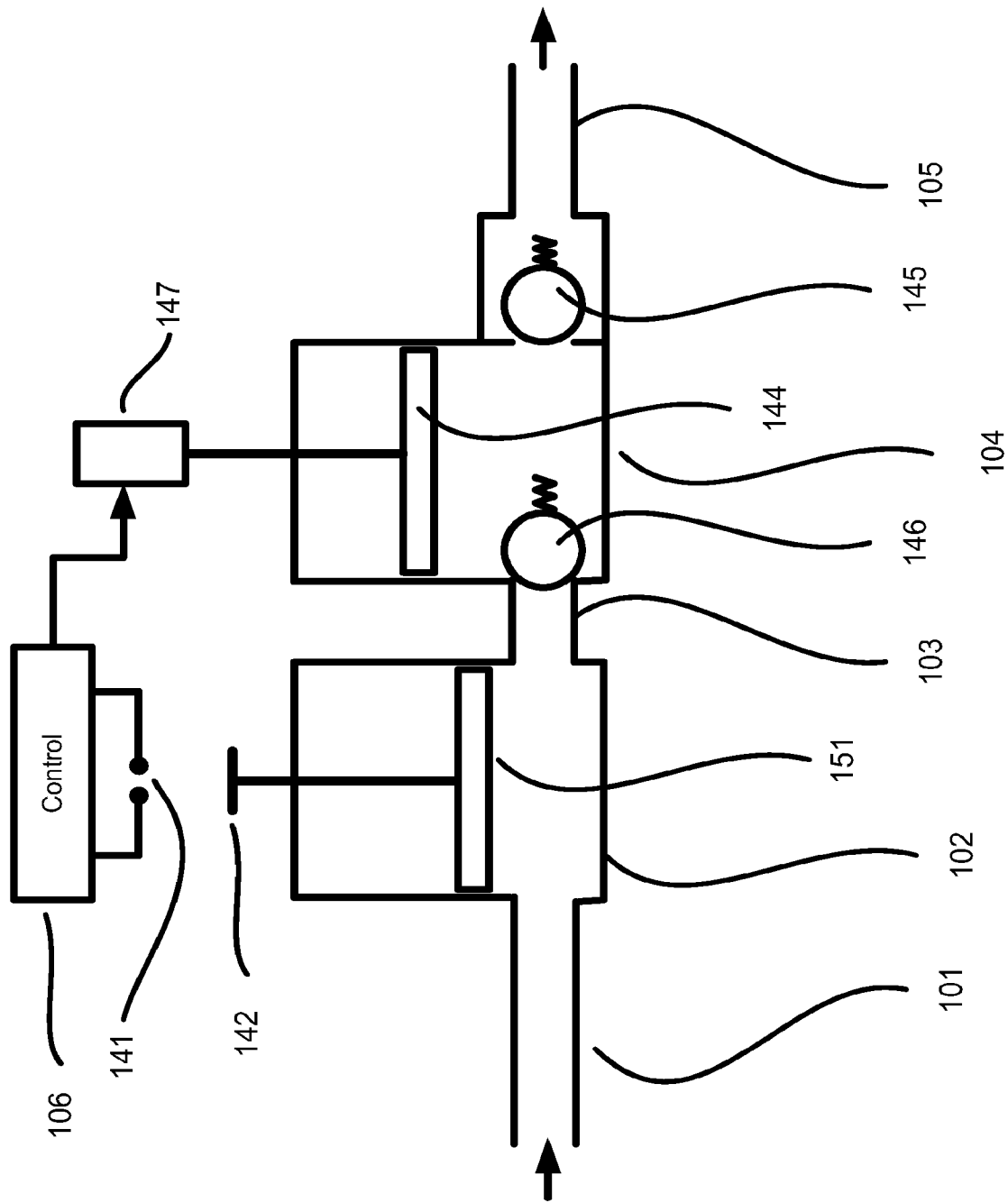
FIG. 6 is a functional block diagram exemplifying a derivative embodiment of the flow meter/assembly of FIG. 5, wherein the float type sensor of FIG. 5 is replaced with a piston type structure, in accordance with some embodiments of the present invention.

FIG. 6 is a functional block diagram exemplifying a derivative embodiment of the flow meter/assembly of FIG. 5, wherein the float type sensor of FIG. 5 is replaced with a piston type structure whose upward displacement closes an electric switch upon reaching a specific displaced state;

In FIG. 6 there is shown, in accordance with some embodiments of the present invention, an exemplary fluid meter wherein the reservoir (102) comprises a piston (151). Fluid flowing in from the inlet conduit (101) and into the reservoir (102) may fill the reservoir and may cause the piston (151) to move up until it reaches a point in which the electrical connector/contactor (142) short-circuits the electrical switch/contacts (141). The piston (151) may move up due to the pressure of the fluid entering the reservoir (102) from the inlet conduit (101), and may move down due to the suction force caused by the pump (104) that may draw fluid out of the reservoir (102) through the connecting conduit (103).

According to some embodiments, a sensor may be adapted to indicate that the reservoir (e.g. 102) contains a volume of fluid which is either more, or less, than a predefined amount. In the specific examples shown in FIGS. 5 and 6, the sensor is constructed of a connector/contactor (142) and switch/contacts (141), however, other types of sensor may be used. According to some other embodiments, there may be a sensor adapted to estimate the amount of fluid in the reservoir (e.g. 102) and send a signal indicative of said amount to a control circuit (106).

Figure 7:
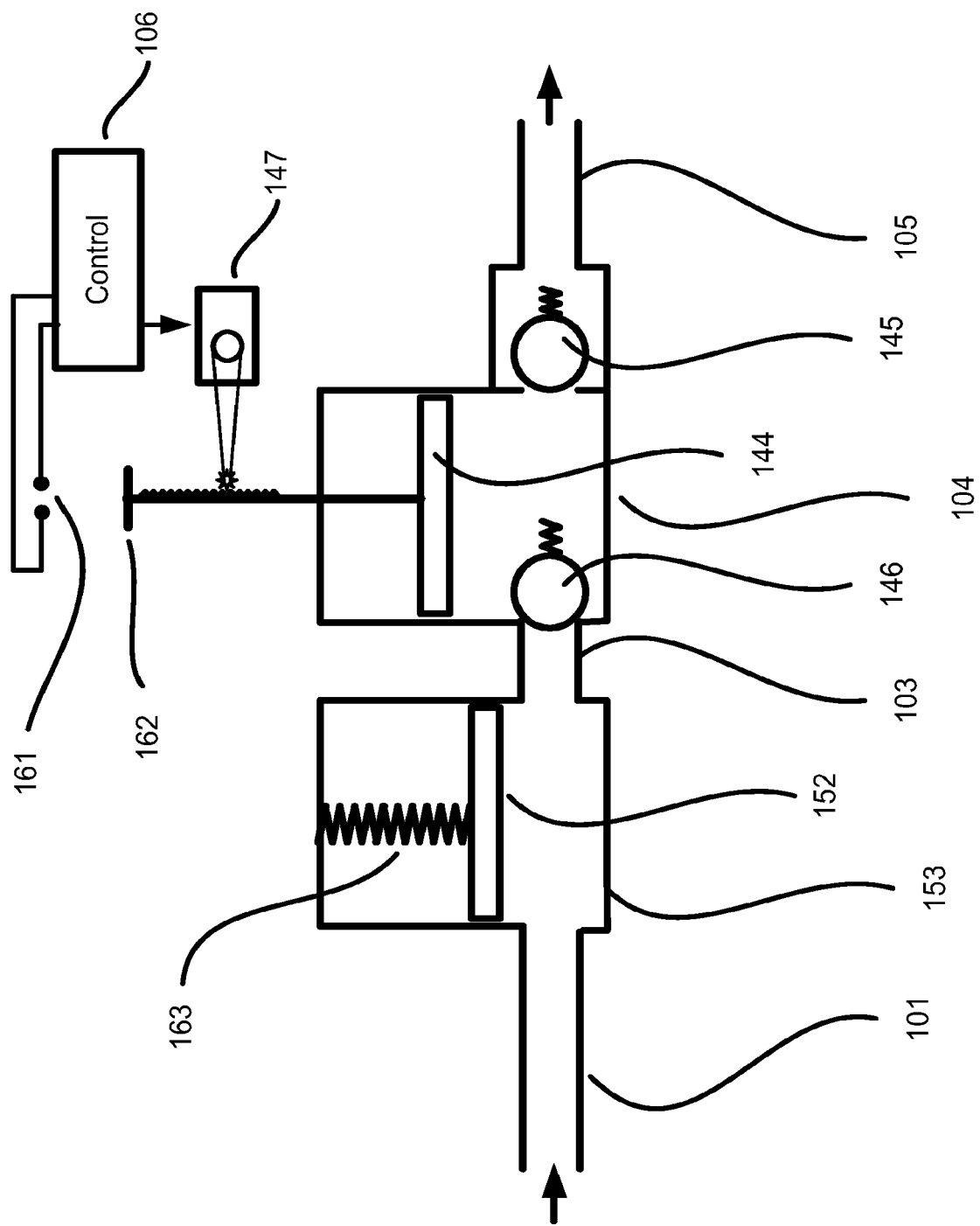
FIG. 7 is a functional block diagram exemplifying an embodiment of a flow meter/assembly configuration, wherein the sensor is functionally associated with the pump, in accordance with some embodiments of the present invention.

FIG. 7 is a functional block diagram exemplifying an embodiment of a flow meter/assembly configuration wherein the sensor is functionally associated with the pump (104) which is positioned downstream of a reservoir (153). The pump may be of a piston type pump and includes: (a) an inlet unidirectional valve (146) with a first biasing force (i.e. lower than force exerted by the fluid to be metered), an outlet unidirectional valve (145) with a second biasing force which is greater than the first biasing force (i.e. greater than force exerted by the fluid to be metered), a piston type sensor. The reservoir is biased by a biasing structure (e.g. a spring biased piston) having a biasing force higher than that of the pump inlet valve, such that fluid entering the reservoir under positive pressure is directed into the pump chamber. Fluid entering the pump chamber while the piston actuator (147) is inactive (i.e. in idle mode) causes the pump piston (144) to rise. Upon the pumping piston reaching a threshold level, a switch type (binary) sensor (161) functionally associated with the pump piston is triggered, thereby causing a controller (106) to activate the piston actuator and start a discharge phase of the piston type pump. During the discharge, collected fluid in the pumping chamber is forced to exit through the pump outlet unidirectional valve (145). Since the pump's unidirectional inlet valve (146) is forced shut during discharge, fluid entering the biased reservoir displaces the biasing structure (152), which biasing structure later urges fluid collected in the reservoir (during discharge) into the pumping chamber once the discharge phase is completed and the piston actuator is deactivated;

In FIG. 7 there is shown, in accordance with some embodiments of the present invention, an exemplary fluid meter. According to the embodiments within the spirit of this example, fluid may flow from the inlet conduit (101) through the reservoir (153) and the connecting conduit (103) into the pump (104). The fluid flowing into the pump may cause the pump's piston (144) to rise until electrical connector/contactor (162) short-circuits the electric switch/contacts (161). When the electric circuit is closed between the switch/contacts (161), it may send a signal to the control circuit (106) which in turn may send a signal to the pump actuator (147) causing the piston (144) of the pump (104) to go down and discharge the fluid through the outlet conduit (105). The reservoir (153) may be needed in order to absorb the fluid coming in from the source through the inlet conduit (101) while the pump (104) is in the discharge phase of operation. When the pump (104) is in the discharge phase, the fluid coming in from the source through the inlet conduit (101) may fill the reservoir (153) and the piston (152) may rise causing the spring (163) to squeeze. When the pump (104) ends the discharge phase, the fluid in the reservoir (153) may be pushed by the spring (163) and the piston (152) into the pump (104).

in this example the reservoir's chamber volume may, but not have to, be smaller than the pump's chamber volume since the reservoir needs to absorb the fluid flowing into it only during the time of the discharge stroke of the pump.

There may be numerous ways of designing the pump and/or the reservoir. FIGS. 8-13 and 16-19 will describe several examples of principles which may be used for such designs. As will be seen from the following figures, similar designs can be used for the pump or the reservoir or for both. Various other pump and/or reservoir designs, known today or to be devised in the future, may be used as part of the present invention.

Figure 8A:
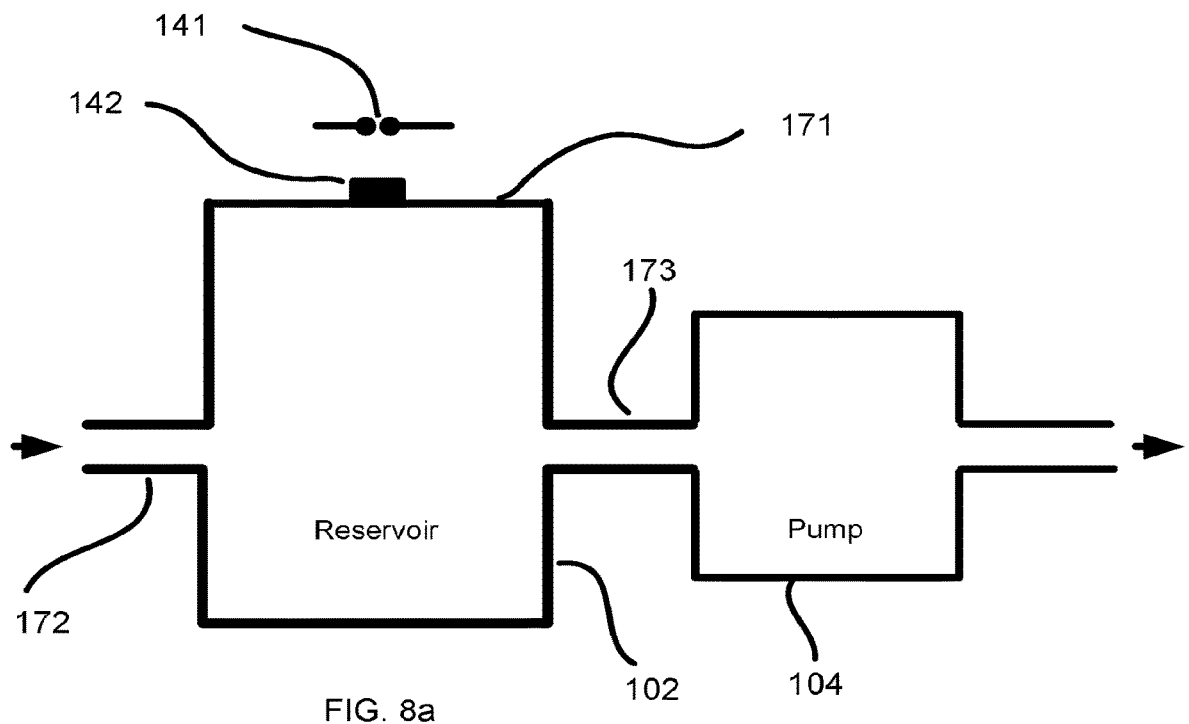
FIGS. 8a and 8b are diagrams of an exemplary flexible reservoir and sensor assembly, in accordance with some embodiments of the present invention.
Figure 8B:
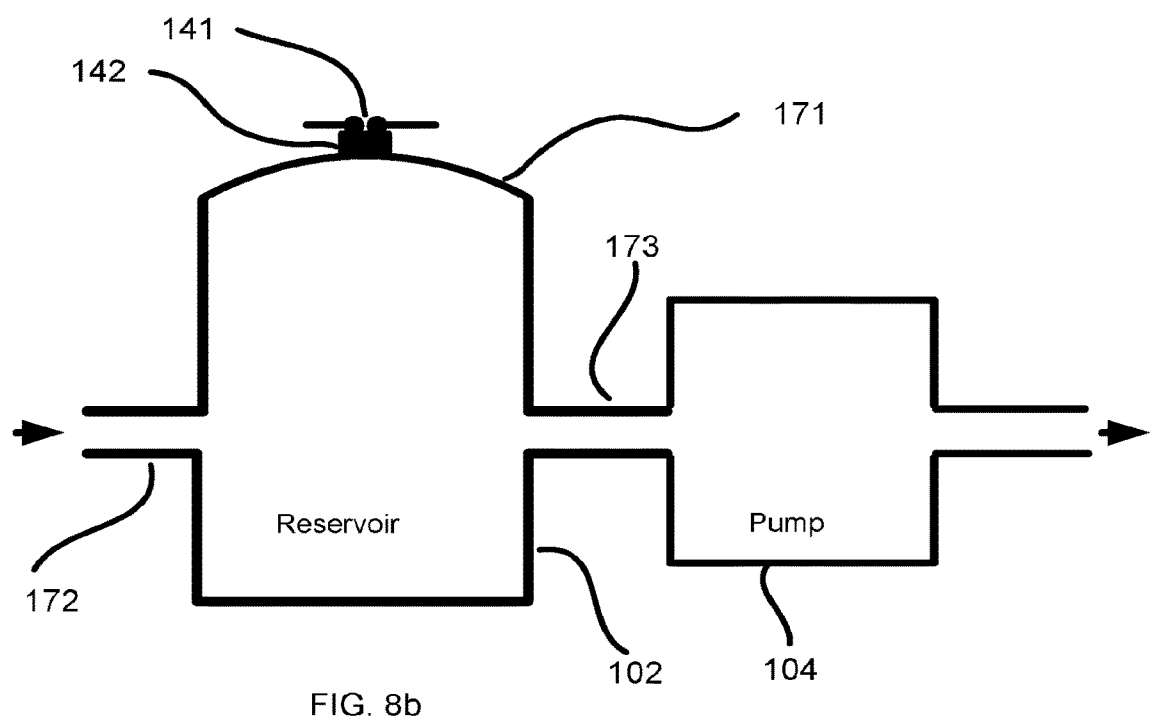

FIGS. 8a and 8b are diagrams of an exemplary flexible reservoir (102) and sensor assembly (141, 142) according to embodiments of the present invention. FIG. 8a shows the flexible reservoir in a native/relaxed (non-filled) state, such that the functionally associated switch/binary sensor is not closed/triggered. FIG. 8b shows the flexible reservoir in a stretched/strained (filled) state, such that the functionally associated switch/binary sensor is closed/triggered, thereby causing a controller to initiate anyone of the pumping sequences described in connection with each of the embodiments mentioned within this application and bring the flexible reservoir towards a native/relaxed (non-filled) state;

In FIG. 8 there is shown, in accordance with some embodiments of the present invention, an exemplary reservoir and sensor wherein the reservoir (102) comprises a flexible diaphragm (171), and a functionally associated sensor assembly for estimating when the reservoir (102) fills up to a certain level, comprising an electrical connector/contactor (142) and electric switch/contacts (141). When fluid flows into the reservoir (102) from the inlet (172), the diaphragm (171) may stretch up as shown in FIG. 8b. When fluid flows out of the reservoir (102) from the connecting conduit (173) the diaphragm may relax down as illustrated in FIG. 8a. FIGS. 8a and 8b also show an example of an optional way for estimating whether the reservoir (102) has filled to or beyond a predetermined volume. FIG. 8a shows the reservoir (102) in a non-filled state and the circuit between the electric switch/contacts (141) open. FIG. 8b shows the reservoir (102) in a filled state in which the fluid volume in the reservoir (102) may reach a predetermined level and the circuit between the electric switch/contacts (141) closed, thus triggering the operation of the pump (104).

Figure 9A:
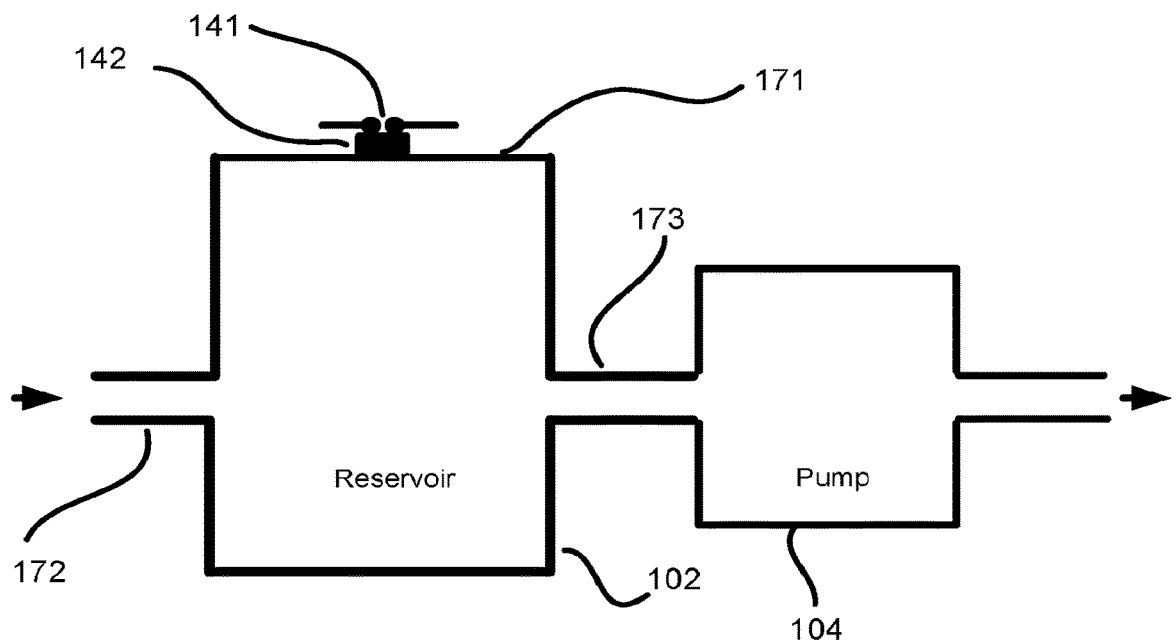
FIGS. 9a and 9b are diagrams of an exemplary flexible reservoir and sensor assembly, in accordance with some embodiments of the present invention.
Figure 9B:
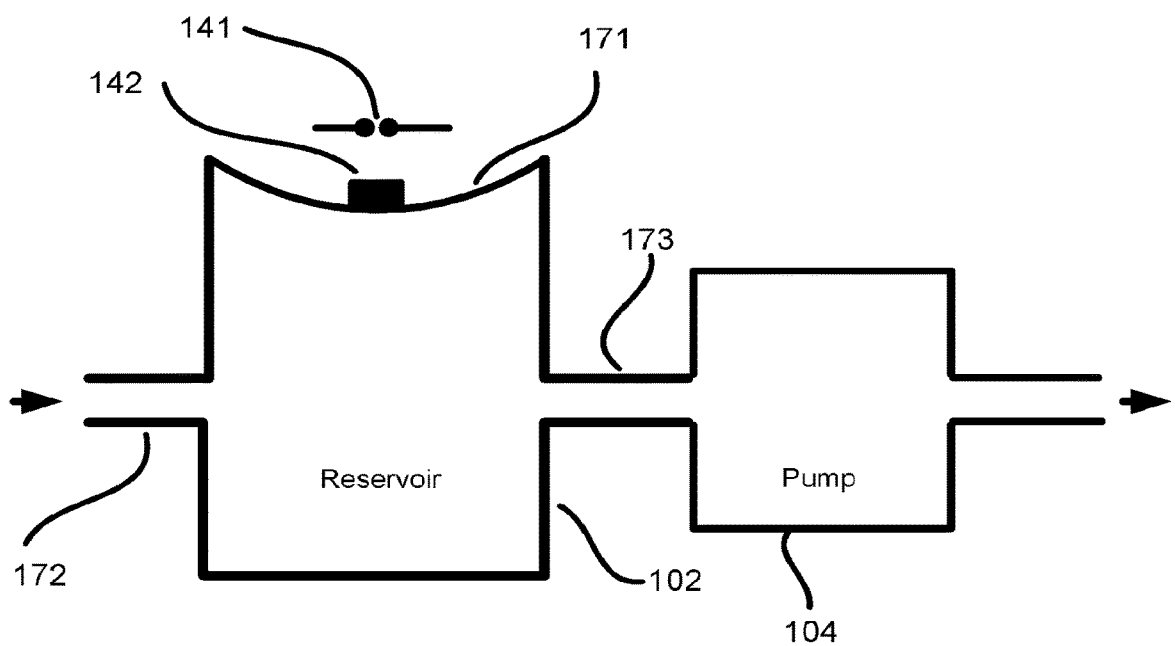

FIGS. 9a and 9b are diagrams of an exemplary flexible reservoir (102) and sensor assembly (141, 142) according to embodiments of the present invention. FIG. 9a shows the flexible reservoir in a native/relaxed (filled) state, such that the functionally associated switch/binary sensor is closed/triggered, thereby causing a controller to initiate anyone of the pumping sequences described in connection with each of the embodiments mentioned within this application, and bringing the flexible reservoir into a stretched (non-filled) state, as shown in FIG. 9b. FIG. 9b shows the flexible reservoir in a stretched/non-filled state where the lower internal pressure (partial vacuum) causes one of the reservoir walls to deform inward and away from a sensor trigger point;

In FIG. 9 there is shown, in accordance with some embodiments of the present invention, an exemplary reservoir and sensor wherein the reservoir (102) comprises a flexible diaphragm (171). A sensor assembly for estimating when the reservoir (102) fills up to a certain level comprises an electrical connector/contactor (142) and electric switch/contacts (141). When fluid flows out of the reservoir (102) and through the connecting conduit (173), the flexible diaphragm (171) may stretch downwards as illustrated in FIG. 9b. When fluid flows into the reservoir (102) from the inlet (172) the flexible diaphragm (171) may relax up as illustrated in FIG. 9a. FIGS. 9a and 9b also show an example of an optional way for estimating whether the reservoir (102) has filled to or beyond a predetermined volume. FIG. 9b shows the reservoir (102) in a non-filled state and the circuit between the electric switch/contacts (141) open. FIG. 9a shows the reservoir (102) in a filled state in which the fluid volume in the reservoir (102) may reach a predetermined level and the circuit between the electric switch/contacts (141) closed, thus triggering the operation of the pump (104).

Figure 10A:
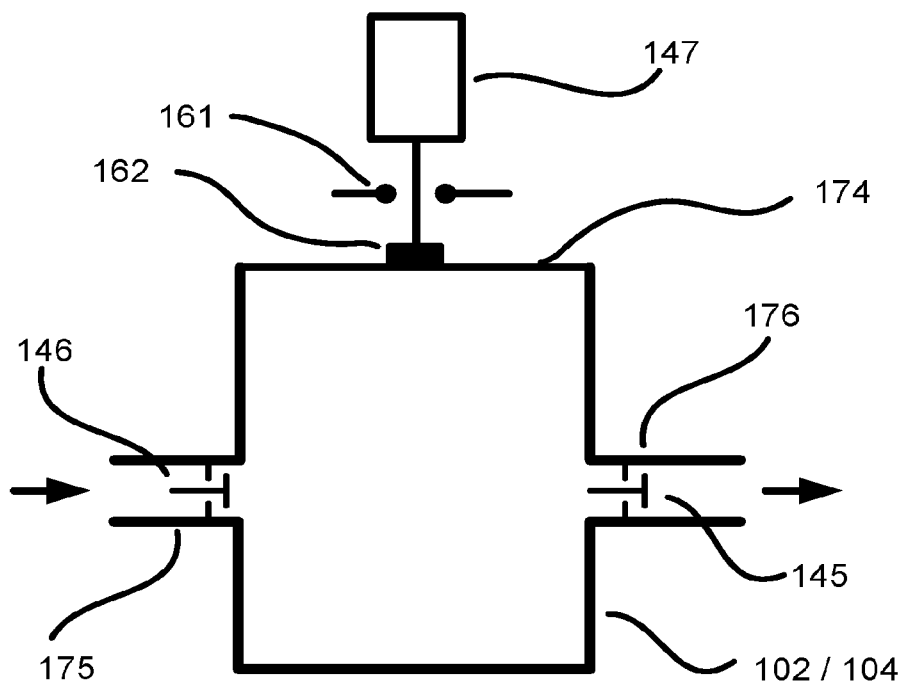
FIGS. 10a and 10b are diagrams of an exemplary combination of a flexible reservoir with a pump and a sensor assembly, in accordance with some embodiments of the present invention.
Figure 10B:
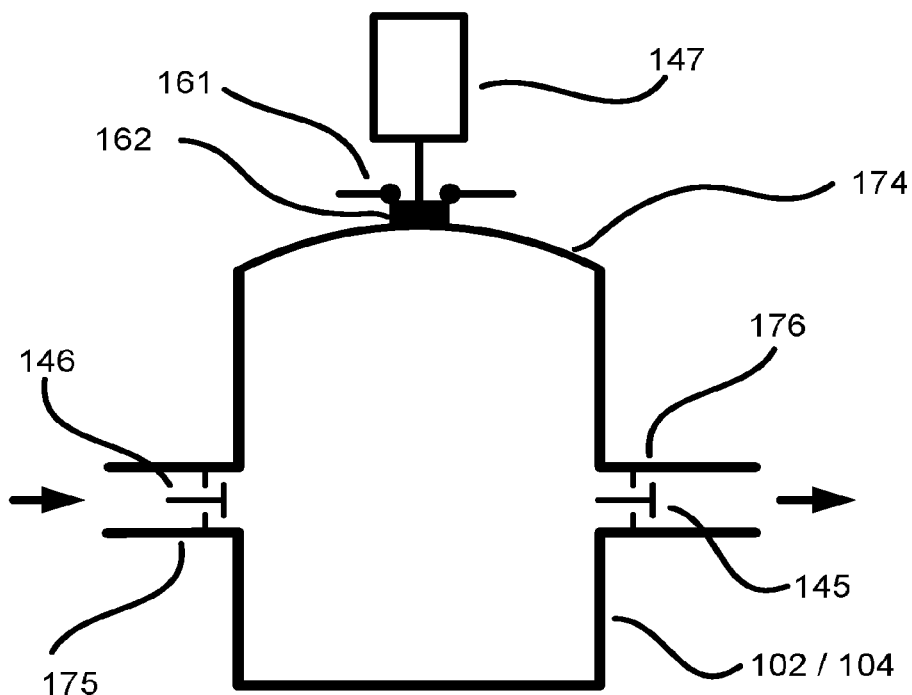

FIGS. 10a and 10b are diagrams of an exemplary combination of a flexible reservoir (102) with a pump (104) and a sensor assembly (161, 162) according to embodiments of the present invention. FIG. 10a shows the flexible reservoir in a native/relaxed (non-filled) state, such that the functionally associated switch/binary sensor (161) is not closed/triggered. FIG. 10b shows the flexible reservoir in a stretched/strained (filled) state, such that the functionally associated switch/binary sensor is closed/triggered. According to embodiments, wherein fluid source is at positive pressure, the pump's actuator (147) may remain idle as fluid is driven through the inlet and a first unidirectional valve (146) and into the reservoir through its inlet, causing the flexible reservoir to fill and at least one of its walls/sides, or part(s) thereof to stretch. The closing/triggering of the functionally associated switch/binary sensor may cause a controller to activate the actuator and initiate a pumping sequence by pushing down the stretched wall and thus discharging a known/substantially-near-fixed amount of fluid from the pump/reservoir through a second unidirectional valve (145) of greater resistance on the reservoir's outlet, which may have prevented the escape of the positively pressurized fluid as it was filling up the reservoir. According to embodiments, wherein fluid source is at a negative pressure, the pump's actuator may pull up and may cause/assist the driving of fluid through the inlet and a first unidirectional valve and into the reservoir through its inlet. The closing/triggering of the functionally associated switch/binary sensor may cause a controller to activate the actuator and initiate a discharge sequence by pushing down and thus discharging a known/substantially-near-fixed amount of fluid from the pump/reservoir through a second unidirectional valve on the reservoir's outlet. The second unidirectional valve may have prevented fluid from entering the reservoir through the outlet as fluid was being pulled into the reservoir by the pulling of the actuator, the second valve on the reservoir's outlet was sealed as a result of the negative pressure created in the reservoir.

In FIG. 10 there is shown, in accordance with some embodiments of the present invention, an exemplary fluid meter comprising an exemplary diaphragm (174) pump (104) and reservoir (102) combination, and optionally means for estimating when the reservoir/pump (102/104) fills up to or beyond a predetermined level, such as an electric connector/contactor (162) and an electric switch/contacts (161). FIG. 10a shows the exemplary pump reservoir combination (102/104) in a non-filled state, and the circuit between the optional electric connectors/contacts (161) open. FIG. 10b shows the exemplary pump reservoir combination (102/104) in a filled, or partially filled, state; after it has filled, or while filling, with fluid entering through the inlet (175). The fluid filling up the combined pump and reservoir (102/104) may cause the diaphragm (174) to stretch upwards due to the pressure of the fluid. The fluid volume in the reservoir/pump may reach a predetermined level and the connector/contactor (162) may then establish an electrical contact between contacts (161) causing the circuit of the electric switch/contacts (161) to be closed. The closed circuit may signal to a control circuit (not shown) that the reservoir/pump has filled up to, or beyond, a predetermined level. In response to receiving a signal indicating that the pump has filled up to, or beyond, a predetermined level, the control circuit may send a signal to the actuator (147) instructing it to push the flexible diaphragm (174) down. When the actuator (147) pushes the flexible diaphragm (174) down, the fluid may be forced out through the outlet (176) as illustrated in FIG. 10a. In another example, the structure of FIG. 10 may be implemented as a diaphragm pump, without the means for estimating the fluid volume in the pump (i.e. without connector/contactor 162 and electric switch contacts 161). According to this example, when the actuator (147) pulls the flexible diaphragm (174) up performing the suction phase of a stroke, the discharge valve (145) may close and fluid may be sucked in from the inlet (175) through the suction valve (146). In the discharge phase of a stroke the actuator (147) may push down the flexible diaphragm (174), the pressure of the fluid in the pump may close the suction valve (146) and open the discharge valve (145) through which the fluid may be discharged to the outlet (176). According to some embodiment, this type of diaphragm pump may serve as the pump in connection with each of the embodiments mentioned within this application.

Figure 11A:
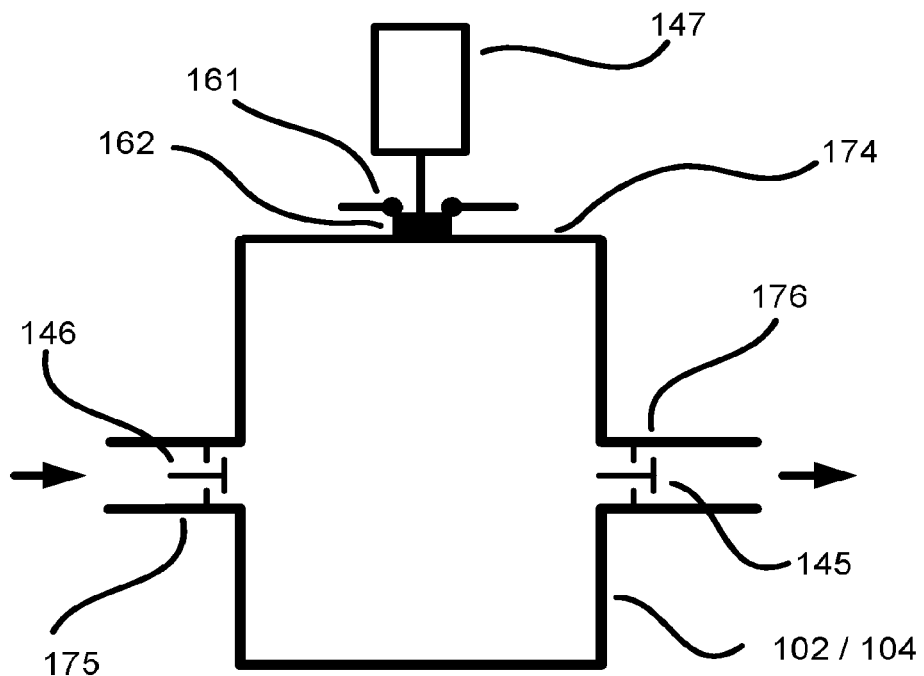
FIGS. 11a and 11b are diagrams of an exemplary combination of a flexible reservoir with a pump and a sensor assembly, in accordance with some embodiments of the present invention.
Figure 11B:
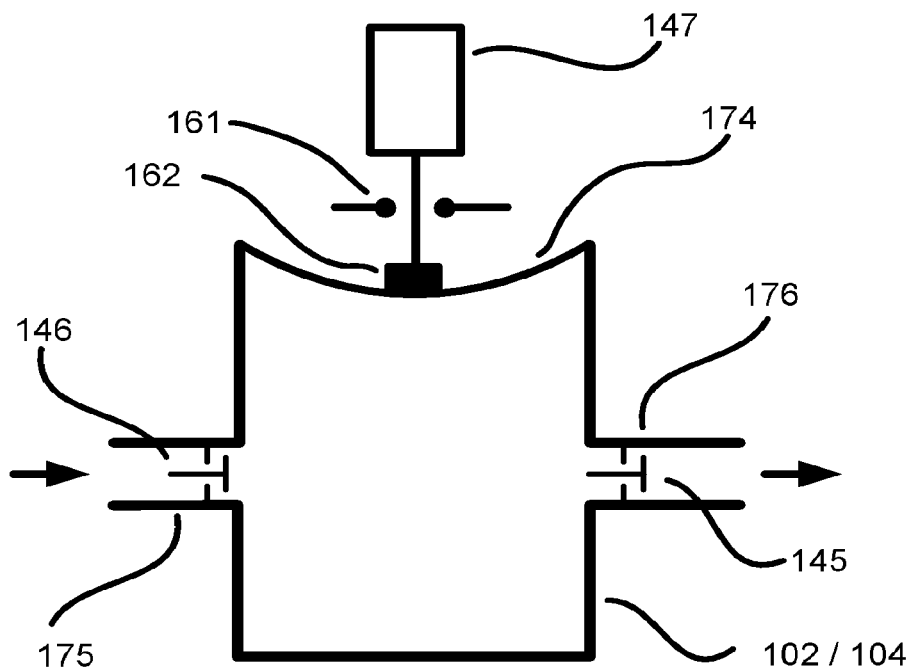

FIGS. 11a and 11b are diagrams of an exemplary combination of a flexible reservoir (102) with a pump (104) and a sensor assembly (161, 162) according to embodiments of the present invention. FIG. 11a shows the flexible reservoir in a native/relaxed (filled) state, such that the functionally associated switch/binary sensor is closed/triggered. FIG. 11b shows the flexible reservoir in a stretched/strained (non-filled) state, such that the functionally associated switch/binary sensor is not closed/triggered. According to embodiments, the pump's actuator (147) may remain idle as fluid is driven through the inlet and a first unidirectional valve (146) and into the reservoir through its inlet by its positive source pressure and/or by the suction force caused by the flexible reservoir expanding towards its native/relaxed position. The closing/triggering of the functionally associated switch/binary sensor may cause a controller to trigger the actuator and initiate a pumping sequence by pushing down and thus discharging a known/substantially-near-fixed amount of fluid from the pump/reservoir through a second unidirectional valve (145).

In FIG. 11 there is shown, in accordance with some embodiments of the present invention, an exemplary fluid meter comprising an exemplary diaphragm (174) pump (104) and reservoir (102) combination and optionally means for estimating when the reservoir/pump (102/104) fills up to or beyond a predetermined level, such as an electric connector/contactor (162) and an electric switch/contacts (161). FIG. 11a shows the exemplary pump reservoir combination (102/104) in a filled, or partially filled, state, and the circuit between the optional electric connectors/contacts (161) closed; after it has filled, or while filling, with fluid entering through the inlet (175). FIG. 11b shows the exemplary pump reservoir combination (102/104) in a non-filled state, during or at the end of a discharge phase, with the circuit of the electrical switch/contacts (161) open. In a discharge phase according to this example, the actuator (147) may push down and stretch the flexible diaphragm (174) as shown in FIG. 11b. After the discharge phase the actuator (147) may release the force it applied to the flexible diaphragm (174), allowing a charge phase of the pumping stroke to take place. FIG. 11 a shows the state wherein fluid has flown, or is flowing, into the combined pump and reservoir (102/104) from the inlet (175). The fluid filling up the combined pump and reservoir (charge phase) may allow/cause the flexible diaphragm (174) to relax upwards due to the pressure of the fluid and/or due to the elasticity force of the flexible diaphragm (174). The fluid volume in the combined pump and reservoir (102/104) may reach a predetermined level and the connector/contactor (162) may establish electrical contact between switch/contacts (161) causing the circuit of the electrical switch/contacts (161) to close. The closed circuit between the electric switch/contacts (161) may signal to a control circuit (not shown) that the fluid level in the combined pump and reservoir (102/104) has been filled/charged to, or beyond, a predetermined level. The control circuit may, in response, send a signal to the actuator (147) instructing it to push the flexible diaphragm (174) down. When the actuator (147) pushes the flexible diaphragm (174) down (discharge phase), fluid may be forced out through the outlet (176), as illustrated in FIG. 11b.

Figure 12A:
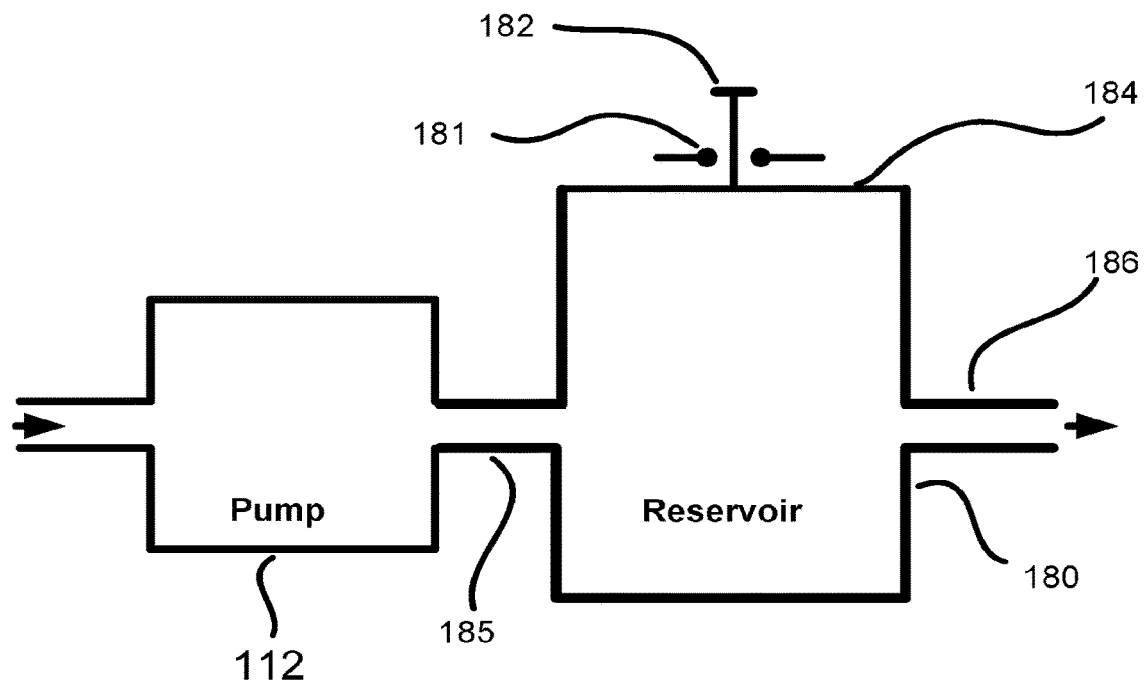
FIGS. 12a and 12b are diagrams of an exemplary flexible reservoir and sensor assembly, in accordance with some embodiments of the present invention.
Figure 12B:
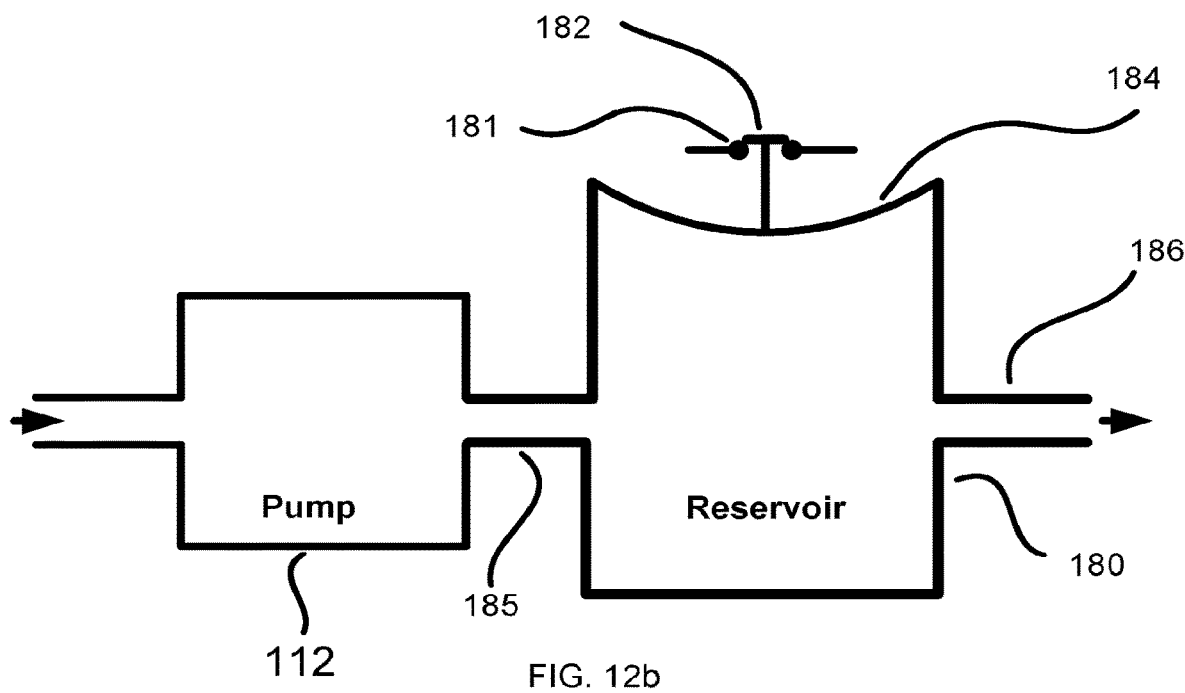

FIGS. 12a and 12b are diagrams of an exemplary flexible reservoir (180) and sensor assembly (181, 182) according to embodiments of the present invention. FIG. 12a shows the flexible reservoir (180) in a native/relaxed (filled) state, such that the functionally associated switch/binary sensor (181) is not closed/triggered. FIG. 12b shows the flexible reservoir in a stretched/strained (non-filled) state, such that the functionally associated switch/binary sensor is closed/triggered, thereby causing a controller to initiate anyone of the pumping sequences described in connection with each of the embodiments mentioned within this application and bring the flexible reservoir towards a native/relaxed (filled) state;

In FIG. 12 there is shown, in accordance with some embodiments of the present invention, an exemplary reservoir (180) that may comprise a flexible diaphragm (184) and means for estimating whether the reservoir (180) has emptied to, or beyond, a certain level. The means for estimating that the reservoir (180) has emptied to, or beyond, a certain level may be an electric connector/contactor (182) and electric switch/contacts (181). FIG. 12b shows the state in which the fluid in the reservoir (180) has emptied to, or beyond, a level that may cause the circuit between the electric switch/contacts (181) to close and trigger the operation of the pump (112). FIG. 12a shows the state in which the reservoir (180) is at least partially filled and the circuit between the electric switch/contacts (181) is open. According to some embodiments, by adding an actuator and unidirectional valves to the illustrated reservoir (180) of FIG. 12, a combined pump and reservoir may be constructed in which the emptying of fluid from the combined pump and reservoir to or beyond a certain level may be detected (opposite from the combined pump/reservoir of FIG. 11).

Figure 13A:
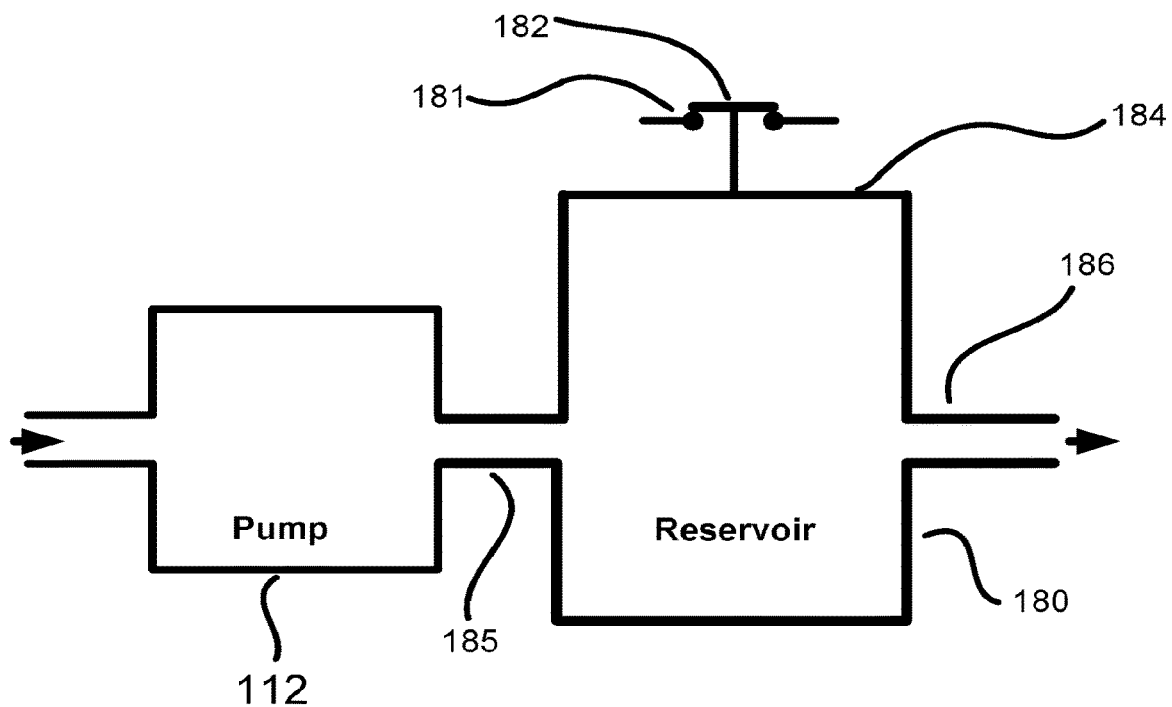
FIGS. 13a and 13b are diagrams of an exemplary flexible reservoir and sensor assembly, in accordance with some embodiments of the present invention.
Figure 13B:
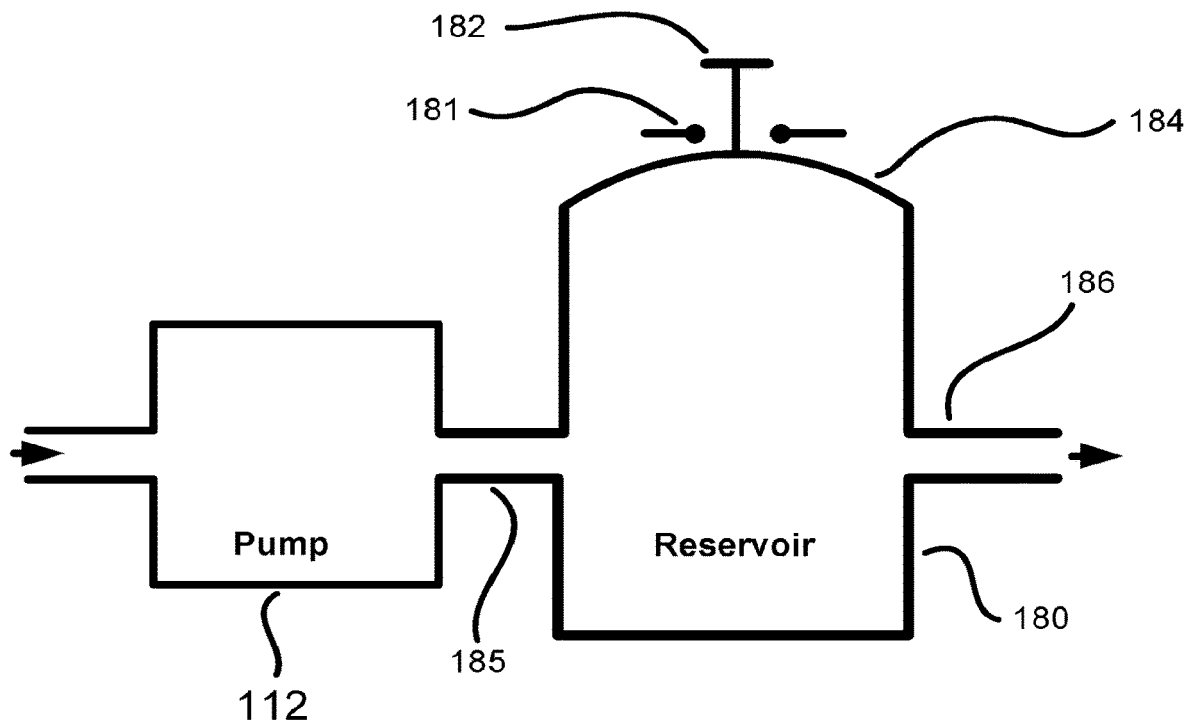

FIGS. 13a and 13b are diagrams of an exemplary flexible reservoir (180) and sensor assembly (181, 182) according to embodiments of the present invention. FIG. 13a shows the flexible reservoir (180) in a native/relaxed (non-filled) state, such that the functionally associated switch/binary sensor (181) is closed/triggered, thereby causing a controller to initiate anyone of the pumping sequences described in connection with each of the embodiments mentioned within this application and bring the flexible reservoir into a stretched/strained (filled) state. FIG. 13b shows the flexible reservoir in a stretched/strained (filled) state, such that the functionally associated switch/binary sensor is not closed/triggered.

In FIG. 13 there is shown, in accordance with some embodiments of the present invention, an exemplary reservoir (180) that may comprise a flexible diaphragm (184) and means for estimating whether the reservoir (180) has emptied to, or beyond, a certain level. The means for estimating that the reservoir (180) has emptied to, or beyond, a predetermined level may be an electric connector/contactor (182) and electric switch/contacts (181). FIG. 13a shows the state in which the reservoir (180) is not filled and the circuit between the electric switch/contacts (181) is closed. FIG. 13b shows the state in which the reservoir (180) is filled, or partially filled, and the circuit between the electric switch/contacts (181) is open. According to some embodiments, by adding an actuator and unidirectional valves to the illustrated reservoir (180) of FIG. 13, a combined pump and reservoir may be constructed in which the emptying of fluid from the combined pump and reservoir to or beyond a certain level may be detected (opposite from the combined pump/reservoir of FIG. 10).

Figure 14:
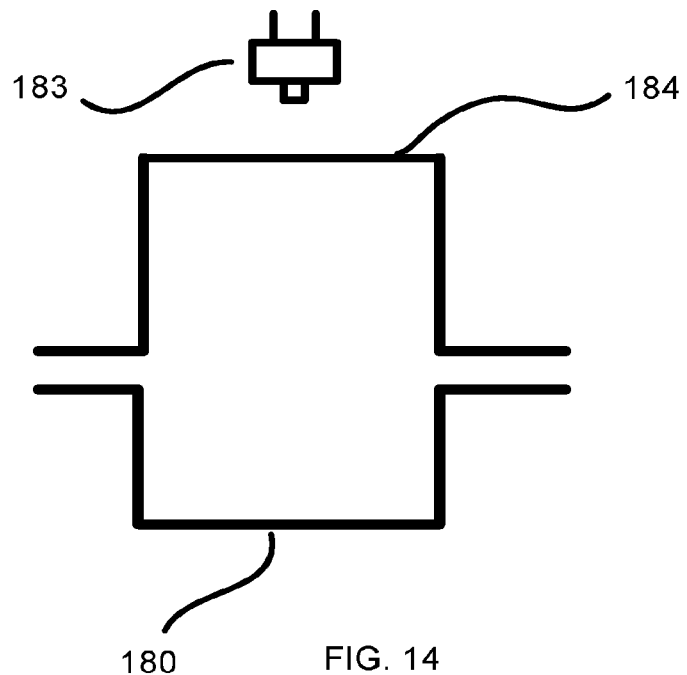
FIGS. 14 and 15 are diagrams of various exemplary sensor types, in accordance with some embodiments of the present invention.
Figure 15:
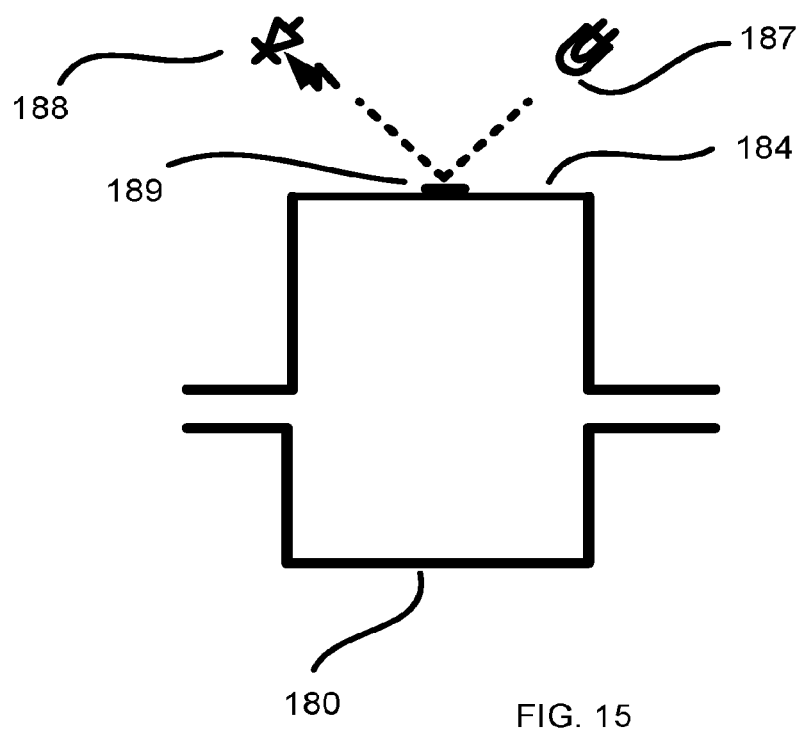

FIGS. 14 and 15 are diagrams of various exemplary sensor types according to embodiments of the present invention. FIG. 14 shows an exemplary button type sensor that may be closed/triggered by a float sensor assembly, a piston sensor assembly and/or a flexible reservoir type sensor assembly. As the float/piston assembly rises and/or as the flexible reservoir or a portion thereof flexes or relaxes out, they may apply force against the button type sensor and close/open)/trigger it, thereby causing a controller to initiate anyone of the pumping sequences described in connection with each of the embodiments mentioned within this application. FIG. 15 shows an exemplary optical sensor that may be triggered by a float sensor assembly, a piston sensor assembly and/or a flexible reservoir type sensor assembly. As the float/piston assembly rises and/or as the flexible reservoir or a portion thereof flexes or relaxes in or out, they may shift a mirror or a prism or any other reflecting/refracting/blocking element, thus causing a light beam from a light source to hit/stop-hitting an optical-sensor, and/or to change the light intensity hitting the light sensor, which may cause the triggering of the sensor, thereby causing a controller to initiate anyone of the pumping sequences described in connection with each of the embodiments mentioned within this application.

In FIGS. 14 and 15 there are shown, in accordance with some embodiments of the present invention, two exemplary sensors for estimating whether a pump/reservoir (180) has filled to, or beyond, a predetermined level, or whether the pump/reservoir (180) has emptied to, or beyond, a predetermined level, or may estimate the amount of fluid in the pump/reservoir (180). The example in FIG. 14 shows a pump/reservoir (180) with a flexible diaphragm (184), when the pump/reservoir (180) fills up with fluid the flexible diaphragm may stretch upwards and push the button of a switch (183) which may close or open an electrical circuit indicating that the pump/reservoir (180) has filled to, or beyond, a predetermined level. The example in FIG. 15 shows a pump/reservoir (180) with a flexible diaphragm (184). When the pump/reservoir (180) empties or fills, the flexible diaphragm (184) may stretch or relax downwards or upwards, and a reflector (189) attached to the flexible diaphragm (184) may reflect the light emitted from a light source (187) onto a light sensor (188). Light detection by the sensor (188) may indicate that the pump/reservoir (180) has emptied or filled to, or beyond, a predetermined level. Alternatively, the light sensor (188) may estimate the amount of fluid in the pump/reservoir (180) according to the light intensity reflected-on/hitting it.

Figure 16A:
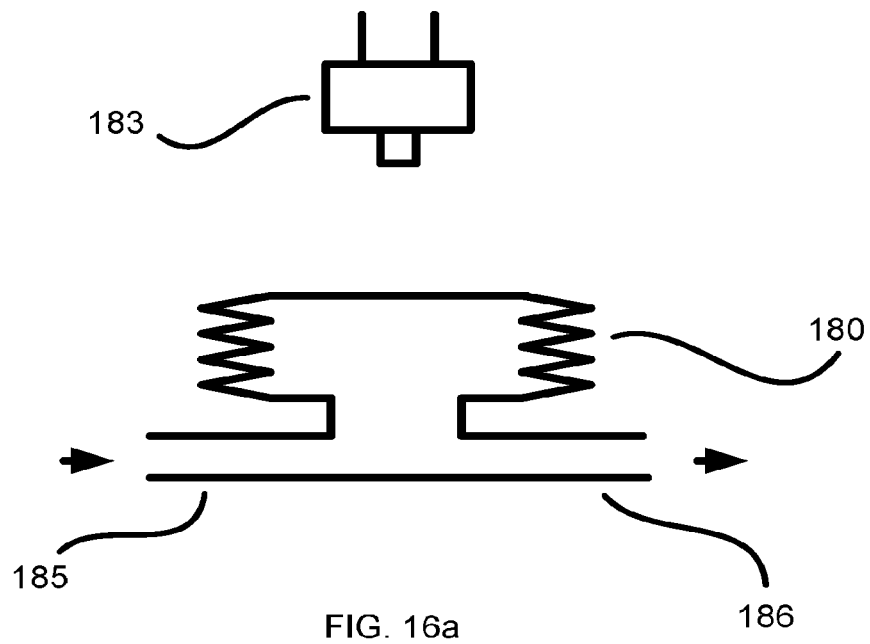
FIGS. 16a and 16b are diagrams of an exemplary flexible accordion-like shaped reservoir or pump/reservoir, in accordance with some embodiments of the present invention.
Figure 16B:
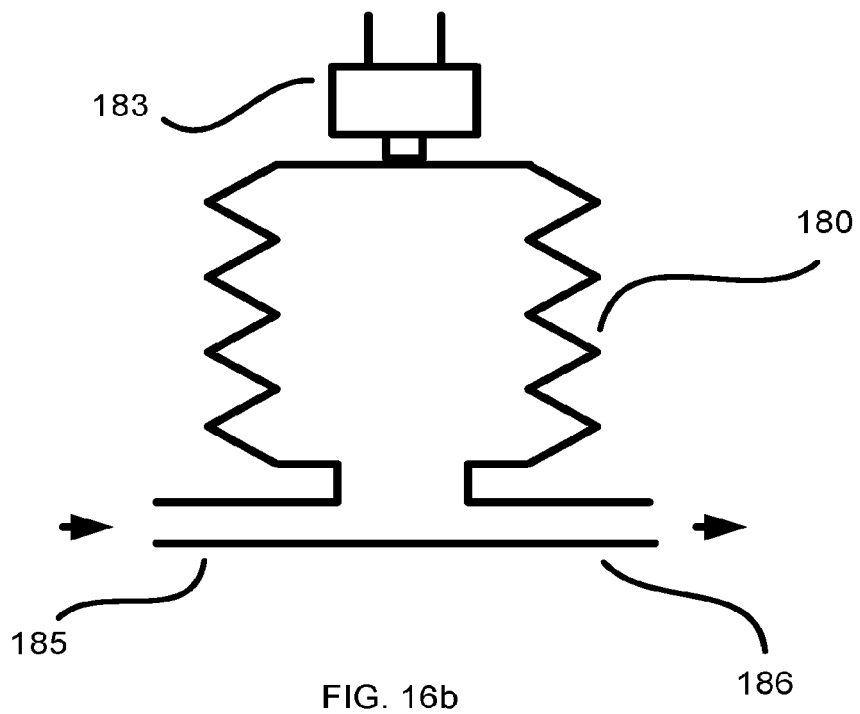

FIGS. 16a and 16b are diagrams of an exemplary flexible accordion-like shaped reservoir or pump/reservoir (180) and a button type sensor (183) assembly according to embodiments of the present invention. FIG. 16a shows the flexible reservoir in a native/relaxed or squeezed/strained, non-filled state, such that the functionally associated switch/binary sensor is not closed/triggered. FIG. 16b shows the flexible reservoir in a stretched/strained or native/relaxed filled state, such that the functionally associated switch/binary sensor is closed/triggered, thereby causing a controller to initiate anyone of the pumping sequences described in connection with each of the embodiments mentioned within this application and bring the flexible reservoir towards a native/relaxed or squeezed/strained non-filled state;

In FIG. 16 there is shown, in accordance with some embodiments of the present invention, an exemplary reservoir or pump/reservoir (actuator not shown) (180). In the examples of FIGS. 16a and 16b the reservoir or pump/reservoir (180) may comprise side/walls built in an accordion like flexible shape that may be constructed from an elastic material. In FIG. 16a an exemplary relaxed state of the reservoir or pump/reservoir (180) is shown. When fluid flows into the reservoir or pump/reservoir (180) the pressure of the fluid may stretch out the reservoir or pump/reservoir (180), thus increasing its volume, as shown in FIG. 16b. When the reservoir or pump/reservoir (180) fills up to, or beyond, a predetermined level, it may press a switch (183) closing/triggering it. The closing/triggering of the switch (183) may send a signal to a control circuit (not shown) indicating that the reservoir or pump/reservoir (180) has filled up to, or beyond, a predetermined level. In another example, the relaxed and fluid filled state of the reservoir or pump/reservoir (180) may be as shown in FIG. 16b. The fluid in the reservoir or pump/reservoir (180) may be discharged either by an actuator beat/movement squeezing the pump/reservoir (180) towards the state shown in FIG. 16a, or by the fluid being sucked out through the outlet (186), causing the reservoir or pump/reservoir to be squeezed towards the state shown in FIG. 16a. When the actuator beat/movement or suction ends, the reservoir or pump/reservoir (180) may relax back to its relaxed state shown in FIG. 16b sucking fluid in from the inlet (185). When the reservoir or pump/reservoir (180) fills back to, or beyond, a predetermined level, it may press the switch (183) which may send a signal to the control circuit indicating that the reservoir or pump/reservoir (180) has filled up to, or beyond, a predetermined level.

Figure 17A:
FIGS. 17a through 17c are diagrams of an exemplary flexible tube-like shaped reservoir, in accordance with some embodiments of the present invention.
Figure 17B:
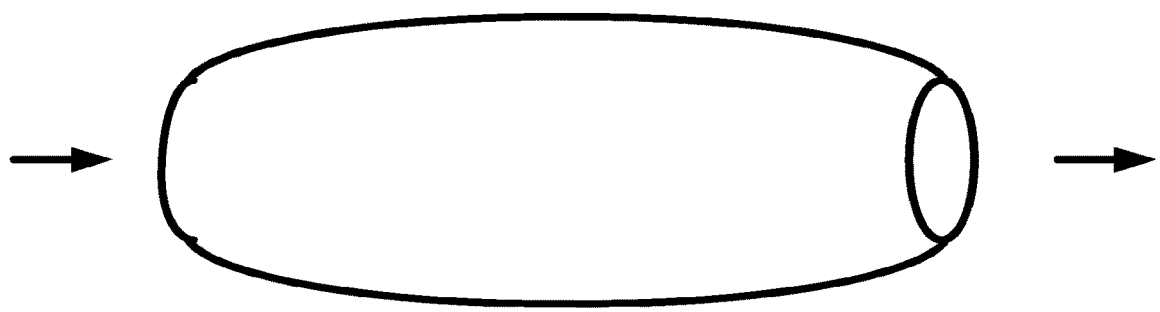
Figure 17C:
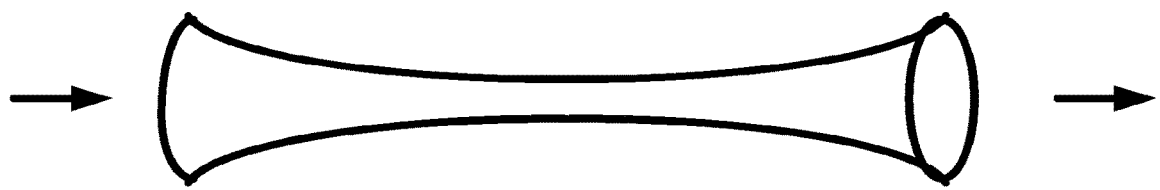

FIGS. 17a through 17c are diagrams of an exemplary flexible tube-like shaped reservoir according to embodiments of the present invention. FIG. 17a shows the flexible tube-like shaped reservoir in a native/relaxed state, FIG. 17b shows the flexible reservoir in a outwards-stretched/strained (filled) state, FIG. 17c shows the flexible tube-like shaped reservoir in a vacuumed/inwards stretched/strained (non-filled) state.

In FIG. 17 there is shown, in accordance with some embodiments of the present invention, an exemplary reservoir. In this example the reservoir may be in the form of a tube made of an elastic material. FIG. 17a shows an example of the reservoir in the relaxed state. When fluid fills the reservoir it may inflate/move to a stretched-out/strained state as shown in the example of FIG. 17b. When the fluid in the reservoir is discharged, the reservoir may relax back to its relaxed state shown in FIG. 17a. In another example, the relaxed state of the reservoir may be as shown in FIG. 17a, and when fluid is sucked out of the reservoir it may deflate/move to a stretch-in/strained/collapsed state as shown in the example of FIG. 17c. When fluid flows into the reservoir it may relax back to its relaxed state as shown in FIG. 17a. According to some embodiments, the reservoir may be charged/filled with fluid to a stretched-out/strained/inflated state as shown in FIG. 17b, and discharged to a stretched-in/strained/collapsed state as shown in FIG. 17c. According to these embodiments, the reservoir may switch between two strained states. According to some embodiments, the reservoir in the stretched-out/strained/inflated state shown in FIG. 17b may apply positive pressure on the fluid, and the reservoir in the stretched-in/strained/collapsed state shown in FIG. 17c may apply negative (suction) pressure on the fluid.

Figure 18A:
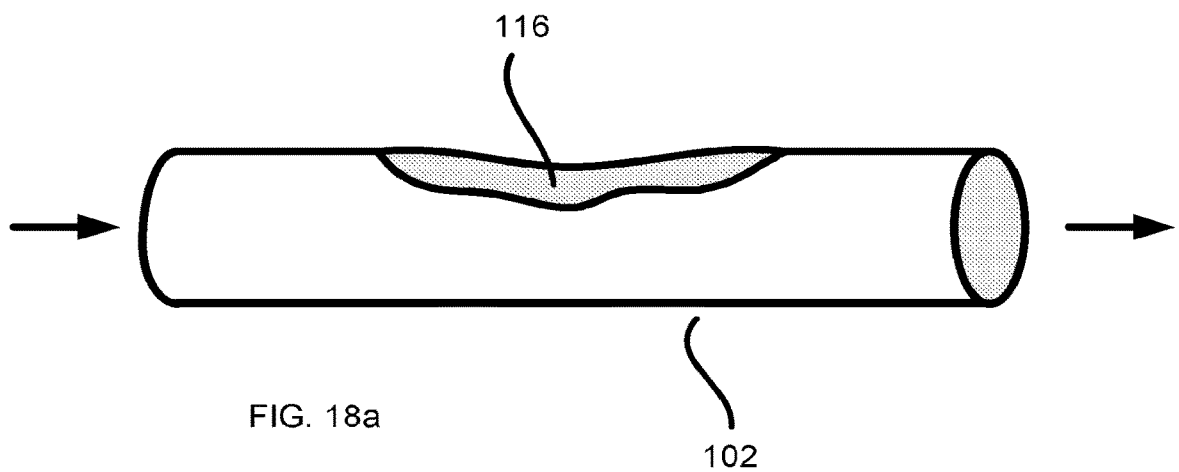
FIGS. 18a through 18c are diagrams of an exemplary rigid conduit tube-like shaped reservoir with a flexible retrofit diaphragm, in accordance with some embodiments of the present invention.
Figure 18B:
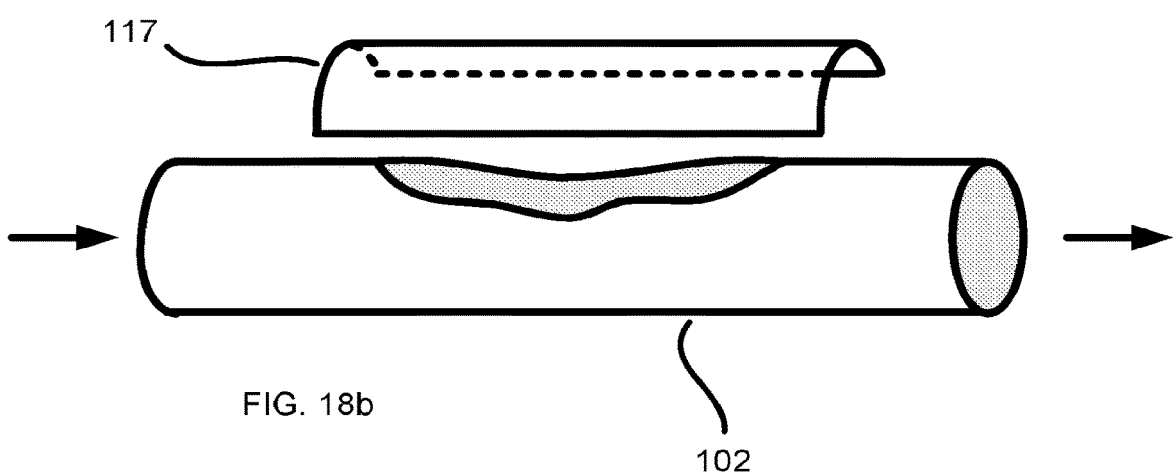
Figure 18C:
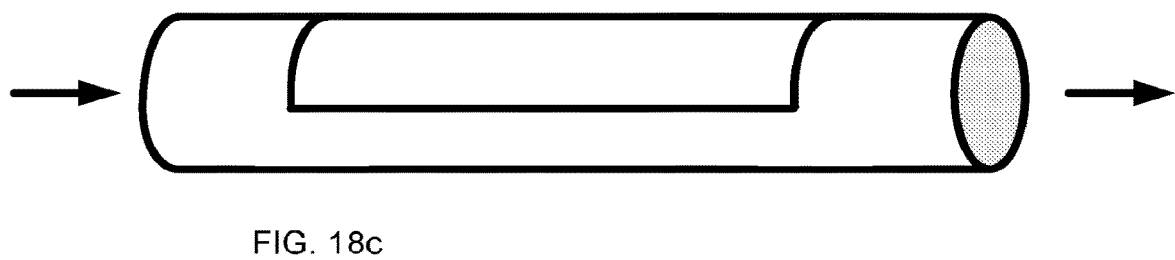

FIGS. 18a through 18c are diagrams of an exemplary rigid conduit tube-like shaped reservoir (102) with a flexible retrofit diaphragm (117) according to embodiments of the present invention. FIG. 18a shows the conduit tube-like shaped reservoir with an opening (116) over which the flexible retrofit diaphragm is to be positioned. FIG. 18b shows the conduit tube-like shaped reservoir with an opening over which the flexible retrofit is to be positioned and the flexible retrofit diaphragm prior to its connection. FIG. 18c shows the rigid conduit tube-like shaped reservoir with the flexible retrofit diaphragm positioned/attached over its opening.

In FIG. 18 there is shown, in accordance with some embodiments of the present invention, an exemplary reservoir (102). In this example the reservoir (102) may be a tube made of a rigid material. The tube may comprise an opening (116) in its side/wall as shown in FIG. 18a. According to this example, the opening in the tube's side/wall may be covered with a flexible retrofit diaphragm (117) made of an elastic material as shown in FIG. 18b (prior to retrofit attachment), and in FIG. 18c (after retrofit attachment).

Figures 19A, 19B, 19C, 19D:
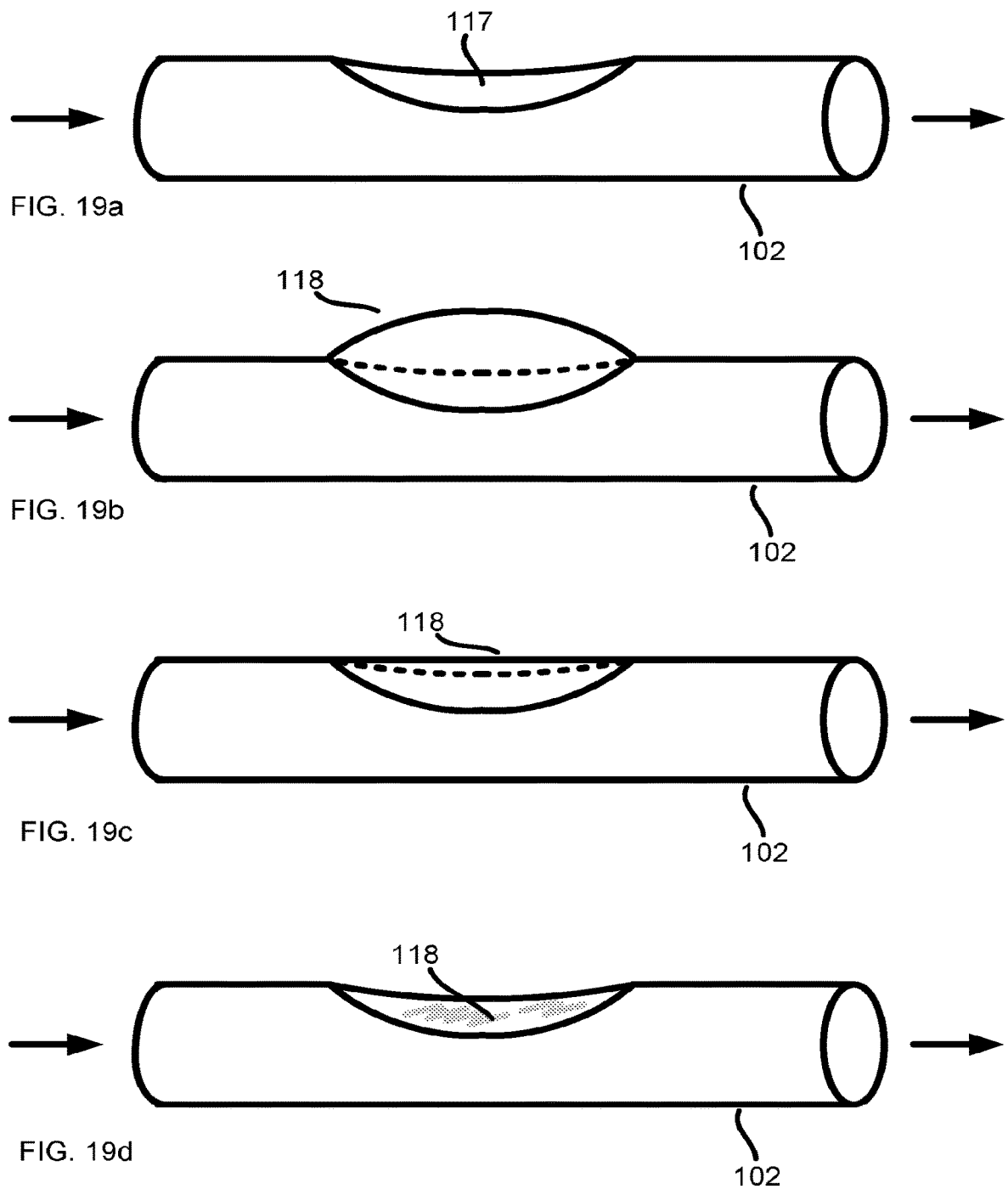
FIGS. 19a through 19d are diagrams of an exemplary rigid conduit tube-like shaped reservoir with a flexible retrofit diaphragm, in accordance with some embodiments of the present invention.

FIGS. 19a through 19d are diagrams of an exemplary rigid conduit tube-like shaped reservoir (102) with a flexible retrofit diaphragm (118) according to embodiments of the present invention. FIG. 19a shows the conduit tube-like shaped reservoir with an opening (117) over which the flexible retrofit diaphragm is to be positioned. FIG. 19b shows the conduit tube-like shaped reservoir with the flexible retrofit diaphragm positioned/attached over its opening in a outwards-stretched/strained (filled) state. FIG. 19c shows the conduit tube-like shaped reservoir with the flexible retrofit diaphragm positioned/attached over its opening in a native/relaxed (non-filled/semi-filled) state. FIG. 19d shows the conduit tube-like shaped reservoir with the flexible retrofit diaphragm positioned/attached over its opening in a vacuumed/inwards-stretched/strained (non-filled) state.

In FIG. 19 there is shown, in accordance with some embodiments of the present invention, the exemplary reservoir (102) of FIG. 18 in some of its exemplary operation states. FIG. 19a shows a reservoir (102) made of a rigid tube with an opening (117) in its side/wall. FIG. 19b shows the reservoir (102) with the opening covered with a flexible retrofit diaphragm (118) made of an elastic material, wherein the reservoir (102) has filled with fluid that stretched-out/strained the flexible retrofit diaphragm (118) towards the outside of the reservoir (102). FIG. 19c shows the reservoir (102) in its relaxed state. FIG. 19d shows the reservoir (102) after fluid has been sucked out of it and the flexible retrofit diaphragm (118) was stretched-in/strained towards the inside of the reservoir (102).

Figure 20A:
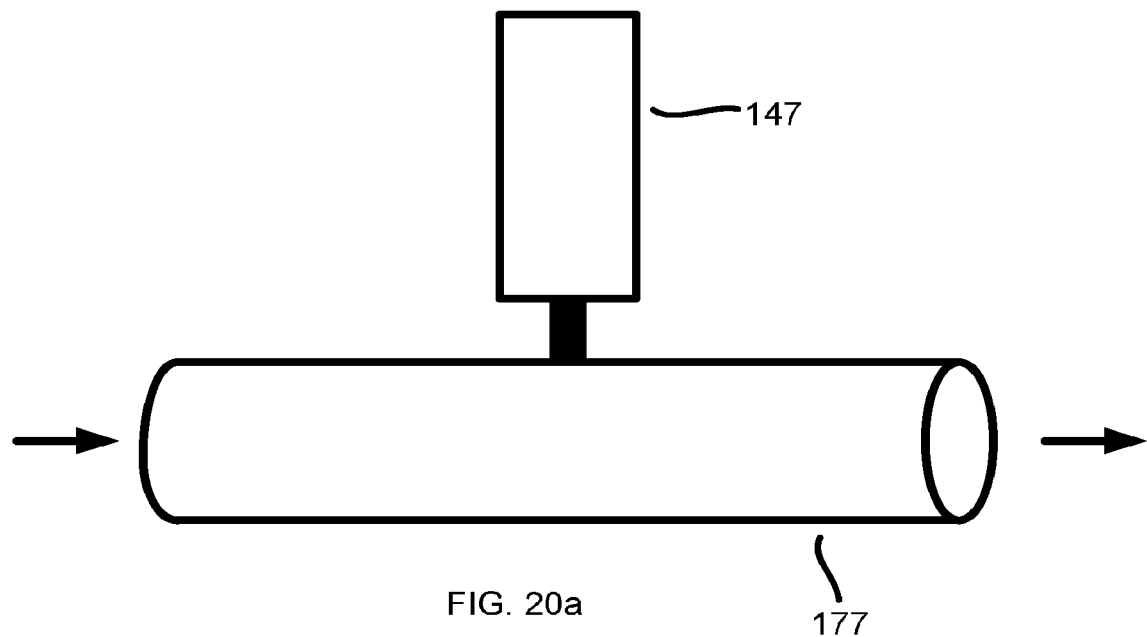
FIGS. 20a and 20b are diagrams of an exemplary flexible conduit tube-like shaped pump, in accordance with some embodiments of the present invention.
Figure 20B:
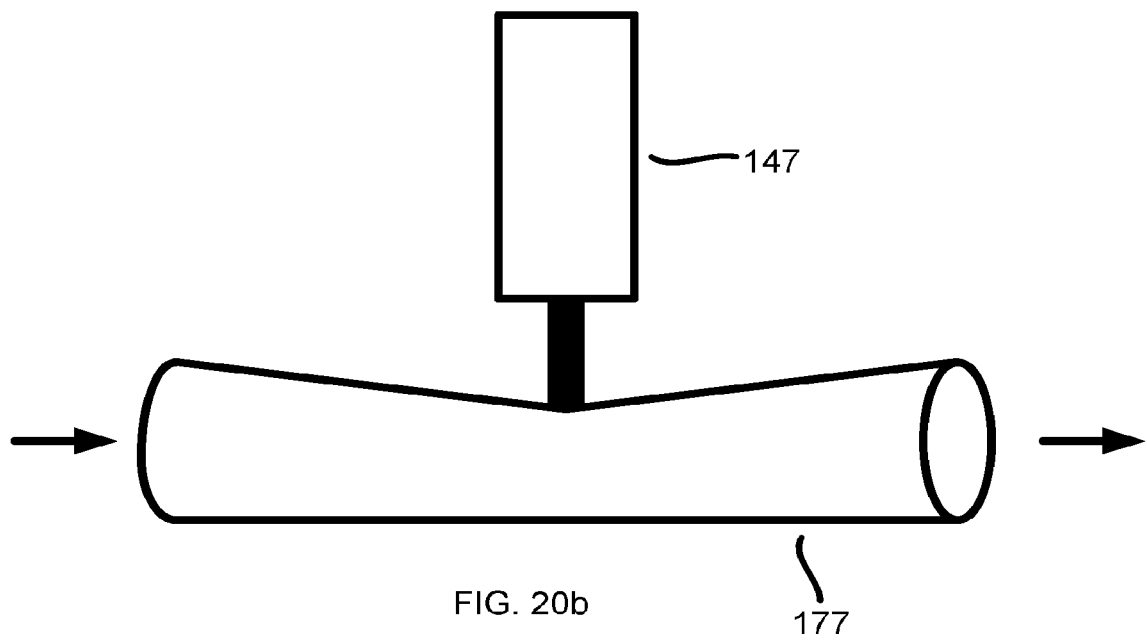

FIGS. 20a and 20b are diagrams of an exemplary flexible conduit tube-like shaped pump according to embodiments of the present invention. FIG. 20a shows the flexible conduit tube-like shaped pump in a native/relaxed (filled) state wherein the pump actuator (147) is not activated (i.e. not pressing onto the tube (177)). FIG. 20b shows the flexible conduit tube-like shaped pump in a strained (non-filled) state wherein the pump actuator is activated (pressing onto the tube) and has squeezed the flexible conduit tube-like shaped pump during or after its discharge phase.

In FIG. 20 there is shown, in accordance with some embodiments of the present invention, an exemplary conduit tube-like shaped pump. In this example the pump comprises an elastic tube (177) and an actuator (147) such as, but not limited to, a solenoid actuator. FIG. 20a shows an example of the tube (177) in a relaxed state, in this state the tube may be filled with fluid. FIG. 20b shows an example of the actuator (147) pressing-onto/constricting the elastic tube (177) and therefore decreasing its volume and forcing fluid out. When the actuator (147) releases the force from the elastic tube, the tube may expand back to its relaxed state as shown in FIG. 20a while sucking fluid in.

Figure 21:
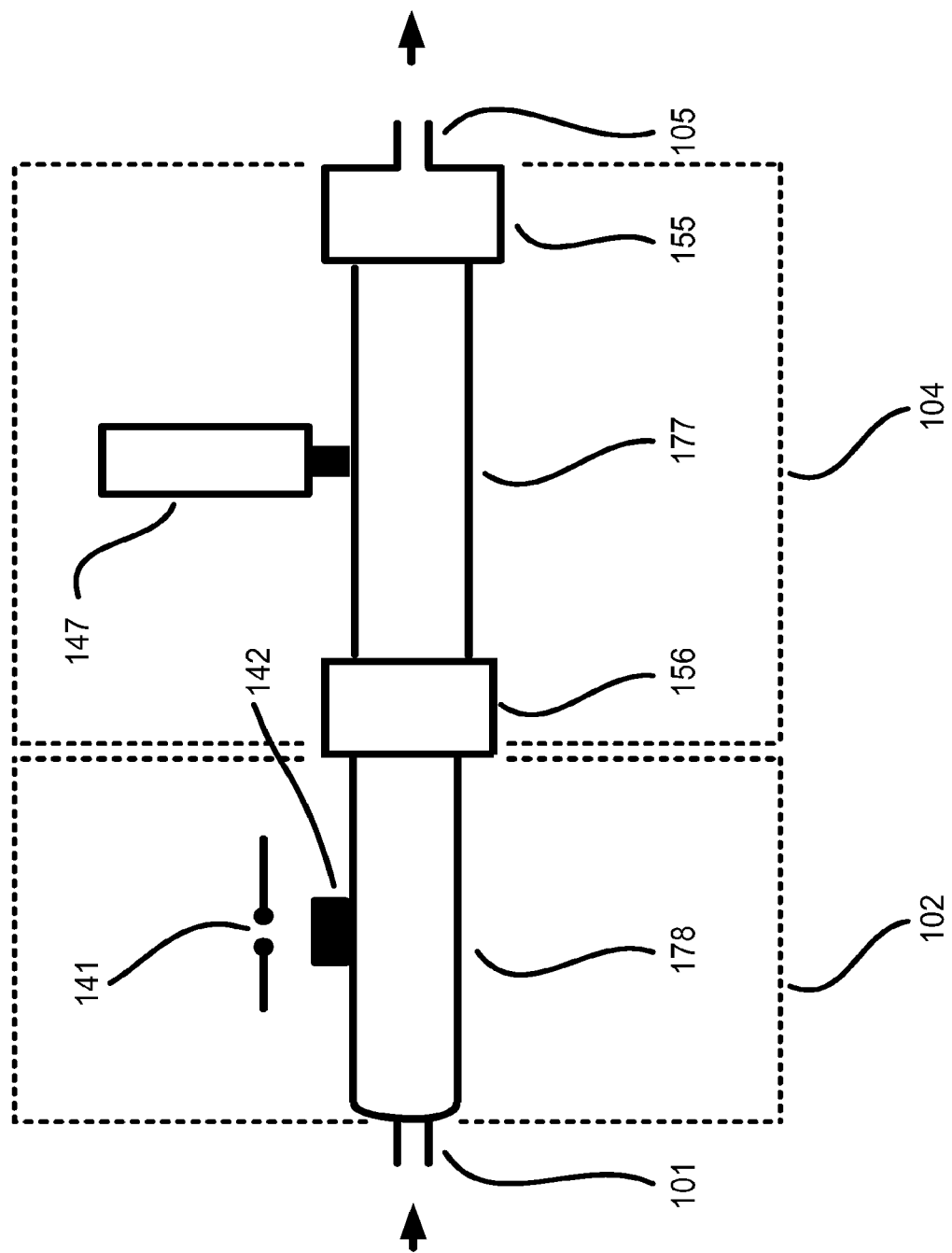
FIGS. 21 and 22 are diagrams of an exemplary fluid flow meter combining the flexible tube-like shaped reservoir of FIGS. 17a through 17c and the flexible conduit tube-like shaped pump of FIGS. 20a and 20b, in accordance with some embodiments of the present invention.
Figure 22:
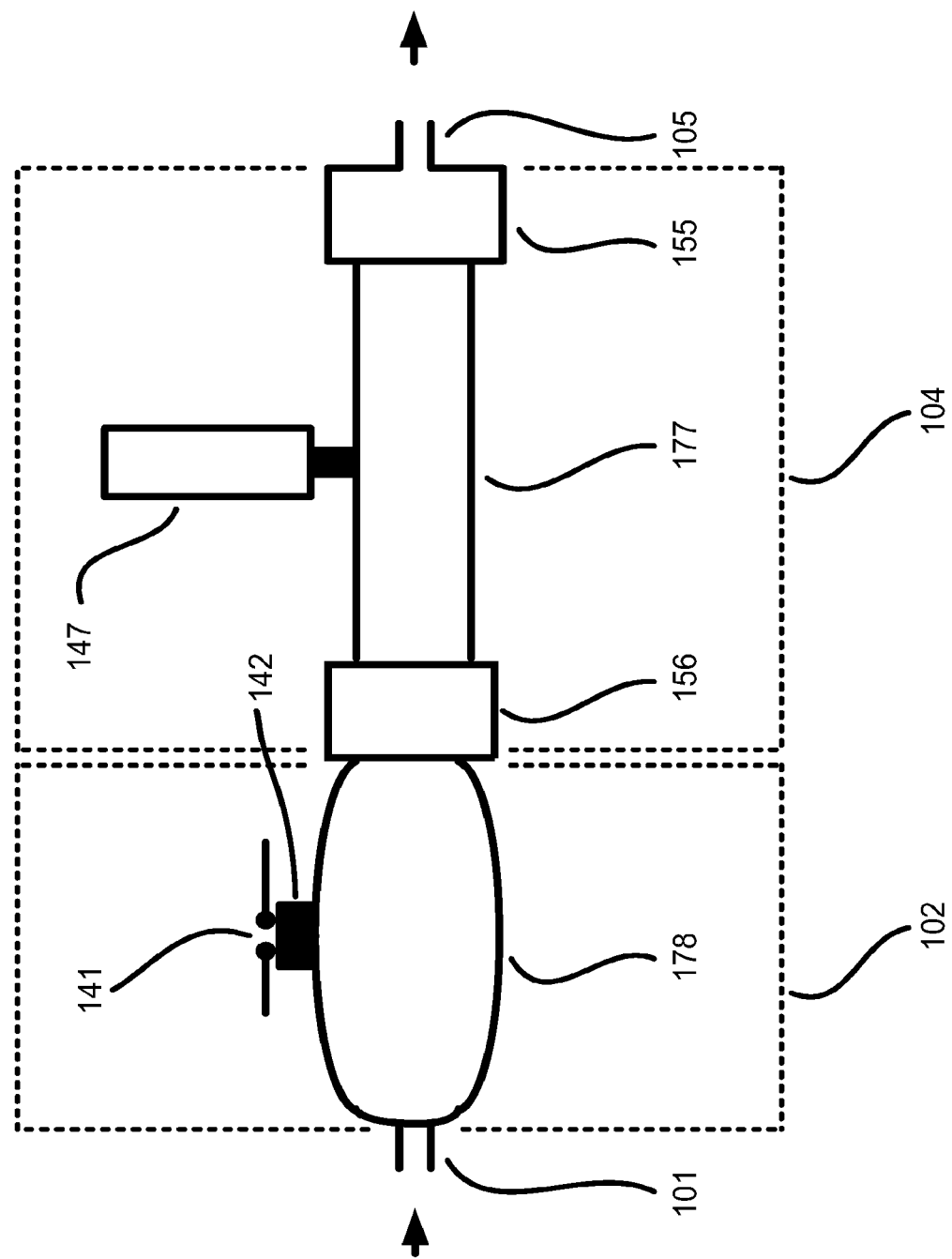

FIGS. 21 and 22 are diagrams of an exemplary fluid flow meter combining the flexible tube-like shaped reservoir of FIGS. 17a through 17c and the flexible conduit tube-like shaped pump of FIGS. 20a and 20b according to embodiments of the present invention. FIG. 21 shows the combined fluid flow meter with its flexible tube-like shaped reservoir (102) in a native/relaxed (non-filled) state and the functionally associated switch/binary sensor (141) not closed/triggered. FIG. 22 shows the combined fluid flow meter with its flexible tube-like shaped reservoir in a stretched/strained (filled) state and the functionally associated switch/binary sensor closed/triggered.

In FIGS. 21 and 22 there is shown, in accordance with some embodiments of the present invention, an exemplary fluid flow meter. According to this example, the exemplary flow meter may comprise a reservoir (102) constructed in a substantially similar way to the reservoir shown in the example of FIG. 17. The reservoir (102) may be made of an elastic tube (178) that may comprise a connector/contactor (142), made of electricity conducting material, that is attached to the tube's outer surface as shown in FIG. 21. When fluid flows into the tube (178) from the inlet (101) the tube may expand and the connector/contactor (142) may close an electrical circuit between switch/contacts (141) as shown in FIG. 22. When the circuit between the switch/ contacts (141) is closed, a signal may be sent to a control circuit (not shown). According to this example, the exemplary flow meter may comprise a pump (104) constructed in a similar way to the pump shown in the example of FIG. 20. The pump may be made of an elastic tube (177), an actuator (147), an inlet valve (156), and an outlet valve (155). When the actuator (147) presses the tube (177) it may cause its volume to decrease and force the fluid contained in it to flow out through the outlet valve (155). When the actuator (147) releases the pressure from the tube (177), the tube may expand back to its relaxed state while sucking fluid in through the inlet valve (156) from the elastic tube (178) of the reservoir (102) which may, in response, deflate back to its relaxed state.

Figure 23A:
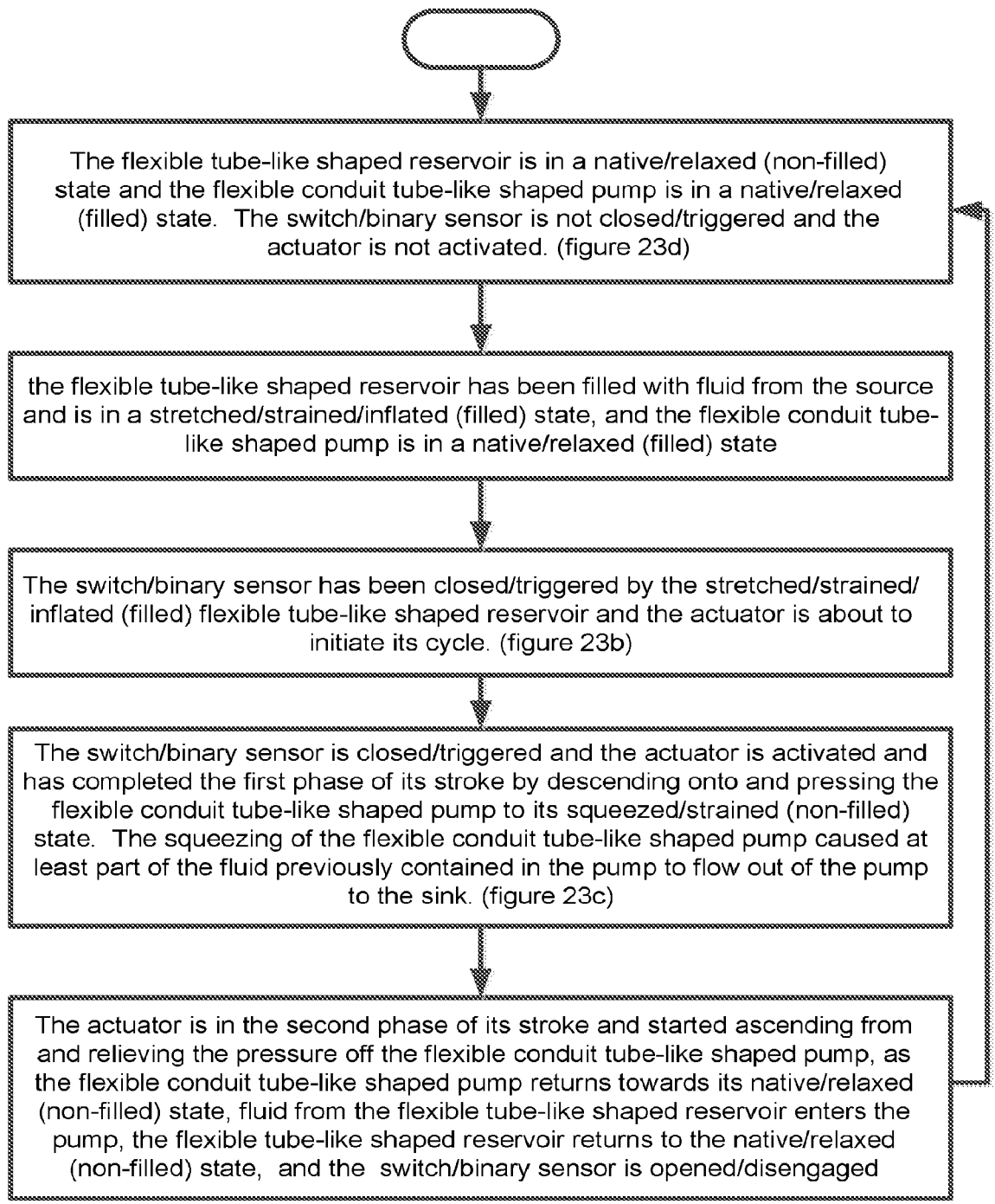
FIGS. 23a through 23d are a flow chart and diagrams of an exemplary operation cycle of an exemplary fluid flow meter combining the flexible tube-like shaped reservoir of FIGS. 17a through 17c and the flexible conduit tube-like shaped pump of FIGS. 20a and 20b, in accordance with some embodiments of the present invention.

FIGS. 23*a* through 23*d* are a flow chart and diagrams of an exemplary operation cycle of an exemplary fluid flow meter combining the flexible tube-like shaped reservoir of FIGS. 17*a* through 17*c* and the flexible conduit tube-like shaped pump of FIGS. 20*a* and 20*b* according to embodiments of the present invention. FIG. 23*a* describes the steps taken by the combined fluid flow meter as part of an exemplary operation cycle.

Figure 23B:
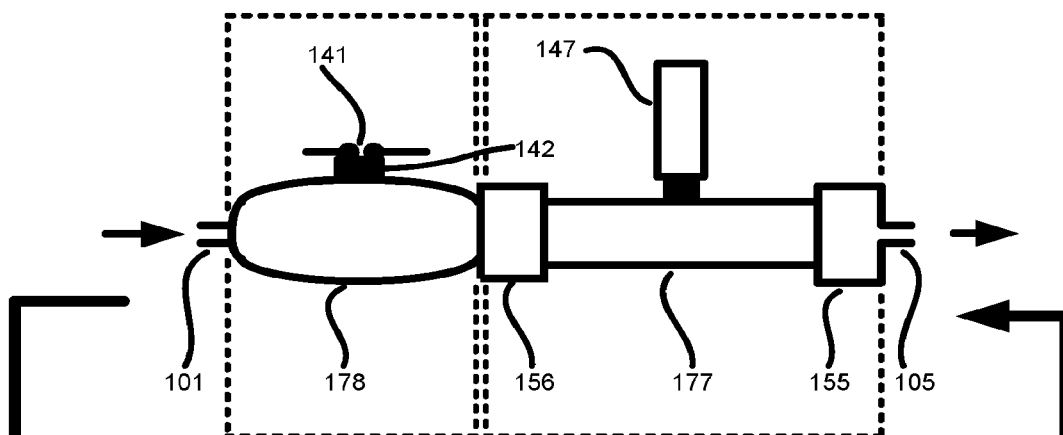
Figure 23C:
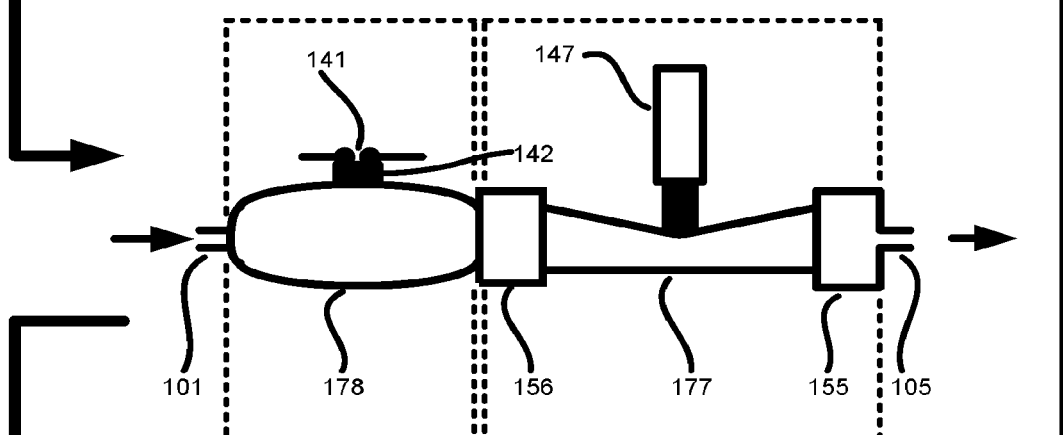
Figure 23D:
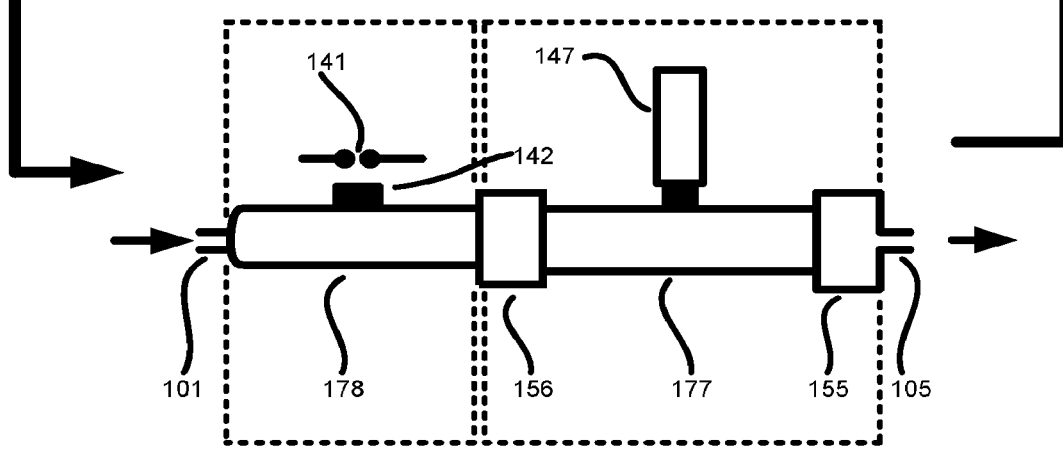

FIG. 23*d* shows the combined fluid flow meter in a first stage of an exemplary operation cycle wherein the flexible tube-like shaped reservoir (178) is in a native/relaxed (non-filled) state and the flexible conduit tube-like shaped (177) pump is in a native/relaxed (filled) state. The switch/binary sensor (141) is not closed/triggered and the actuator (147) is not activated.

FIG. 23*b* shows the combined fluid flow meter in a second stage of an exemplary operation cycle wherein the flexible tube-like shaped reservoir has been filled with fluid from the source and is in a stretched/strained (filled) state, and the flexible conduit tube-like shaped pump is in a native/relaxed (filled) state. The switch/binary sensor has been closed/triggered by the stretched/strained (filled) flexible tube-like shaped reservoir and the actuator is about to initiate its actuating cycle.

FIG. 23*c* shows the combined fluid flow meter in a third stage of an exemplary operation cycle wherein the flexible tube-like shaped reservoir is filled with fluid and is in a stretched/strained (filled) state. The switch/binary sensor is closed/triggered and the actuator is activated and has completed a first step of its actuating cycle by descending onto and pressing the flexible conduit tube-like shaped pump to its squeezed/strained (non-filled) state. The squeezing of the flexible conduit tube-like shaped pump may cause at least part of the fluid previously contained in the pump to flow out of the pump to the sink side. The activated actuator may then complete its operation cycle by ascending back towards its initial FIG. 23*d* position. The ascending of the actuator may allow for the flexible conduit tube-like shaped pump to return to its native/relaxed (filled) state while filling up by sucking fluid or letting fluid in from the stretched/strained (filled) flexible tube-like shaped reservoir and into its tube-like shaped body. The displacement of fluid from the reservoir and into the pump may take place as a result of the positive pressure in the stretched/strained reservoir and/or the negative pressure in the squeezed/strained tube of the pump returning to its native/relaxed (filled) state. Once it has completed the third stage of its exemplary operation cycle the combined fluid flow meter is now back in its initial FIG. 23*d* position.

In FIG. 23*a* there is shown, in accordance with some embodiments of the present invention, exemplary operating steps of the fluid flow meter shown in FIG. 21.

In the first step (100) the flexible tube-like shaped reservoir is in a native/relaxed (non-filled) state and the flexible conduit tube-like shaped pump is in a native/relaxed (filled) state. The switch/binary sensor is not closed/triggered and the actuator is not activated. (as shown in FIG. 23*d*).

In the second step (200) the flexible tube-like shaped reservoir has been filled with fluid from the source and is in a stretched/strained/inflated (filled) state, and the flexible conduit tube-like shaped pump is in a native/relaxed (filled) state.

In the third step (300) the switch/binary sensor has been closed/triggered by the stretched/strained/inflated (filled) flexible tube-like shaped reservoir and the actuator is about to initiate its cycle. (FIG. 23*b*).

In the fourth step (400) the switch/binary sensor is closed/triggered and the actuator is activated and has completed the first (discharge) phase of its stroke by descending onto and pressing the flexible conduit tube-like shaped pump to its squeezed/strained (non-filled) state. The squeezing of the flexible conduit tube-like shaped pump caused at least part of the fluid previously contained in the pump to flow out of the pump to the sink. (FIG. 23*c*).

In the fifth step (500) the actuator is in the second (intake) phase of its stroke and started ascending from and relieving the pressure off the flexible conduit tube-like shaped pump, as the flexible conduit tube-like shaped pump returns towards its native/relaxed (non-filled) state, fluid from the flexible tube-like shaped reservoir enters the pump, the flexible tube-like shaped reservoir returns to the native/relaxed (non-filled) state, and the switch/binary sensor is opened/disengaged.

In FIGS. 23*b* through 23*d* there are shown, in accordance with some embodiments of the present invention, three exemplary operating states of the fluid flow meter shown in FIG. 21. Starting from FIG. 23*d*, the reservoir's elastic tube (178) may be in a non-filled state, and the pump may be in a filled state having fluid contained in its tube (177). Fluid may flow through the inlet (101) and fill the reservoir's elastic tube (178) which may cause the tube to inflate and the connector/contactor (142) to close the switch/contacts (141) circuit as shown in FIG. 23*b*. The closing of the switch/contacts (141) circuit may signal to a control circuit (not shown) that the reservoir's elastic tube (178) contains a predetermined amount of fluid and in response the control circuit may send a signal to the pump actuator (147) to apply force on the pump tube (177) forcing the fluid in the pump tube (177) to flow out of the tube through the outlet valve (155) as shown in FIG. 23*c*. After the actuator (147) ends the discharge phase, the control circuit may instruct the actuator (147) to release the force applied to the pump tube (177), in response, the tube (177) may expand to its relaxed state as shown in FIG. 23*d* while sucking fluid from the reservoir's elastic tube (178) through the inlet valve (156) and letting the reservoir's elastic tube (178) deflate back to its relaxed state, ready to be filled again with fluid. This process may repeat itself cyclically over and over again as shown by the arrows, In each such cycle, an amount of fluid which is substantially similar to the difference between the volume of fluid contained in the pump tube (177) in its relaxed state (FIG. 23*b*) and volume of fluid contained in the pump tube (177) in its stretched state (FIG. 23*c*), may be displaced from the inlet (101) to the outlet (105). The control logic may count the number of cycles, and may register and/or send a signal, indicative of the amount of fluid which flowed through the fluid flow meter, to another device. The valves (156), (155) may be unidirectional valves as shown for example in FIG. 5 (valves 146 and 145), or in FIG. 10, or they may be electric, pneumatic, or hydraulic valves which may be controlled by the control circuit.

Figure 24:
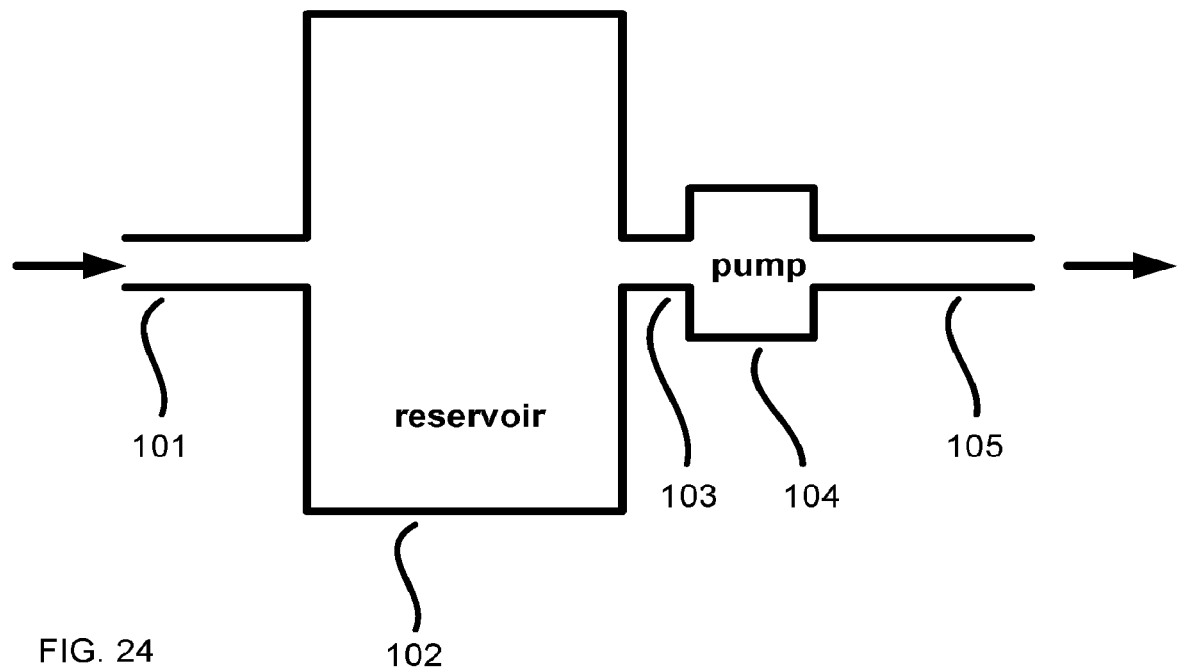
FIG. 24 is a functional block diagram of an exemplary flow meter or flow metering assembly including an enlarged reservoir, in accordance with some embodiments of the present invention.

FIG. 24 is a functional block diagram of an exemplary flow meter or flow metering assembly including an enlarged reservoir (102) to accommodate the collection of bursts of a fluid exiting a fluid source according to embodiments of the present invention, wherein the pump (104) is downstream from the reservoir and is adapted to pump a known/substantially-near-fixed amount of fluid out of the reservoir per given pumping stroke and/or per given pumping cycle;

In FIG. 24 there is shown, in accordance with some embodiments of the present invention, an exemplary fluid flow meter that is substantially similar to the one shown in FIG. 1, which may comprise a reservoir (102) and pump (104). In the example shown in this figure the fluid volume that may be contained in the reservoir (102) may be larger than the fluid volume that may be contained in the pump (104) chamber. This may be useful in cases when the fluid flow is not stable (for example, in a burst type of flow), in these cases the reservoir (102) may fill with an amount of fluid during a period of time which is shorter than the time it takes the pump (104) to empty an equal amount of fluid from the reservoir (102). In this case, the reservoir (102) may serve also as a buffer for storing the fluid until it is emptied by the pump (104). According to some embodiments, a fluid level sensor may send a signal to a control circuit indicating that the reservoir (102) contains an amount of fluid which may be substantially near a predetermined amount. The predefined amount may be a fraction of the volume of fluid that the reservoir (102) may contain. According to some embodiments, the sensor may send a signal to the control circuit indicating that the reservoir (102) contains an amount of fluid which may be substantially near the sum of the minimum reservoir volume and the pump chamber volume.

Figure 25:
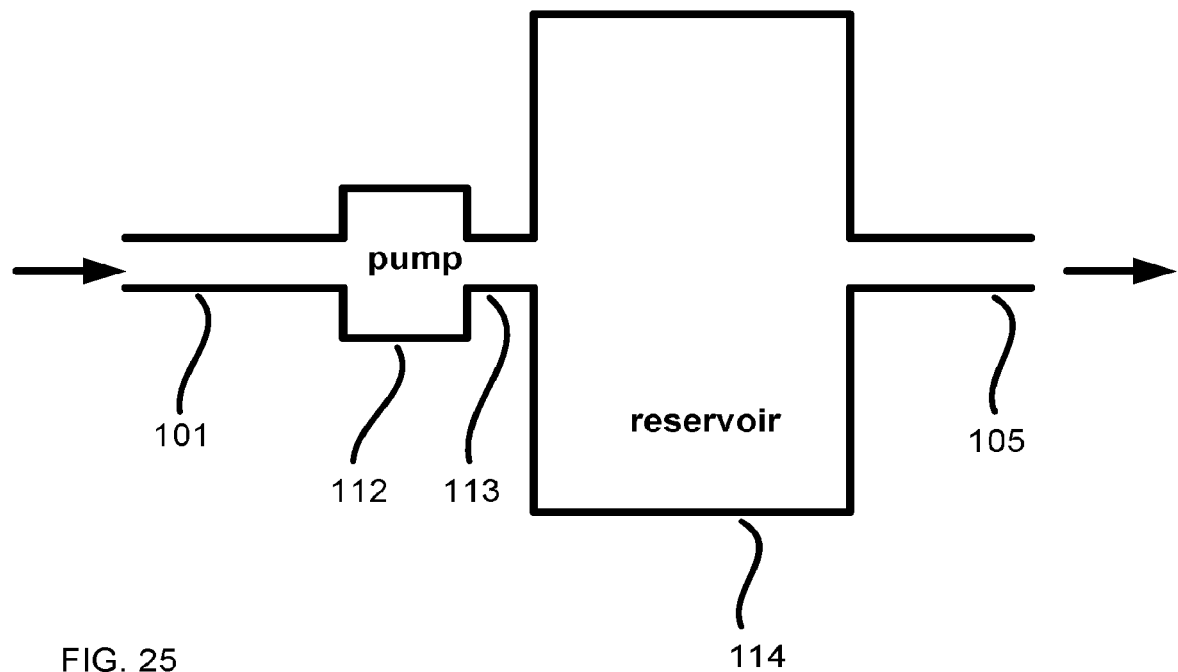
FIG. 25 is a functional block diagram of an exemplary flow meter or flow metering assembly including an enlarged reservoir, in accordance with some embodiments of the present invention.

FIG. 25 is a functional block diagram of an exemplary flow meter or flow metering assembly including an enlarged reservoir (114) to accommodate the consumption of bursts of fluid by a fluid sink according to embodiments of the present invention, wherein the pump (112) is upstream from the reservoir and is adapted to pump a known/substantially-near-fixed amount of fluid into the reservoir per given pumping stroke and/or per given pumping cycle;

In FIG. 25 there is shown, in accordance with some embodiments of the present invention, an exemplary fluid flow meter that is substantially similar to the one shown in FIG. 2, which may comprise a reservoir (114) and pump (112). In the example shown in this figure the fluid volume that may be contained in the reservoir (114) may be larger than the fluid volume that may be contained in the pump (112) chamber. This may be useful in cases when the fluid flow is not stable (for example, in a burst type of flow), in these cases an amount of fluid may be emptied from the reservoir (114) during a period of time which may be shorter than the time it takes the pump (112) to fill the reservoir (114) with a similar amount of fluid. In this case, the reservoir (114) may serve also as a buffer for storing the fluid filled by the pump (112) until it may be emptied. According to some embodiments, a fluid level sensor may send a signal to a control circuit indicating that the reservoir (114) contains an amount of fluid that may be substantially near a predetermined amount which may be approximately the maximum reservoir (114) volume minus the pump chamber volume.

In some applications the fluid flow rate may span over a very wide range and there may be a need to accurately measure the fluid flow volume and/or rate across the entire operating range. If a flow meter with a large fluid volume pump is used, it may be able to measure large fluid flow rates, however, low rates may suffer from poor measuring resolution since the measuring resolution may be limited to the (large) fluid volume of the pump. If a flow meter with a small fluid volume pump is used, it may be able to accurately measure low flow rates, however, it may not be able to measure high flow rates since the pump may reach its maximum operating frequency (the maximum stroke rate).

Figure 26:
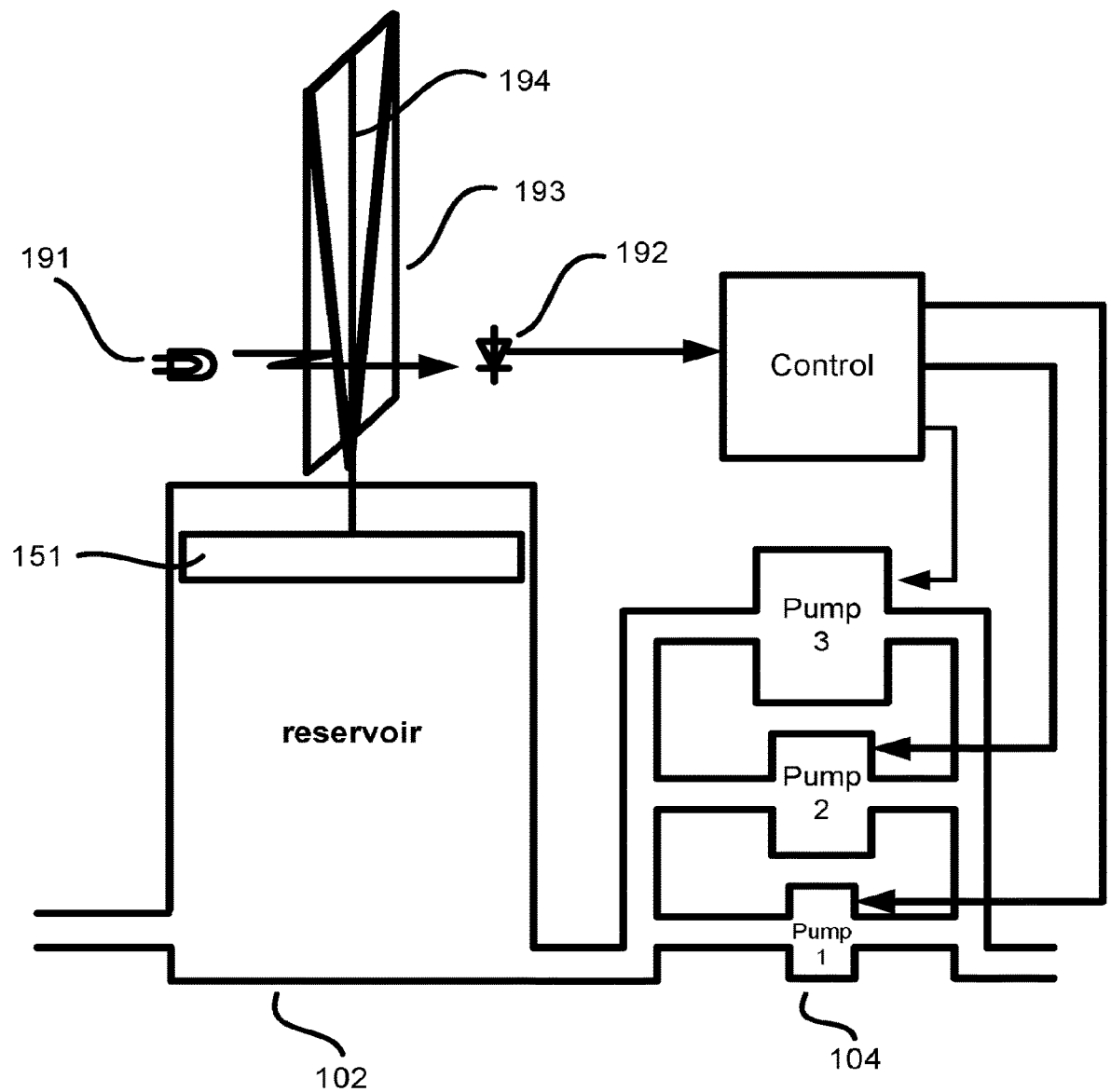
FIG. 26 is a functional block diagram of an exemplary flow meter or flow metering assembly including a set of two or more pumps, wherein each of the pumps is adapted to displace either a similar or a different amount of fluid per pumping cycle and/or stroke, in accordance with some embodiments of the present invention.

FIG. 26 is a functional block diagram of an exemplary flow meter or flow metering assembly including a set of two or more pumps, wherein each of the pumps is adapted to displace either a similar or a different amount of fluid per pumping cycle and/or stroke, that may be used to pump fluid into or out of the reservoir according to embodiments of the present invention. Pumps of larger pump-cycle/stroke amount may be used for higher fluid flow rates estimation, whereas smaller pump-cycle/stroke amount pumps may be used where lower fluid flow rates are to be estimated, while allowing for a more accurate estimation of the flowing amount (e.g. down to a 1 pumping stroke amount). Pumps of various pumping-cycle amounts may be used in combination in order to enable uninterrupted measuring of high fluid flow rates, while allowing for more accurate flow rate estimation by switching to and engaging pumps of smaller pump-cycle/stroke amounts, for example, as fluid flow rate decreases.

According to some embodiments of the present invention, a flow meter or flow metering assembly including a set of two or more pumps, may include a non-binary/continuous/analog sensor (e.g. a potentiometer) that may indicate the substantially near instantaneous amounts of fluid in the reservoir, and may respectively be used by a controller to engage pump(s) of corresponding pump-cycle amounts. According to some exemplary embodiments shown in FIG. 26, the non-binary/continuous sensor is implemented in the form of a triangular window that may rise or descend as fluid level in the reservoir changes (e.g. connected to the reservoir's float, piston or flexible diaphragm). A light source and a light sensor may be positioned on opposite sides of the triangular window. As the triangular window rises or descends as fluid level in the reservoir changes, the amount of light passing through the window and sensed by the light sensor may accordingly increase or decrease and pump(s) of a corresponding volume per pump-cycle may be engaged.

In FIG. 26 there is shown, in accordance with some embodiments of the present invention, an exemplary fluid flow meter that may comprise a reservoir (102) and at least two pumps (104) of similar or different sizes (pump size may be defined as the amount of fluid the pump displaces in each cycle). A sensor may be functionally associated with the reservoir (102) for estimating the amount of fluid in the reservoir. Control circuit may control the operation of the two or more pumps (104), receiving a signal indicative of the amount of fluid in the reservoir (102) from the sensor, and estimating the fluid flow. In this example the sensor comprises a light source (191), a light sensor (192) and a panel (193), made of an opaque material, with a transparent material or window (194) in it. The window may have a varying cross-section along the panel's length (e.g. a triangular shape as shown in the figure). When fluid flows in a direction from the source, into the reservoir, and from there to the pumps and out to the sink, the reservoir (102) fills up with fluid from the source, a piston (151) may be pushed up along with the panel (193), and the amount of light detected by the light sensor (192) may change according to the panel's height due to the change in the window's cross-section allowing a different amount of light pass through it. The control circuit may receive from the light sensor (192) a signal indicative of the amount of detected light and may thus estimate the amount of fluid in the reservoir (102) based on the amount of light detected by the light sensor (192). When a small amount of fluid is estimated to be in the reservoir (102) the control circuit may operate a smaller pump or a smaller number of pumps to empty the reservoir (102) and therefore achieve a high measuring resolution.

As flow rate increases, the control circuit may increase the pump cycle rate in order to empty the fluid flowing into the reservoir (102) from the source. When the pump cycle rate approaches or reaches its maximum operating rate, the control circuit may activate one or more additional pump(s) instead of, or in addition to, the first activated pump(s), thus allowing for a higher flow rate to also be handled. When fluid flows in a direction from the source, into the pumps, and from there to the reservoir (102) and out to the sink, a piston (151) may descend along with the panel (193), and the amount of light detected by the light sensor (192) may change according to the panel's height due to the change in the window's cross-section allowing a different amount of light pass through it. The control circuit may receive from the light sensor (192) a signal indicative of the amount of detected light and may thus estimate the amount of fluid in the reservoir (102) based on the amount of light detected by the light sensor (192). When a large amount of fluid is estimated to be in the reservoir (102) the control circuit may operate a smaller pump or a smaller number of pumps to fill the reservoir (102) and therefore achieve a high measuring resolution. As flow rate increases, the control circuit may increase the pump cycle rate in order to fill up the fluid flowing out of the reservoir (102) to the sink. When the pump cycle rate approaches or reaches its maximum operating rate, the control circuit may activate one or more additional pump(s) instead of, or in addition to, the first activated pump(s), thus allowing for a higher flow rate to also be handled. By having two or more pumps, high resolution measurements at a wide dynamic range of fluid flow may be achieved.

According to some embodiments, in order to achieve high measuring accuracy, it may be required that the pressure profile at the inlet of the pump(s) or at the outlet of the pump(s), or both at the inlet and the outlet of the pump(s) is substantially similar in each pumping stroke. It may also, or alternatively, be required that the pressure profile at the inlet of the pump(s) or at the outlet of the pump(s) or both at the inlet and the outlet of the pump(s) is substantially similar, independent of the pressures at the inlet or at the outlet or both at the inlet and the outlet of the flow meter.

Figure 27:
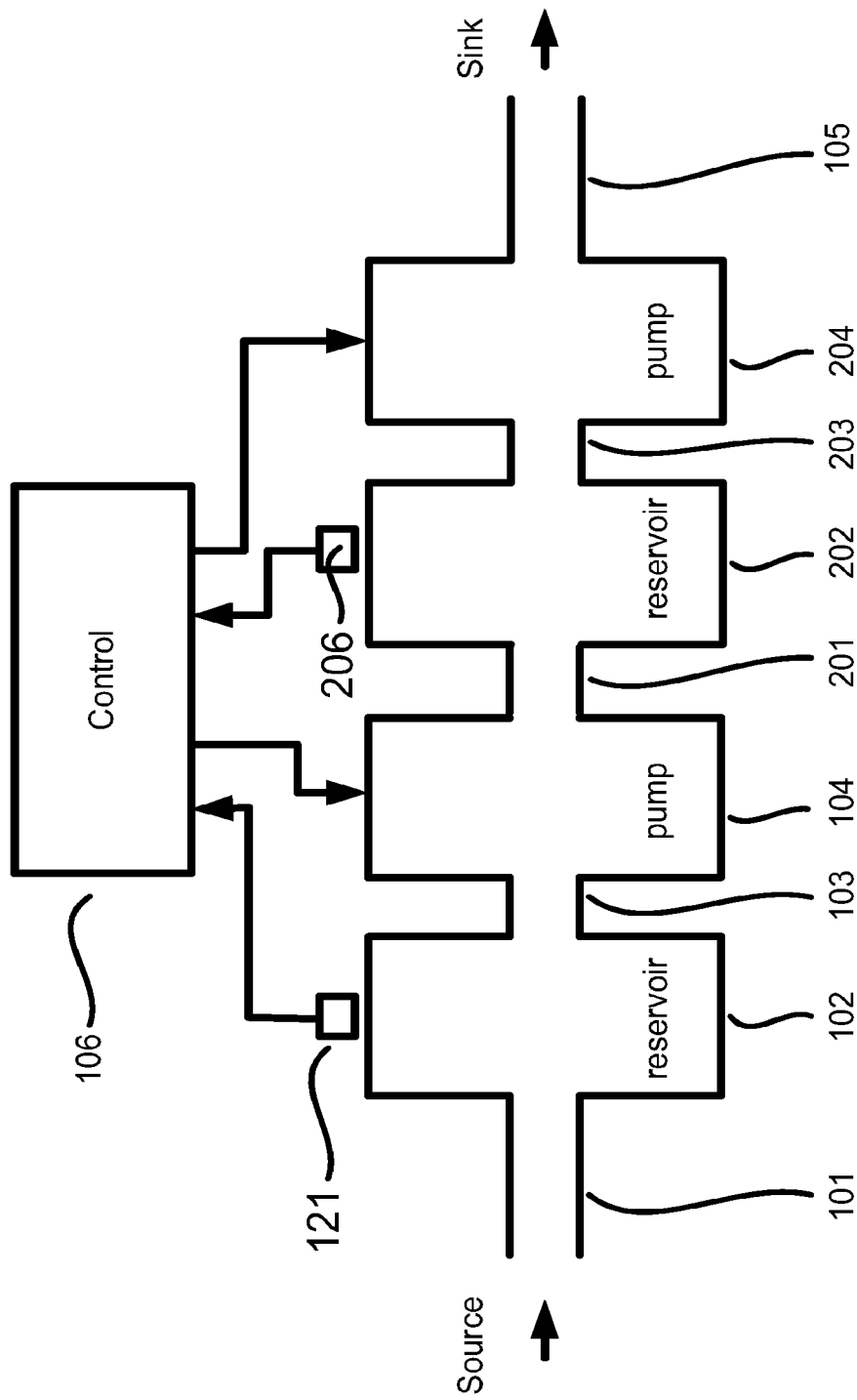
FIG. 27 is a functional block diagram of an exemplary flow meter or flow metering assembly including two or more sets of reservoirs and pumps, in accordance with some embodiments of the present invention.

FIG. 27 is a functional block diagram of an exemplary flow meter or flow metering assembly including two or more sets of reservoirs and pumps, according to embodiments of the present invention. Two or more sets of reservoirs and pumps connected in a cascade configuration may be implemented, wherein a first set of a reservoir and a pump may meter flow, while one or more sets of a reservoir and a pump may regulate sink side downstream back pressure and/or source pressure. The pump of a first set may pump fluid, out of its respective reservoir each time the sensor associated with the first reservoir is triggered. Accordingly, an increasing downstream fluid pressure may be created by the pump of the first set pushing fluid downstream into the reservoir of the second set. In addition, or alternatively, the pressure in the reservoir of the first set may change while the pump of the first set is pumping fluid out of its corresponding reservoir due to fluid entering the reservoir of the first set during a pumping cycle or stroke and/or due to fluid being pumped out of the reservoir. One or more additional sets of reservoirs, sensors and pumps may be used in order to regulate the pressure at the inlet and/or outlet of the pump of the first set. The controller may activate the one or more pumps of the at least one additional sets in order to regulate the pressure in the reservoir of the at least one additional sets and/or in the reservoir of the first set, so that the pump of the first set experiences a substantially near constant pressure, or a substantially near known pressure profile.

In FIG. 27 there is shown, in accordance with some embodiments of the present invention, an exemplary fluid flow meter that comprises two reservoirs (102, 202) and two pumps (104, 204). According to this example the fluid flow measuring device comprises a reservoir (102) connected to a pump (104) through a tube/conduit (103). The amount and/or rate of the fluid flow may be estimated in a similar way as was explained in the previous examples. In order to achieve a stable pressure profile at the output of the pump (104), a second pair of a reservoir (202) and a pump (204) may be connected to the output of the first pump (104). The second reservoir (202) may be of a similar, or a different, size as/than the first reservoir (102). The second pump (204) may be of a similar, or a different, size as/than the first pump (104). The second pump may be of any kind (i.e. no need to estimate the amount it pumps). Control circuit (106) may, based on pressure indicative signals from reservoir pressure sensors (121, 206), operate the second pump (204) in a way that is synchronized with: the operation of the first pump (104), and/or with the amount of fluid in the second reservoir (202); in a way that may cause the amount of fluid or the pressure in the second reservoir (202) to be substantially similar before the start of each stroke of the first pump (104). In a similar way, a third pair of a reservoir and pump may be added at the inlet of the flow meter in order to regulate the pressure at the inlet of the measuring pump (104). According to some embodiments, a pair of a pump and a reservoir may be substituted by a combined pump and reservoir as shown for example in FIGS. 10 and 11.

Figure 28:
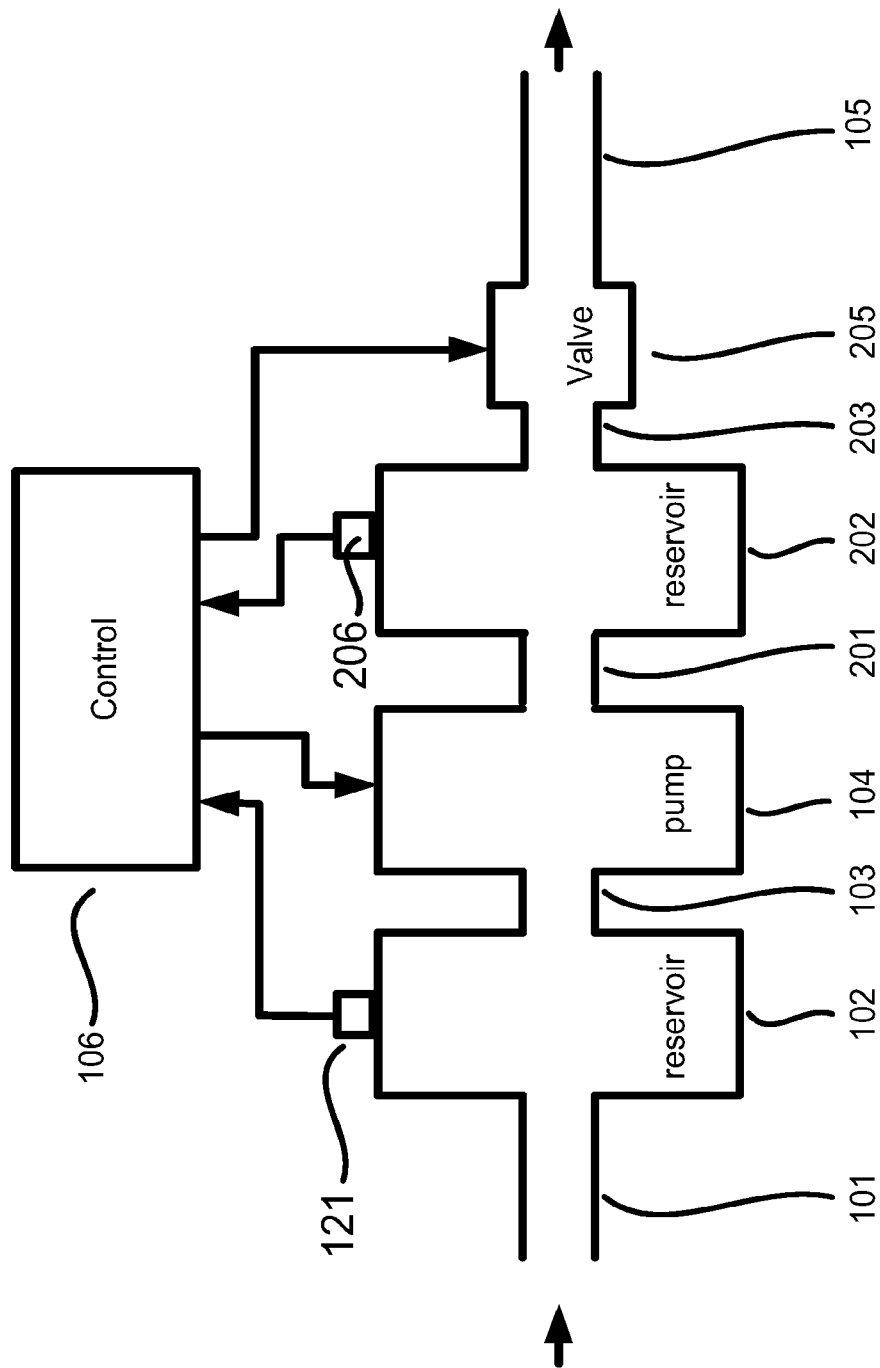
FIG. 28 is a functional block diagram of an exemplary flow meter or flow metering assembly substantially similar to the one described in FIG. 27 including a first set of a reservoir and a pump, and one or more sets of a reservoir and a valve, in accordance with some embodiments of the present invention.

FIG. 28 is a functional block diagram of an exemplary flow meter or flow metering assembly substantially similar to the one described in FIG. 27 including a first set of a reservoir (102) and a pump (104), and one or more sets of a reservoir (202) and a valve (205), according to embodiments of the present invention. A first set of a reservoir and a pump may meter the flow, while one or more second sets of a reservoir and a valve may regulate sink side downstream back pressure, and/or source pressure. Once a pressure sensor in the reservoir of a second set, senses that the pressure in the reservoir is out of some predetermined boundaries, it may signal to the controller which, in response may trigger the opening of its respective valve and the release of at least some of the fluid from the reservoir of the second set, until the pressure in the reservoir of the second set goes back to the pressure within the given boundaries threshold, therefore keeping the pressure in the reservoir of the second set within certain boundaries.

In FIG. 28 there is shown, in accordance with some embodiments of the present invention, an exemplary fluid flow meter that may comprise two or more reservoirs (102, 202), a pump (104) and a valve (205). The flow meter in this example may operate in a substantially similar way to the one shown in the example of FIG. 27. Control circuit (106) may receive pressure indicative signals from a sensor (121) functionally associated with reservoir (102), and may thus estimate the amount of fluid in it. Upon fluid in reservoir (102) reaching an amount that may be substantially near a predefined amount, the control circuit (106) may instruct the pump (104) to pump fluid from the reservoir (102) to reservoir (202). When fluid flows into reservoir (202), the pressure in the reservoir (202) may increase. A second sensor (206) may send signals indicative of that pressure to the control circuit (106) which may control the opening of a valve (205) at the outlet of the reservoir (202) releasing fluid out of it in order to keep the pressure in it within predetermined boundaries. Accordingly, the pump (104) may operate while the pressure on its outlet and/or inlet is within certain predefined boundaries. In a similar way, a valve may be attached to the inlet of a reservoir that is attached to the inlet of a pump, and may regulate the pressure in the reservoir at the inlet of the pump.

Figure 29:
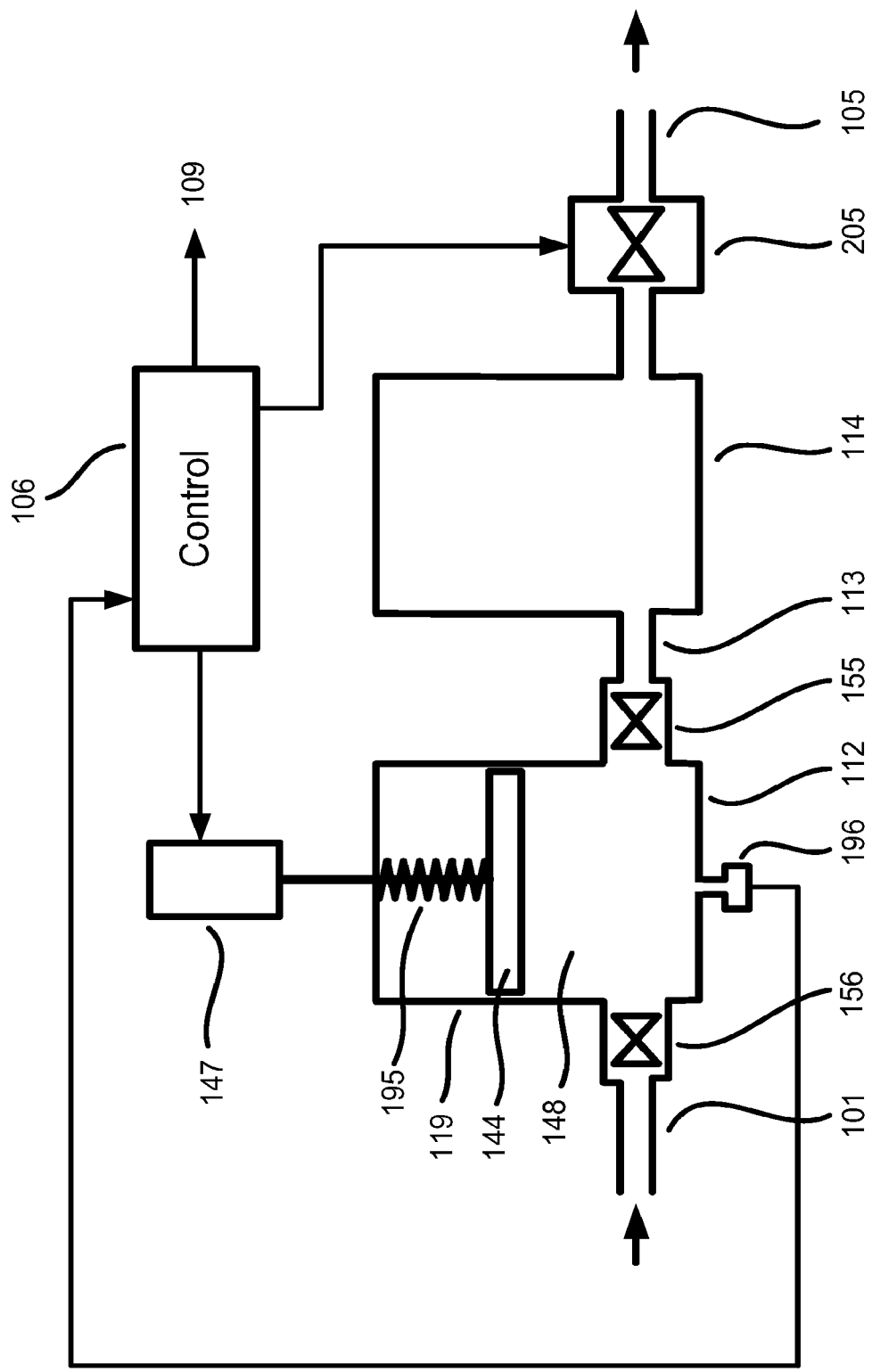
FIG. 29 is a functional block diagram of an exemplary flow meter combining a piston type pump/reservoir and pressure sensor assembly with a downstream pressure stabilizing reservoir, in accordance with some embodiments of the present invention.

FIG. 29 is a functional block diagram of an exemplary flow meter combining a piston type pump/reservoir (119) and pressure sensor assembly (196) with a downstream pressure stabilizing reservoir (114) according to embodiments of the present invention. The piston type pump/reservoir and pressure sensor assembly includes: an inlet unidirectional valve (156), an outlet unidirectional valve (155) with a biasing force and a pump/reservoir chamber pressure sensor (196). The pump/reservoir chamber is biased by a biasing structure (e.g. a spring (195) biased piston (144)) having a biasing force higher than that of the pump inlet valve, such that fluid entering the assembly under positive pressure is directed into the pump/reservoir chamber. Fluid entering the pump/reservoir chamber while the piston actuator (147) is inactive (i.e. in idle mode) causes the pump/reservoir piston (144) to rise against the resistance of a piston movement resisting element (e.g. a spring). The pump/reservoir chamber pressure sensor may measure the pressure in the pump/reservoir chamber providing pressure indicative signals to a functionally associated controller (106). Upon reaching a pressure threshold level, the controller which may also be functionally associated with the pump piston, may trigger the activation of the piston actuator and start a discharge phase of the piston type pump. During the discharge, collected fluid in the pumping chamber (148) is forced to exit through the pump outlet unidirectional valve. Since the pump's unidirectional inlet valve is forced shut during discharge, fluid in the pump chamber is forced through the outlet unidirectional valve and into the downstream pressure stabilizing reservoir (114). During discharge, the pressure in the pump's chamber and in the pressure stabilizing chamber may grow. Upon receiving a pressure signal from the pressure sensor indicating that a threshold stabilized pressure in the pump has been reached, the controller which may also be functionally associated with a controllable valve (205) at the pressure stabilizing reservoir's outlet, may trigger the opening of the controllable valve allowing at least some of the fluid to flow out of the pressure stabilizing reservoir to the sink side. Upon receiving a pressure signal indicating that the pressure has dropped to/beyond a threshold stabilized pressure, the controller may trigger the closing of the controllable valve preventing further fluid from flowing out of the reservoir.

In FIG. 29 there is shown, in accordance with some embodiments of the present invention, an exemplary fluid flow meter. In this example the flow meter comprises a combined pump/reservoir (119), a reservoir (114), a controllable valve at the reservoir's outlet (205), a pump pressure sensor (196), and control circuit (106). In the exemplified meter shown in FIG. 29 the pump is a piston positive displacement pump which may comprise a chamber (148), a piston (144), a spring (195) for pushing the piston down, an inlet valve (156), an outlet valve (155), and an actuator (147). Fluid flowing into the pump from the inlet (101) may fill the pump chamber (148) and push the piston (144) up, squeezing the spring (195). As the spring (195) squeezes, the fluid pressure in the chamber space (148) may increase; the pressure may be a function of the distance of movement of the piston and therefore may be indicative of the amount of fluid in the pump's chamber (148). The pressure in the chamber space (148) of the pump may be estimated by a pressure sensor (196). The pressure sensor (196) may send a signal indicative of the estimated pressure in the pump's chamber to the control circuit (106). Upon reaching a predefined pressure (which may correspond to a predefined amount of fluid in the pump chamber), the control circuit (106) may send a signal to the pump actuator (147) instructing it to push the piston (144) down and perform a discharge phase of the stroke. During the discharge phase the pressure in the pump chamber (148) may be proportional to the pressure in the reservoir (114). The control circuit (106) may receive a signal indicative of the pressure in the pump chamber (148) from the pressure sensor (196), and when the pressure increases to, or beyond, a predefined pressure the control circuit (106) may send a signal to the controllable valve at the reservoir's outlet (205) instructing it to open and release fluid out of the reservoir (114) through the outlet (105) until the pressure drops to within predefined boundaries. According to this example, the pressure sensor (196) may have a dual purpose; during the pump intake phase the pressure sensor (196) may indicate the amount of fluid in the pump chamber (148), during the discharge phase the pressure sensor (196) may indicate the pressure in the reservoir (114).

In some cases it may be forbidden to have electrical signals in proximity to the measured fluid (for instance, when measuring highly explosive fluids). In other cases the size of the flow meter may need to be very small, and in some cases the flow meter may have a requirement of having very little maintenance. In these cases it may be advantageous to uses a hydraulic or pneumatic system in which no electrical signals are present in, or near the pump, and the hydraulic/pneumatic compressor may be located in a distance from the explosive fluid.

Figure 30:
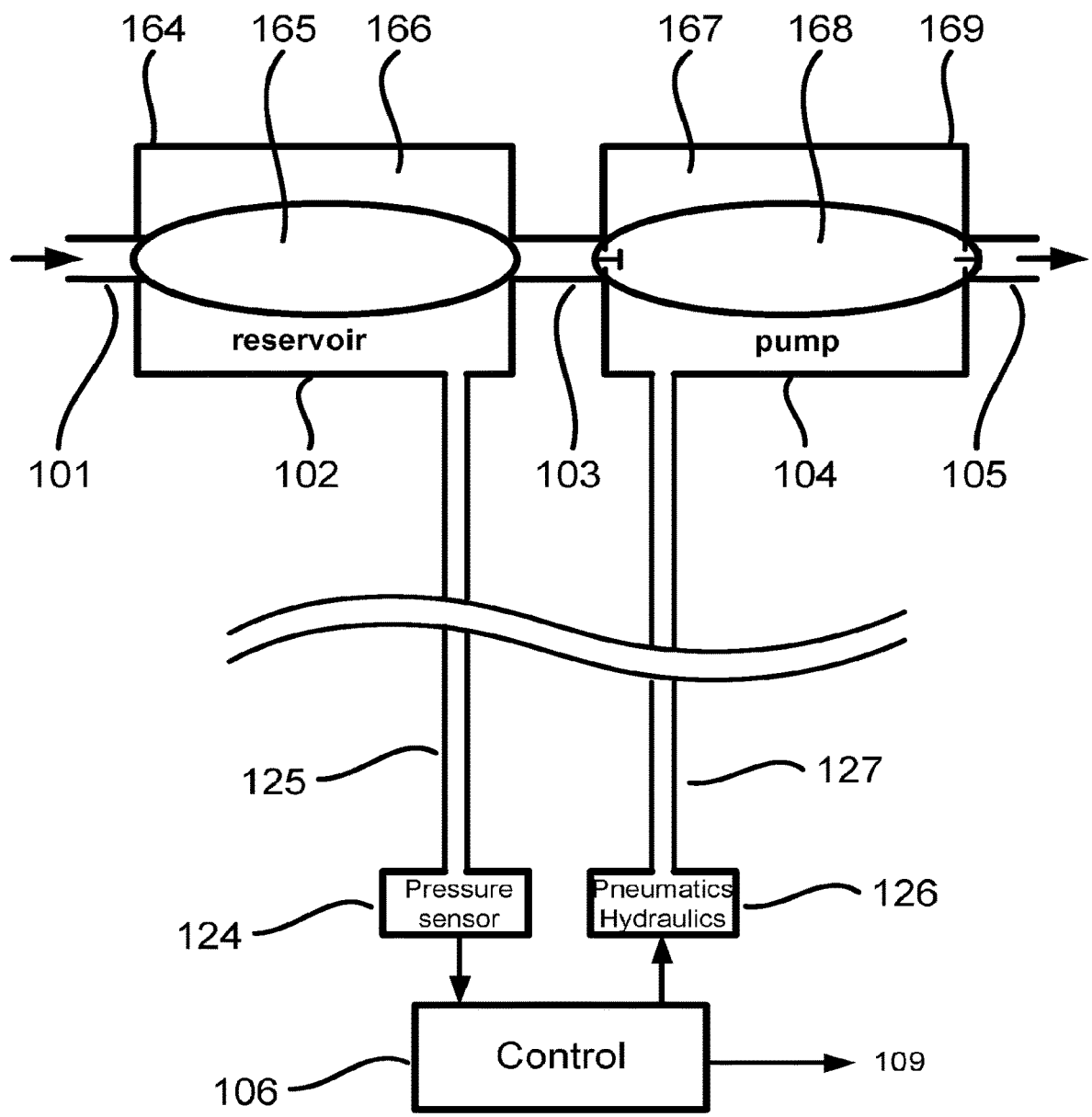
FIG. 30 is a functional block diagram of an exemplary flow meter assembly including a pneumatics/hydraulics based pump and reservoir sensor, in accordance with some embodiments of the present invention.

FIG. 30 is a functional block diagram of an exemplary flow meter assembly including a pneumatics/hydraulics based pump (104) and reservoir sensor (124) according to embodiments of the present invention. The pneumatic/hydraulic flow meter assembly may include a flexible reservoir chamber (165) and a flexible pump chamber (168). The flexible reservoir chamber may be positioned within a tank (164) containing hydraulic liquid or pneumatic gas (166) with a hydraulic/pneumatic liquid/gas containing tube (125) connected to a hydraulic/pneumatic pressure sensor (124) that may possibly be positioned at a remote location. The hydraulic/pneumatic pressure sensor (124) may send signals indicative of the pressure to a functionally associated controller (106). As fluid from the source side of the assembly enters the flexible reservoir chamber through its inlet (101) and causes it to stretch out, the surrounding hydraulic liquid or pneumatic gas in the tank may get pressurized. Once a signal indicating that a threshold pressure has been sensed by the hydraulic/pneumatic pressure sensor, is received by the controller, it may trigger the operation of a functionally associated hydraulic/pneumatic compressor (126) connected by a hydraulic/pneumatic liquid/gas containing tube (127) to a second tank (169) containing hydraulic liquid or pneumatic gas (167), possibly positioned at a remote location (e.g. in proximity to the reservoir), in which the flexible pump chamber (168) is positioned. The hydraulic/pneumatic pressure in the second tank may cause the flexible chamber of the pump to squeeze in, causing at least some of the fluid contained in the pump chamber to flow out of the assembly outlet (105) to the sink side. A set of unidirectional valves at the inlet and outlet of the pump may direct the fluid flow towards the sink side of the assembly while preventing it from flowing back through the conduit (103) connecting the reservoir and the pump and towards/into the reservoir chamber. As the squeezed pump chamber returns to its non-squeezed position it may create negative pressure in its chamber and thus refill by drawing additional fluid from the reservoir chamber through the conduit and into its chamber.

In FIG. 30 there is shown, in accordance with some embodiments of the present invention, an exemplary fluid flow meter. According to this example there is a fluid flow meter comprising a reservoir assembly (102) connected to a pump assembly (104) through a tube (103). In this example the reservoir assembly (102) comprises a reservoir tank (164) and a flexible/elastic reservoir chamber (165). The space between the tank (164) and the reservoir chamber (165) may be filled with hydraulic or pneumatic fluid (166). A tube (125) may connect the interior of the reservoir tank (164) with a pressure sensor (124), which may possibly be positioned at a remote location from the reservoir assembly (102). When fluid flows into the reservoir chamber (165) from the inlet (101), the chamber may expand and increase the pressure of the hydraulic/pneumatic fluid, this pressure change may be sensed by the pressure sensor (124). The pump assembly (104) may comprise a pump tank (169) and a flexible/elastic pump chamber (168). The space between the pump tank (169) and the flexible/elastic pump chamber (168) may be filled with hydraulic or pneumatic fluid (167). A tube (127) may connect the interior of the pump tank (169) with a pneumatic/hydraulic system (126) which may include a compressor and valves. The pneumatic/hydraulic system (126) may possibly be positioned at a remote location from the pump assembly (104).

According to some embodiments, the pneumatic/hydraulic system (126) may inject/compress pneumatic/hydraulic fluid through tube (127) into the hydraulic or pneumatic fluid space (167) between the interior of the pump tank (169) and the flexible/elastic pump chamber (168). The pressure of the pneumatic/hydraulic fluid in the pump tank (169) may compress the flexible/elastic pump chamber (168) and push the fluid that is inside the pump chamber, out of the chamber (168) through the outlet (105). When the pneumatic/hydraulic system releases the pressure of the pneumatic/hydraulic fluid, the measured fluid from the reservoir chamber (165) may flow into the pump chamber (168). Control circuit (106) may receive a signal indicative of the pressure in the reservoir chamber (165) and may control the operation of the pneumatic/hydraulic system. Those skilled in the art may find that similar designs may be thought of, such as having a diaphragm or piston separating between two parts of the reservoir/pump tank, one part containing the measured fluid, and the other part containing the hydraulic/pneumatic fluid; other designs may construct tubes (125) and (127) as two lumens of a single tube. These all fall within the true spirit of the present invention.

Figure 31A:
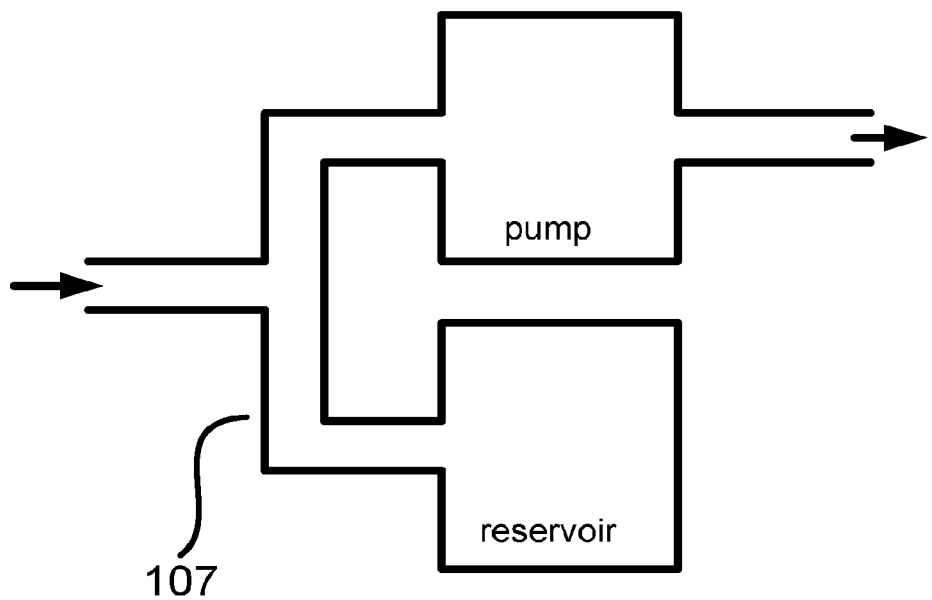
FIG. 31a is a functional block diagram exemplifying a derivative embodiment of the flow meter/assembly of FIG. 1, wherein the inlet from which source fluid enters the flow meter/assembly, is positioned on the conduit between the reservoir and the pump, in accordance with some embodiments of the present invention.
Figure 31B:
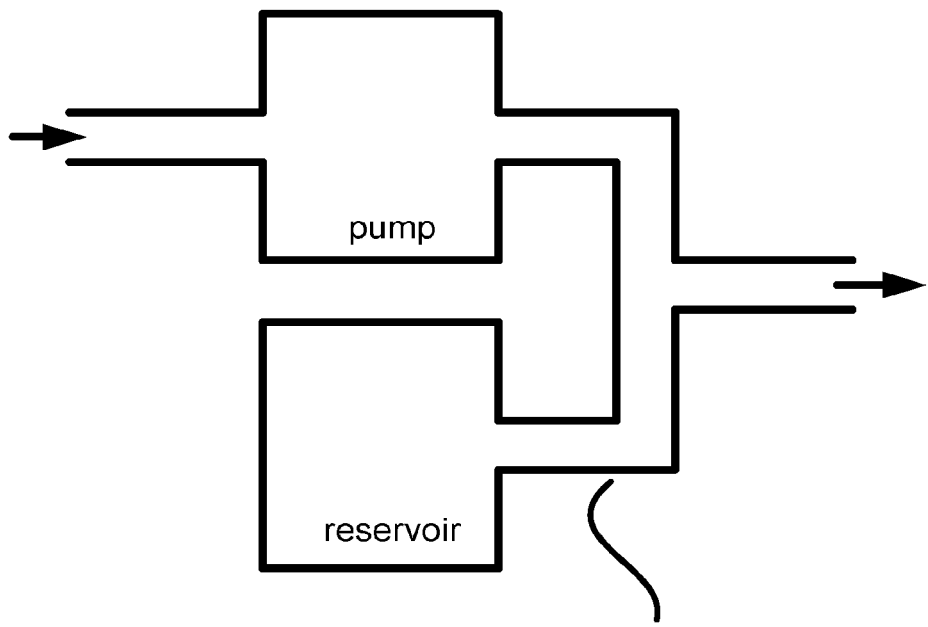
FIG. 31b is a functional block diagram exemplifying a derivative embodiment of the flow meter/assembly of FIG. 2, wherein the outlet from which fluid exits the flow meter/assembly to the sink, is positioned on the conduit between the reservoir and the pump, in accordance with some embodiments of the present invention.

FIG. 31a is a functional block diagram exemplifying a derivative embodiment of the flow meter/assembly of FIG. 1 according to embodiments of the present invention, wherein the inlet from which source fluid enters the flow meter/assembly, is positioned on the conduit (107) between the reservoir and the pump. FIG. 31b is a functional block diagram exemplifying a derivative embodiment of the flow meter/assembly of FIG. 2 according to embodiments of the present invention, wherein the outlet from which fluid exits the flow meter/assembly to the sink, is positioned on the conduit (108) between the reservoir and the pump.

In FIGS. 31a and 31b there are shown, in accordance with some embodiments of the present invention, exemplary fluid flow meters. The operation of the flow meter according to the example in FIG. 31a may be substantially similar to the operation of the device shown in the example of FIG. 1, and the operation of the device according to the example in FIG. 31b may be substantially similar to the operation of the device shown in the example of FIG. 2. The difference between the examples shown in FIGS. 31a and 31b to the examples shown in FIGS. 1 and 2 respectively, is that in the example of FIG. 1 the fluid flows into the reservoir through conduit (101) and pumped out of the reservoir through conduit (103), whereas in the example shown in FIG. 31a the fluid flows into the reservoir and pumped out of the reservoir through the same conduit (107). In the example of FIG. 2 the fluid is pumped into the reservoir through conduit (113) and flows out of the reservoir through conduit (105), while in the example shown in FIG. 31b the fluid is pumped into the reservoir and flows out of the reservoir through the same conduit (108).

Figure 41:
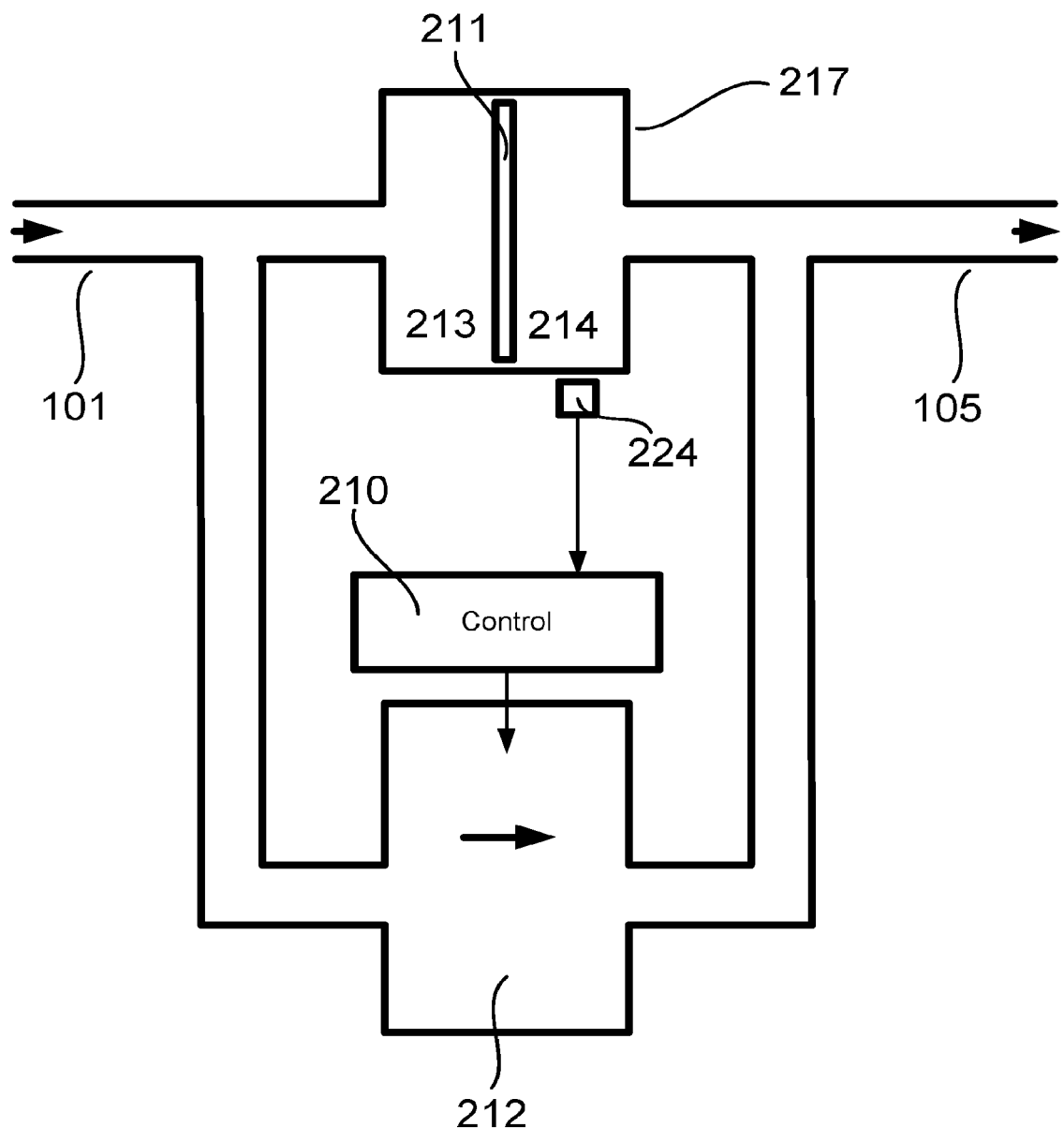
FIG. 41 is a functional block diagram of an exemplary flow meter assembly including two fluid channels wherein a first channel includes a pump and a second channel includes a dynamic separating element/object positioned within a chamber, in accordance with some embodiments of the present invention.

FIG. 41 is a functional block diagram of an exemplary flow meter assembly including two fluid channels wherein a first channel includes a pump (212) and a second channel includes a dynamic separating element/object (211) positioned within a chamber (217), according to embodiments of the present invention. Fluid flowing through the fluid flow meter may flow from the inlet of the flow meter (101) into the chamber causing the chamber side (213) which is in fluid contact with the inlet of the fluid flow meter to fill and therefore may cause a substantially similar amount of fluid from the chamber side (214) which is in fluid contact with the outlet (105) of the fluid flow meter to be pushed out through the outlet of the fluid flow meter in such a way that it will seem as if the fluid actually flowed through the chamber. The dynamic separating element/object positioned within the chamber may prevent the flow and passage of fluid from one side of the chamber to the other. Fluid flow from the source may create pressure buildup which may cause the dynamic separating object to move/slide/travel within the chamber away from the source side and towards the sink side, wherein the movement of the dynamic separating element/object beyond a threshold point or distance may trigger a sensor/switch (224) to send a signal to a functionally associated controller (210). In response, the controller may trigger the operation of the first channel pump (212), causing it to initiate a single or a set of pumping stroke(s) and/or cycle(s), of known/substantially-near-fixed amount of fluid, from the first channel source side to the first channel sink side. The pumping of fluid may cause a drop in fluid pressure in the source side of the assembly and possibly an increase in fluid pressure in the sink side of the assembly. The pressure difference may cause the dynamic separating object to move/slide/travel within the chamber back to, or towards, its initial position, allowing for pressure to be built again on the source side of the assembly.

In FIG. 41 there is shown, in accordance with some embodiments of the present invention, an exemplary fluid flow meter. In this example, the flow meter comprises a pump (212), and a chamber (217) which may be divided into two sub-chambers by a dynamic separating element/object (211). The first sub-chamber (213) may be in fluid contact with the inlet (101) of the flow meter, and the second sub-chamber (214) may be in fluid contact with the outlet (105) of the flow meter. The dynamic separating element/ object (211) may separate between the two sub-chambers (213) and (214) of the chamber (217). The flow meter further comprises a sensor (224) that may be triggered by a movement of the dynamic separating element/object (211) beyond a threshold point or distance and send a signal to control circuit (210). The control circuit (210) may then send a command to the pump (212) instructing it to perform one or more pumping strokes/cycles in order to pump fluid in the direction of the arrow in the drawing (i.e. from the side 'in fluid contact with the inlet (101)' to the side 'in fluid contact with the outlet (105)') causing fluid to be displaced from sub-chamber (213)—decreasing the pressure inside it, and into sub-chamber (214)—increasing the pressure inside it; thus causing the dynamic separating element/object (211) to move away from the sensor, towards its initial position. This process may be repeated cyclically as long as fluid is flowing through the flow meter from the inlet (101) to the outlet (105). The control circuit (210) may count the number of pumping strokes/cycles and calculate the amount of fluid that flowed through the flow meter and the flow rate.

Figure 32:
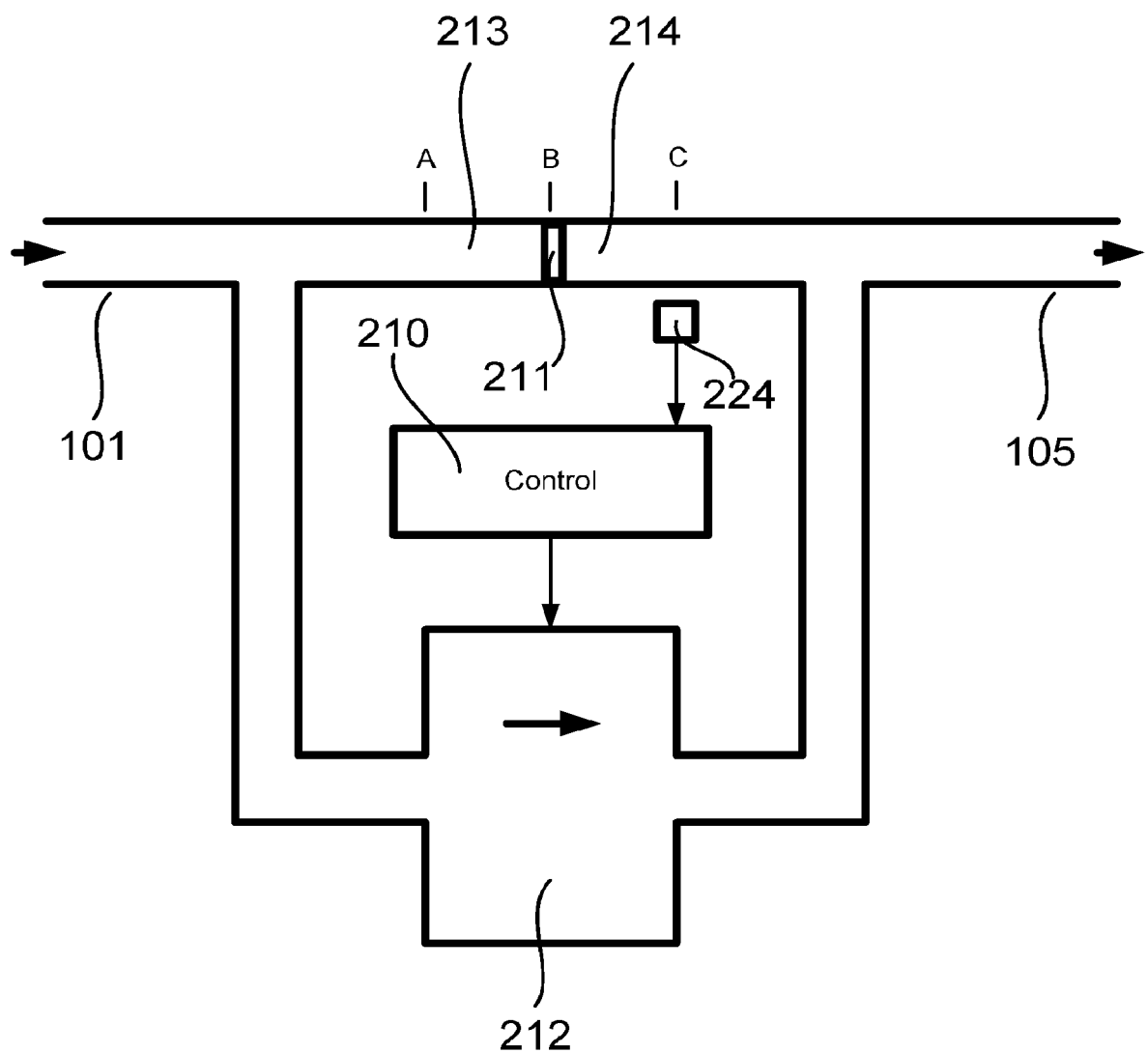
FIG. 32 is a functional block diagram of the exemplary flow meter assembly of FIG. 41 according to embodiments of the present invention, wherein the second channel includes a dynamic separating object adapted to move/slide/travel within the second channel itself, in accordance with some embodiments of the present invention.

FIG. 32 is a functional block diagram of the exemplary flow meter assembly of FIG. 41 according to embodiments of the present invention, wherein the second channel includes a dynamic separating object (211) adapted to move/slide/travel within the second channel itself (e.g. the tube of the second channel) rather than inside a chamber.

In FIG. 32 there is shown, in accordance with some embodiments of the present invention, an exemplary fluid flow meter which is substantially similar to the example of FIG. 41. In this example the chamber, in which a dynamic separating element/object (211) travels, is a section/part of the tube connecting the inlet (101) of the flow meter to the outlet (105) of the flow meter. According to some embodiments, the dynamic separating element/object (211) positioned in the chamber may obstruct direct flow of fluid from the inlet (101) to the outlet (105). As fluid flows into the flow meter, the sub-chamber (213) which is in fluid contact with the inlet (101), may fill and cause the dynamic separating element/object (211) to move in the direction of the flow (i.e. from point B towards point C) until it reaches a point substantially near a sensor (224) at point C. The movement of the dynamic separating element/object (211) may cause fluid in the sub-chamber (214) which is in fluid contact with the outlet (105), to be pushed out towards the outlet (105) so that in practice it may seem that fluid flowed from the inlet (101) to the outlet (105) as if there was no obstructing object. According to some embodiments, when the dynamic separating element/object (211) reaches a point substantially near a predefined location, the sensor (224) may send a signal to the control circuit (210), the control circuit may then command the pump (212) to strike at least one pumping stroke or cycle that may displace fluid from the sub-chamber (213) which is in fluid contact with the inlet (101) to the sub-chamber (214) which is in fluid contact with the outlet (105). The filling of the sub-chamber (214) which is in fluid contact with the outlet (105) and emptying of the sub-chamber (213) which is in fluid contact with the inlet (101) may cause the dynamic separating element/object (211) to move back from point C towards point A. New fluid flowing into the flow meter may flow into the sub-chamber (213) which is in fluid contact with the inlet (101) and may push the dynamic separating element/object (211) again towards point C. This process may be repeated cyclically as long as fluid flows through the flow meter. In a similar way, fluid may by sucked out of the sub-chamber (214) which is in fluid contact with the outlet, from the outlet (105) of the flow meter, causing the obstructing object to move towards point C therefore causing fluid to be sucked into the sub-chamber (213) which is in fluid contact with the inlet, from the inlet (101) of the flow meter.

Figure 33A:
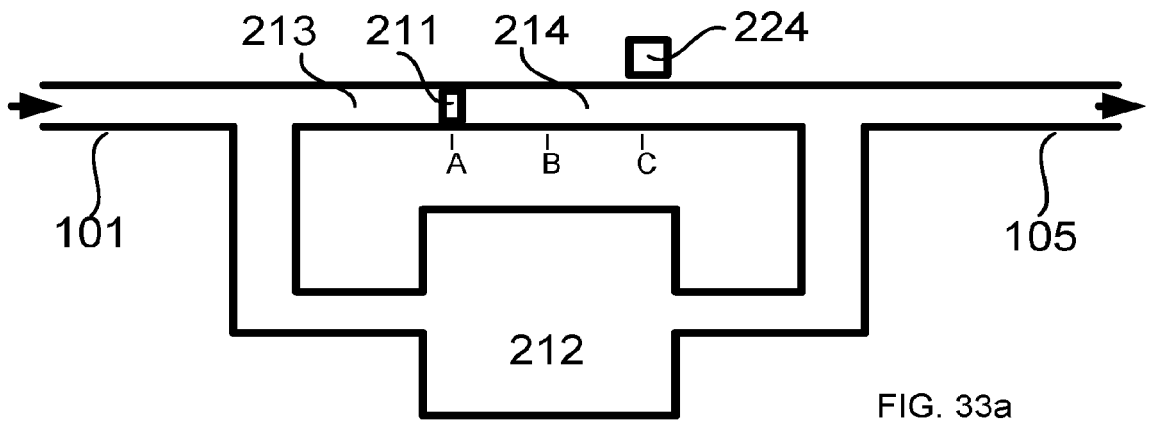
FIGS. 33a through 33c are functional block diagrams showing possible operation steps of the exemplary flow meter assembly of FIG. 32, in accordance with some embodiments of the present invention.
Figure 33B:
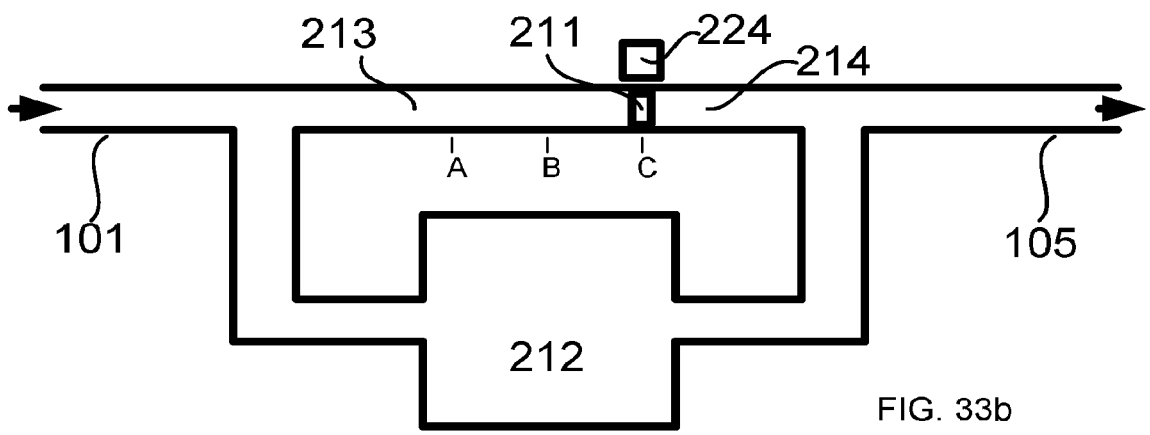
Figure 33C:
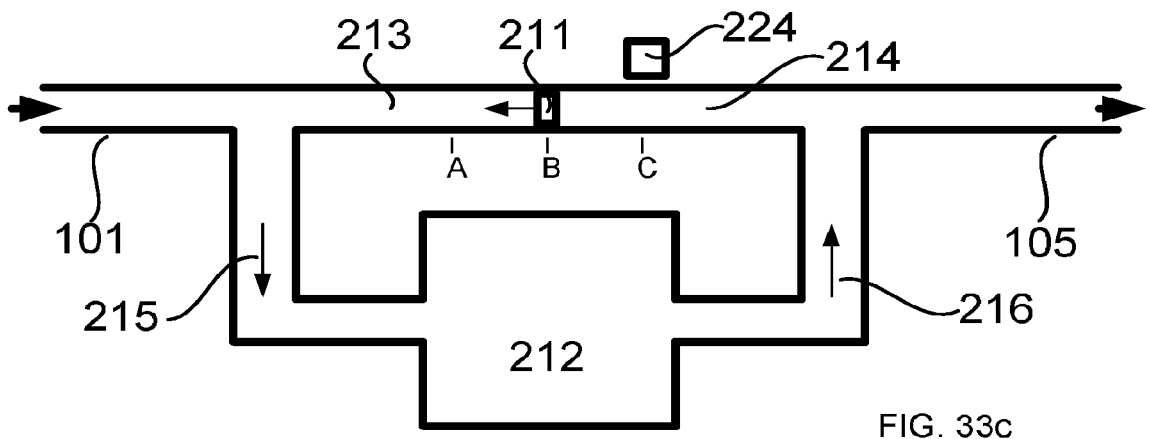

FIGS. 33a through 33c are functional block diagrams showing possible operation steps of the exemplary flow meter assembly of FIG. 32 according to embodiments of the present invention, wherein the dynamic separating object (211) is shown: in its initial position (33a); substantially near the end of its movement/sliding/traveling pass triggering the initiation of a single or a set of pumping cycle(s)/stroke(s) (33b); and moving/sliding/traveling back towards its initial position as pressure on the sink side of the assembly (214) has increased due to the operation of the first channel pump (212) (33c).

In FIGS. 33a through 33c there are shown, in accordance with some embodiments of the present invention, possible operation states of the exemplary fluid flow meter of FIG. 32. FIG. 33a shows a sensor in point C and the dynamic separating element/object (211) in point A. As fluid flows into the sub-chamber (213) which is in fluid contact with the inlet (101), from the inlet (101) of the flow meter, and fluid from the sub-chamber (214) which is in fluid contact with the outlet (105), flows out of the flow meter through the outlet (105), the dynamic separating element/object (211) may move towards point C as shown in FIG. 33b. When the dynamic separating element/object (211) reaches point C, it may send a signal to a control circuit (not shown), which in turn may control the operation of the pump (212) which may pump one or more pumping strokes or cycles displacing fluid from the sub-chamber (213) which is in fluid contact with the inlet to the sub-chamber (214) which is in fluid contact with the outlet an therefore move the dynamic separating element/object (211) back towards point A as shown in FIG. 33c.

Figure 34:
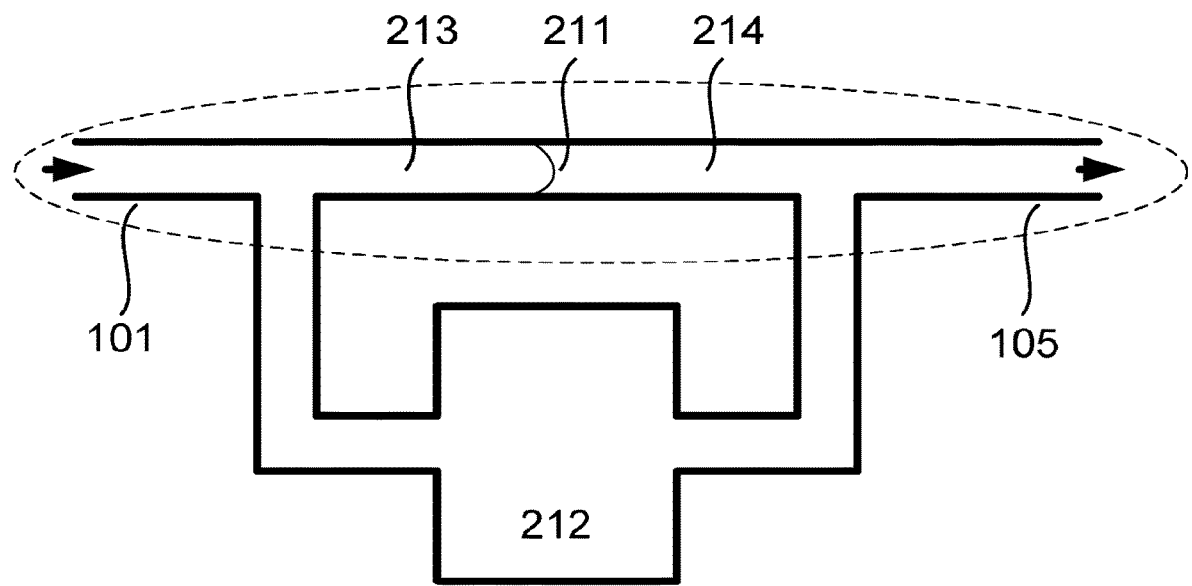
FIG. 34 is a functional block diagram exemplifying a derivative embodiment of the flow meter/assembly of FIG. 33a through 33c, wherein the separating object is in the form of a flexible sheet/membrane, in accordance with some embodiments of the present invention.
Figure 35A:
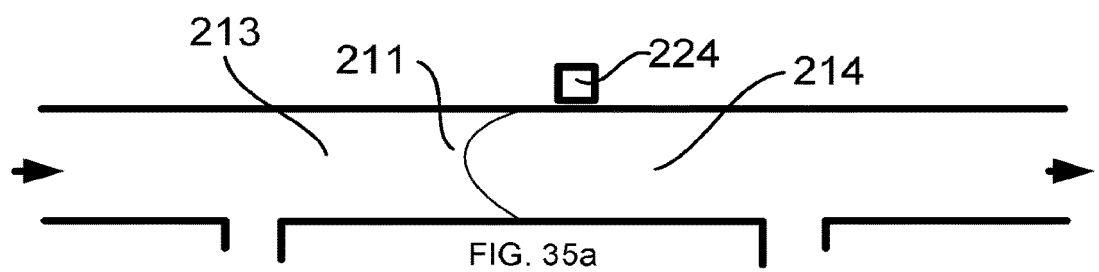
FIGS. 35a and 35b are exemplary enlargements of the area circled with a dashed line in FIG. 34.
Figure 35B:
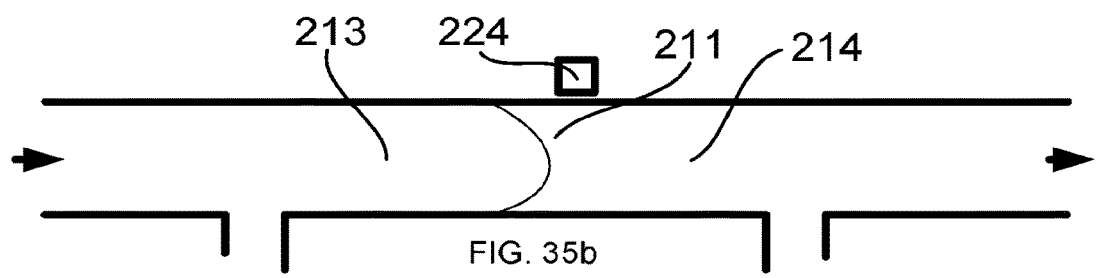

FIG. 34 is a functional block diagram exemplifying a derivative embodiment of the flow meter/assembly of FIG. 33a through 33c, according to embodiments of the present invention, wherein the separating object (211) is in the form of a flexible sheet/membrane attached to the walls/sides of the second channel. In FIGS. 35a and 35b the sheet/membrane is shown: in its initial position (35a) wherein higher pressure on the sink side of the assembly causes it to stretch/convex towards the source side; and in its sensor/switch triggering position (35b) wherein pressure buildup on the source side has caused it to stretch/convex towards the sink side.

In FIGS. 34, 35a and 35b there are shown, in accordance with some embodiments of the present invention, an exemplary fluid flow meter substantially similar to the flow meter of FIG. 32, comprising a flexible sheet/membrane attached to the walls/sides of one of its channels, and possible operation states thereof. FIG. 34 shows the flexible sheet/membrane (211) attached to the walls of the channel therefore separating it into two sub-chambers (213) and (214). The flexible sheet/membrane (211) may be of a flexible material or may be dangling from the walls of the channel. FIGS. 35a and 35b are enlargements of the area circled with a dashed line in FIG. 34. FIG. 35a shows the flexible sheet/membrane (211) in a first position. As fluid flows from the inlet (101) into the sub-chamber (213) which is in fluid contact with the inlet, and out of the sub-chamber (214) which is in fluid contact with the outlet, through the outlet (105); the flexible sheet/membrane (211) may move to the position shown in FIG. 35b. When the flexible sheet/membrane (211) reaches the position shown in FIG. 35b, the sensor (224) may detect its position and send a signal to the control circuit (not shown) (e.g. to trigger the operation of the flow meter pump).

Figure 36:
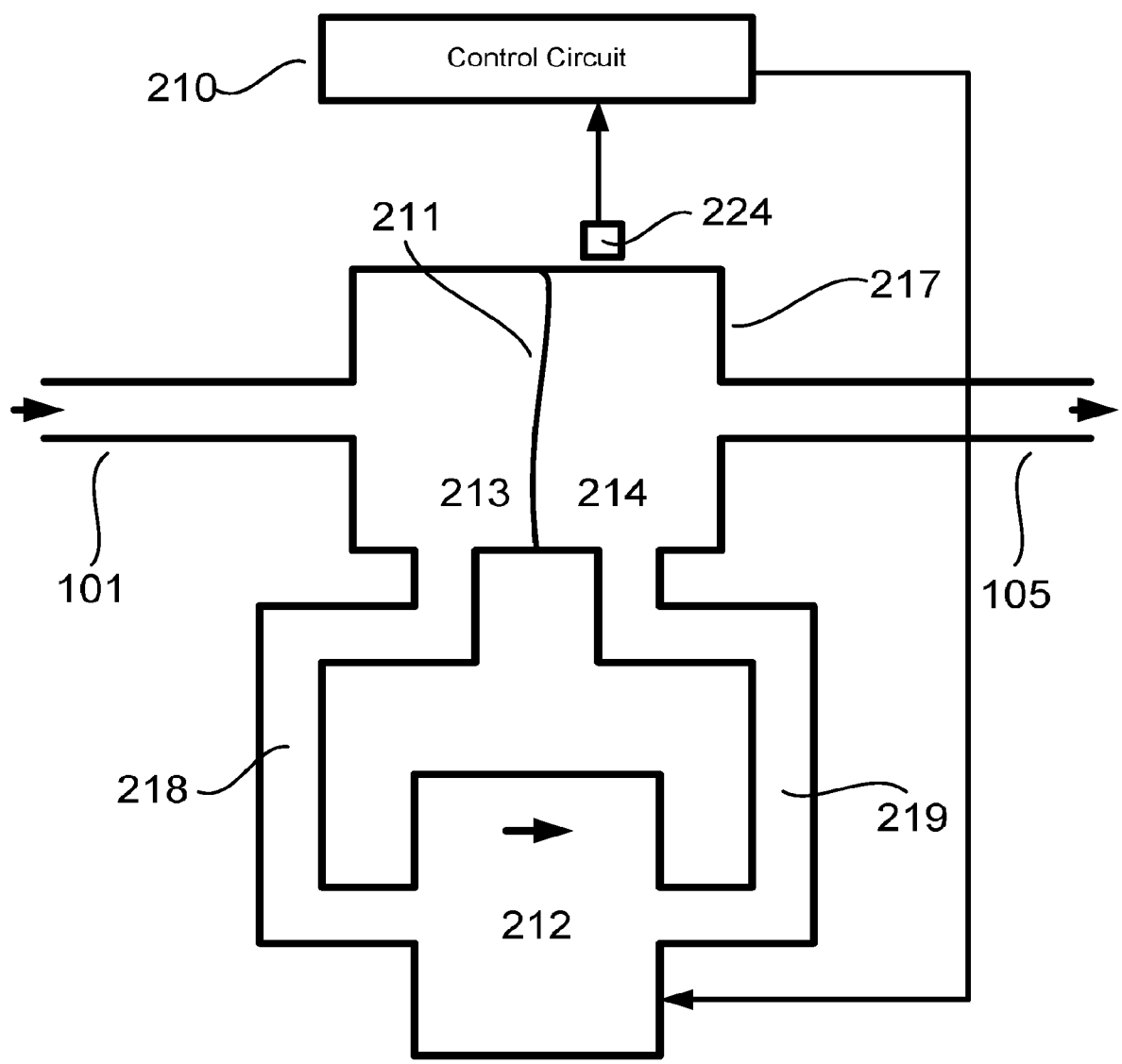
FIG. 36 is a functional block diagram exemplifying a derivative embodiment of the flow meter/assembly of FIG. 34 or FIG. 41, wherein the separating flexible sheet/membrane or element/object is positioned within a chamber, in accordance with some embodiments of the present invention.

FIG. 36 is a functional block diagram exemplifying a derivative embodiment of the flow meter/assembly of FIG. 34 or FIG. 41, wherein the separating flexible sheet/membrane or element/object (211) is positioned within a chamber (217), and a channel—somewhere along which a pump is positioned, leads from the chamber side of the separating flexible sheet/membrane (or element/object) closer to the source, to the chamber side of the separating flexible sheet/membrane (or element/object) closer to the sink, according to embodiments of the present invention. Fluid displaced from the source side of the flexible sheet/membrane of the chamber (213) by the pump may be routed through the channel back into the chamber on the sink side (214) of the flexible sheet/membrane.

In FIG. 36 there is shown, in accordance with some embodiments of the present invention, an exemplary fluid flow meter substantially similar to the flow meter of FIG. 34 or FIG. 41, comprising a flexible sheet/membrane attached to the walls/sides of a chamber. The fluid flow meter comprises a pump (212), a chamber (217), a dynamic separating element/object in the form of a flexible sheet/membrane (211) that may divide the chamber (217) into two sub-chambers (213, 214), an inlet port (101) which may lead fluid to the chamber (217), an outlet port (105) which may lead fluid out of the chamber (217), and a sensor (224). Fluid flowing from the inlet (101) into sub-chamber (213) of the chamber (217) may cause fluid to flow out of sub-chamber (214) of the chamber (217) and the flexible sheet/membrane (211) to move towards the sensor (224). Once the flexible sheet/membrane (211) reaches a location which is substantially near a predefined point, the sensor (224) may detect it and send a signal to a control circuit (210). Upon receiving a signal from the sensor (224), the control circuit (210) may command the pump (212) to pump at least one stroke or cycle which will displace fluid from sub-chamber (213) to sub-chamber (214) of the chamber (217) through conduits (218,219). The fluid displacement from sub-chamber 213 to sub-chamber 214 may move the obstructing object away from the sensor (224) and the process may be repeated again as new fluid flows in through the inlet (101). The control circuit (210) may calculate the amount of fluid that flowed through the flow meter by accumulating the volumes displaced by the pump (212). The flow rate may be calculated by dividing the amount of fluid that flowed through the measuring device in any given time period, by that time period.

Figure 37:
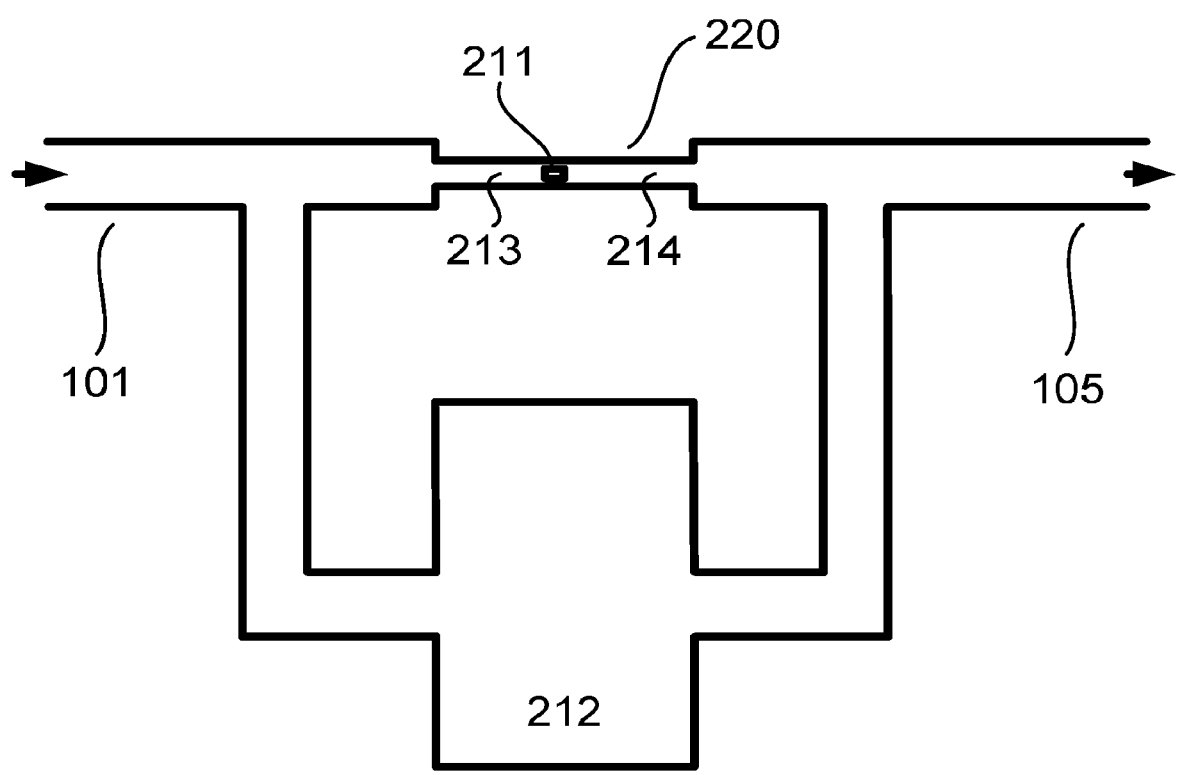
FIG. 37 is a functional block diagram exemplifying a derivative embodiment of the flow meter/assembly of FIG. 32, wherein at least a portion of the second channel is narrower than the rest of the channel, in accordance with some embodiments of the present invention.

FIG. 37 is a functional block diagram exemplifying a derivative embodiment of the flow meter/assembly of FIG. 32, wherein at least a portion of the second channel is narrower than the rest of the channel, according to embodiments of the present invention. Accordingly, the dynamic separating object adapted to move/slide/travel within the second channel itself (e.g. the tube of the second channel) may be likewise narrower, causing it to move/slide/travel a longer distance through its channel, than it would have travelled in a non-narrowing channel, in response to a similar change in pressure between the source and sink sides of the channel.

In FIG. 37 there is shown, in accordance with some embodiments of the present invention, an exemplary fluid flow meter substantially similar to the flow meter of FIG. 32. In this example, the chamber (220) may have a small crosscut which may cause the dynamic separating element/object (211) to move a long distance in response to relatively small fluid flow/displacement/pressure-difference and thus increase the flow meter sensitivity to low flow.

Figure 38:
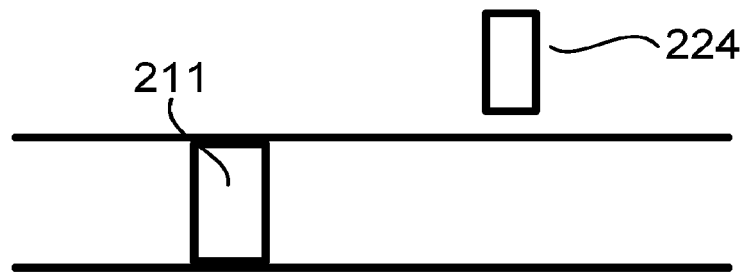
FIGS. 38 through 40 are diagrams of various exemplary sensor types that may be implemented for sensing the movement of a dynamic separating object, in accordance with some embodiments of the present invention.
Figure 39:
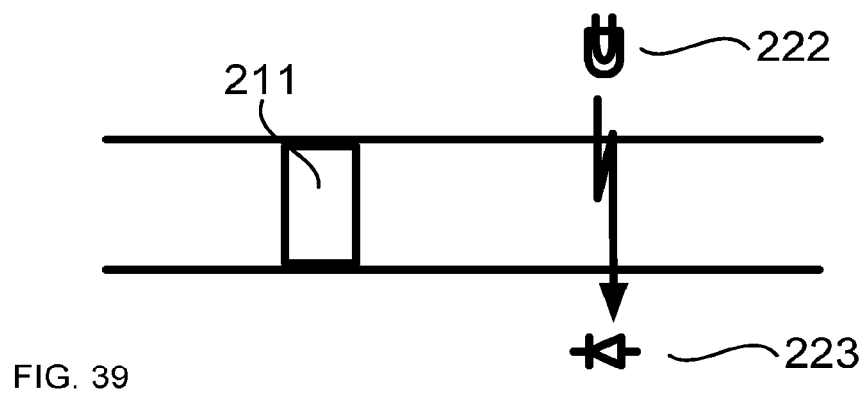
Figure 40:
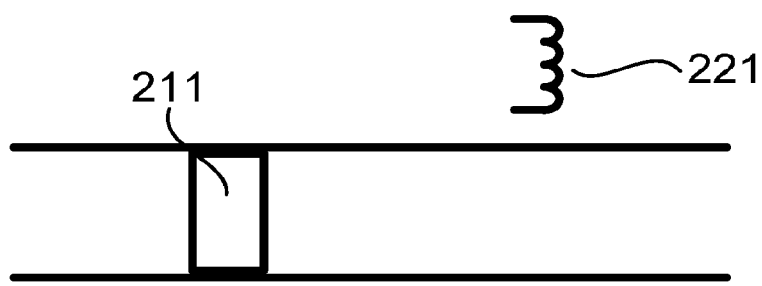

FIGS. 38 through 40 are diagrams of various exemplary sensor types that may be implemented for sensing the movement of a dynamic separating object (211) according to embodiments of the present invention. FIG. 38 shows a schematic view of a section of a channel in which the dynamic separating object is positioned, and a sensor (224). FIG. 39 shows an optical sensor comprising a light source (222) and a light sensor (223). As the dynamic separating object travels through the channel beyond a certain point it may block the light beam from the light source to be at least partially blocked. The light sensor, sensing the lack or decrease of light may send a signal to the controller which may trigger the operation of the pump. FIG. 40 shows a magnetic field based sensor comprising a coil (221) and a metallic/magnetic dynamic separating object. As the dynamic separating object travels through the channel beyond a certain point it may change one or more characteristics of the magnetic field sensed by the coil. The coil, sensing the change(s) in the magnetic field may send a signal to the controller which may trigger the operation of the pump.

In FIGS. 38-40 there are shown, in accordance with some embodiments of the present invention, exemplary sensors for detecting the movement of a dynamic separating element/object (211) of an exemplary fluid flow meter. FIG. 38 shows a general schematic view of an exemplary dynamic separating element/object (211) and a sensor (224). FIG. 39 shows an example of the sensor (224) shown in FIG. 38, wherein the sensor comprises a light source such as a LED (222) and a light sensor such as a photodiode (223). When the obstructing object moves in between the LED (222) and the photodiode (223), the light emitted from the LED (222) onto the photodiode (223) will be obstructed by the obstructing separating element/object (211) and therefore there may be degradation in the amount of light detected by the photodiode indicating that the obstructing separating element/object (211) is substantially near. FIG. 40 shows an example of the sensor (224) shown in FIG. 38, wherein the sensor comprises a coil (221) and the dynamic separating element/object (211) is made of metal, a magnet, or a ferromagnetic material. When the dynamic separating element/object (211) moves substantially close to the coil (221), a change in the magnetic field may be detected by the coil (221) indicating that the dynamic separating element/object (211) is substantially near.

Figure 42:
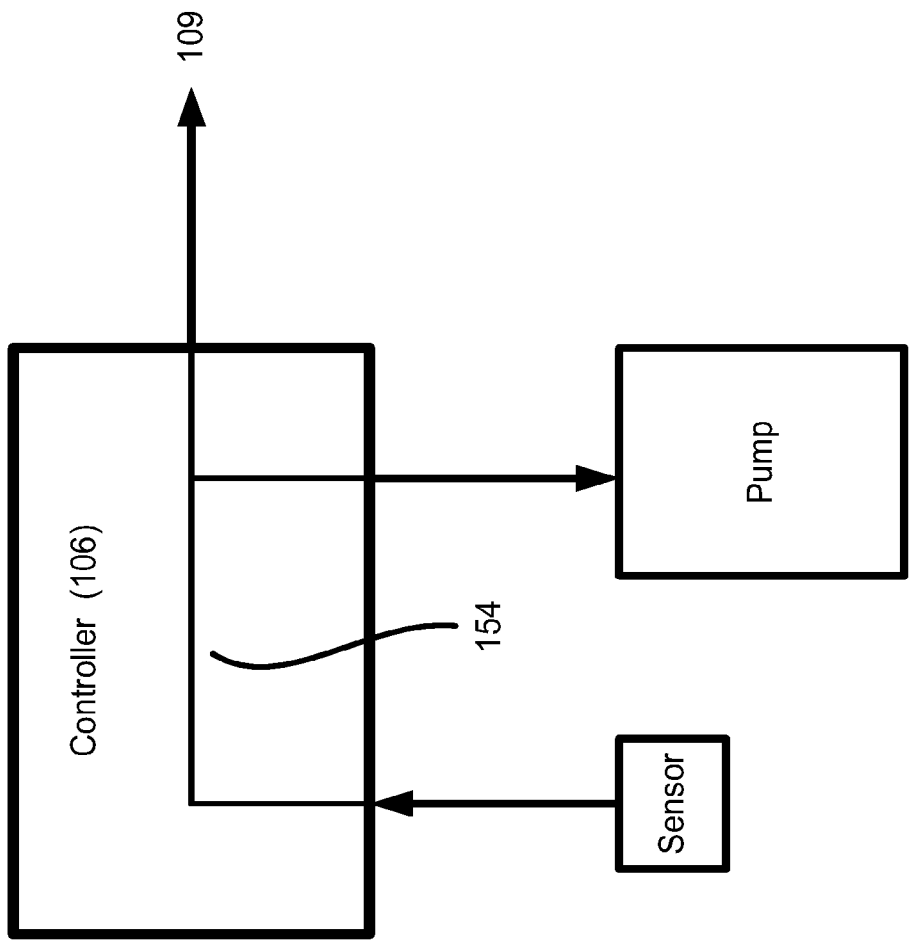
FIG. 42 is a functional block diagram of an exemplary control circuit in a substantially degenerated form, in accordance with some embodiments of the present invention.

FIG. 42 shows an exemplary control circuit in a substantially degenerated form, according to some embodiments. In this example the control circuit is composed of just an electrical wire (154). Upon the sensor determining that a fluid volume condition (e.g. fluid reaching a predefined level in a reservoir) has been met, it may send a signal to the control circuit (106) which may forward that signal to another device (109) and/or to a pump to command it to strike one or more stroke(s).

According to some embodiments of the present invention there is provided a fluid flow meter which may include an assembly including one or a set of cascaded building blocks, wherein each building block may either be a reservoir, a pump or a combined reservoir/pump. When a building block includes a reservoir (i.e. reservoir or combined reservoir/pump), it may optionally include a sensor which may sense and generate a signal indicative of a fluid level/pressure threshold, and/or actual fluid volume, and/or actual fluid pressure, and may optionally include a biasing element (e.g. piston and spring, stretching diaphragm) which may provide suction (negative) or pressure (positive) on fluid within the reservoir, and may optionally have a unidirectional or controllable inlet valve, and may optionally have a unidirectional or controllable outlet valve.

The assembly may include at least one sensor, at least one pump and at least one reservoir, or at least one combined pump/reservoir. The pump may be a positive displacement pump which may have one or several stroke types (e.g. volumes) of known dimensions which may be struck in a cycle or individually by the controller so as to facilitate a fluid measuring functionality. A control circuit may receive sensor signals, control the at least one pump, and output a signal indicative of pump strokes and/or fluid flow (volume and/or rate).

According to some embodiments of the present invention, a 'pumping condition' may refer to any condition of fluid contained in a reservoir, a pump/pump-chamber, combined pump/reservoir, a channel and/or any other fluid flow meter component and/or element. Such a 'pumping condition' may relate to any characteristic(s) of the contained fluid, such as, but in no way limited to, those relating to the fluid's amount, level, pressure, volume, temperature, viscosity, density, conductivity, transparency, acidity, color, weight and/or any other fluid characteristic.

According to some embodiments of the present invention, a fluid flow meter for metering fluid may comprise: a fluid pump to displace metered fluid with pumping strokes of one or more pumping stroke types, wherein each of the one or more stroke types may displace a known volume of fluid; a sensor functionally associated with a fluid reservoir and adapted to generate a signal indicative of a metered fluid pumping condition within the fluid reservoir, which fluid reservoir may be integral or functionally associated with the pump; and circuitry to trigger one or a sequence of strokes of the pump in response to a signal from the sensor.

According to some embodiments of the present invention, the fluid flow meter's pumping condition may be selected from the group of conditions consisting of: (a) a fluid level in said reservoir reaching or exceeding an upper threshold level, and (b) a fluid level in said reservoir dropping to or below a lower threshold level.

According to some embodiments of the present invention, the fluid flow meter's pump may be selected from the group consisting of: (a) positive displacement pump, (b) rotary peristaltic pump, (c) linear peristaltic pump, (d) syringe pump, (e) plunger pump, (f) piston pump, (g) diaphragm or membrane pump, (h) internal gear pump, (i) screw pump, (j) shuttle block pump, (k) rotary vane pump, (l) circumferential piston pump, (m) helical twisted roots pump, (n) scroll pump, (o) liquid ring pump, (p) rope pump, (q) chain pump, (r) lobe pump, (s) progressive cavity pump, and (t) gear pump.

According to some embodiments of the present invention, the fluid flow meter's reservoir may be upstream from said pump.

According to some embodiments of the present invention, the fluid flow meter's pumping condition may be characterized by a fluid level in the reservoir reaching or exceeding an upper threshold level.

According to some embodiments of the present invention, the fluid flow meter's sensor may be of a type selected from the group consisting of: (a) a pressure sensor, (b) a level sensor, (c) a switch type sensor which closes an electrical circuit, (d) a switch type sensor which opens an electrical circuit, (e) an electro-optical sensor, (f) a strain gauge sensor, (g) a variable resistor sensor, (h) a variable capacitor sensor, (i) a variable inductor sensor, (j) an ultrasonic sensor, (k) an electromagnetic sensor.

According to some embodiments of the present invention, the fluid flow meter's switch type sensors may be functionally associated with either a float or a piston residing in the reservoir.

According to some embodiments of the present invention, the fluid flow meter's reservoir may be downstream from said pump.

According to some embodiments of the present invention, the fluid flow meter's pumping condition may be characterized by a fluid level in the reservoir dropping to or below a lower threshold level.

According to some embodiments of the present invention, the fluid flow meter's sensor may be of a type selected from the group consisting of: (a) a pressure sensor, (b) a level sensor, (c) a switch type sensor which closes an electrical circuit, (d) a switch type sensor which opens an electrical circuit, (e) an electro-optical sensor, (f) a strain gauge sensor, (g) a variable resistor sensor, (h) a variable capacitor sensor, (i) a variable inductor sensor, (j) an ultrasonic sensor, (k) an electromagnetic sensor.

According to some embodiments of the present invention, the fluid flow meter's switch type sensors may be functionally associated with either a float or a piston residing in the reservoir.

According to some embodiments of the present invention, the fluid flow meter's reservoir may be a chamber of the pump.

According to some embodiments of the present invention, the fluid flow meter's pump may be comprised of an electro-mechanical actuator in contact with a piston.

According to some embodiments of the present invention, the fluid flow meter's sensor may generate a signal responsive to a position of the piston.

According to some embodiments of the present invention, the fluid flow meter's pump may be comprised of an electromechanical actuator in contact with a flexible pump chamber.

According to some embodiments of the present invention, the fluid flow meter's sensor may be functionally associated with the actuator.

According to some embodiments of the present invention, the fluid flow meter's reservoir may have a variable volume.

According to some embodiments of the present invention, the fluid flow meter's reservoir may include a biasing structure providing either positive or negative pressure on fluid within said reservoir, wherein said biasing structure is selected from the group consisting of: (a) diaphragm, (b) piston, (c) flexible/elastic/resilient wall, (d) elastic tube.

According to some embodiments of the present invention, the fluid flow meter's pump outlet may exit into a regulated pressure chamber.

According to some embodiments of the present invention, the fluid flow meter's pump inlet may be fed from a regulated pressure chamber.

According to some embodiments of the present invention, the fluid flow meter's pump may include an actuator selected from the group consisting of: (a) solenoid actuator, (b) stepper motor, (c) DC motor, (d) brush motor, (e) brushless motor, (f) AC motor, (g) hydraulic actuator, (h) pneumatic actuator, (i) piezoelectric actuator.

According to some embodiments of the present invention, the fluid flow meter's circuitry may be adapted to provide a signal indicative of strokes of each of the one or more pumping stroke types.

According to some embodiments of the present invention, the fluid flow meter may further include a second sensor adapted to sense a physical parameter of the metered fluid, wherein the circuitry is adapted to factor an output of the second sensor in providing a fluid flow estimate based on a detected number of strokes of each of the one or more pumping stroke types.

According to some embodiments of the present invention, the fluid flow meter's second sensor may be adapted to sense a physical parameter selected from the group consisting of: (a) temperature, (b) pressure, (c) viscosity, and (d) density.

The present invention describes the principles for constructing a fluid flow meter. The construction of the meter may depend upon the application and the nature of the flow and its characteristics. The present invention can be implemented in one of many possible ways in order to fit a particular application. Based on the above teachings, some of the different embodiments will be described. The present invention may be realized as a combination of one embodiment from each of the following Groups A and D, combined together with at least one embodiment from each of the following groups C, E, F, H, J, and combined together with none or any of the embodiments from each of the following groups B, G, I, K, L, M, N, O, P, Q, R, S, T, U. A combination of embodiments from groups A to U, together with or without other embodiments, may be a valid implementation of a flow meter according to some aspects of the present invention. Some of the embodiments mentioned in groups A to U, may have been explained in more detail along the specification of the present invention. The combination of embodiments from groups A to U may cover many, but not all possible implementations of the flow meter of the present invention.

A. 1. According to some embodiments of the present invention, there is provided a fluid flow meter for measuring fluid (liquid or gas) flow, which may comprise at least one reservoir, at least one sensor, at least one pump, and control circuit.

B. 1. According to some embodiments of the present invention, at least two pumps may be connected in parallel in a way that the inlet of the pumps are attached to a first common inlet conduit, and the outlet of the pumps are attached to a second common outlet conduit. The at least two parallel pumps may simply be referred to as a 'pump'
   2. According to some embodiments of the present invention, at least one pump may have at least two chambers which may be operated independent of each other.

C. 1. According to some embodiments of the present invention, at least one reservoir may have an inlet port and an outlet port.
   2. According to some embodiments of the present invention, at least one reservoir may have a common inlet/outlet port.
   3. According to some embodiments of the present invention, at least one reservoir may have multiple inlet and/or outlet ports.

D. 1. According to some embodiments of the present invention, the pump may be on the upstream end of the flow and may be connected to a reservoir on the downstream end of the flow. According to these embodiments, the pump's outlet may be in fluid contact with the reservoir's inlet or inlet/outlet.
   2. According to some embodiments of the present invention, the reservoir may be on the upstream end of the flow and may be connected to a pump on the downstream end of the flow. According to these embodiments, the reservoir's outlet or inlet/outlet may be in fluid contact with the pump's inlet.
   3. According to some embodiments of the present invention, a cascade of pumps and reservoirs may be connected to each other. According to these embodiments, the inlet or inlet/outlet of one element (reservoir or pump) may be connected to the outlet or inlet/outlet of the previous (upstream) element in the cascade.
   4. According to some embodiments of the present invention, the reservoir may be integrated within the pump (combined pump/reservoir, may also be simply referred to as pump).

E. 1. According to some embodiments of the present invention, there may be at least one sensor which may be adapted to estimate when at least one pump fills to, or beyond a certain level.
   2. According to some embodiments of the present invention, there may be at least one sensor which may be adapted to estimate when at least one pump empties to, or below a certain level.
   3. According to some embodiments of the present invention, there may be at least one sensor which may be adapted to estimate the amount of fluid in at least one pump.
   4. According to some embodiments of the present invention, there may be at least one sensor which may be adapted to estimate when at least one reservoir fills to, or beyond a certain level.
   5. According to some embodiments of the present invention, there may be at least one sensor which may be adapted to estimate when at least one reservoir empties to, or below a certain level.
   6. According to some embodiments of the present invention, there may be at least one sensor which may be adapted to estimate the amount of fluid in at least one reservoir.

F. 1. According to some embodiments of the present invention, at least one reservoir may be positively biased (i.e. introduce pressure resistance to the fluid flowing into it, such as when the fluid pressure stretches a diaphragm in a diaphragm reservoir (e.g. FIG. 8)).
   2. According to some embodiments of the present invention, at least one reservoir may be negatively biased (i.e. suck the fluid into it, such as when the diaphragm in a diaphragm reservoir is stretched down, and relaxes up as fluid flows into the reservoir (e g. FIG. 9)).
   3. According to some embodiments of the present invention, at least one reservoir may be passive and introduce no pressure or suction forces to fluid flowing into it.
   4. According to some embodiments of the present invention, at least one pump may be positively biased (i.e. introduce pressure resistance to the fluid flowing into it, such as when the fluid pressure stretches a diaphragm in a diaphragm pump when the actuator is inactive (e.g. FIG. 10)).
   5. According to some embodiments of the present invention, at least one pump may be negatively biased (i.e. suck the fluid into it, such as when the diaphragm in a diaphragm pump is stretched down by the actuator, and relaxes up as fluid flows into the pump (e.g. FIG. 11)).
   6. According to some embodiments of the present invention, at least one pump may be passive and introduce no pressure or suction forces to fluid flowing into it.

G. 1. According to some embodiments of the present invention, at least one pump may be in substantial proximity to at least one reservoir.

2. According to some embodiments of the present invention, at least one pump may be distant from at least one reservoir.
3. According to some embodiments of the present invention, at least one pump may be integral with at least one reservoir.
H. 1. According to some embodiments of the present invention, at least one sensor may estimate the fluid volume in at least one reservoir.
2. According to some embodiments of the present invention, at least one sensor may estimate the pressure in at least one reservoir.
3. According to some embodiments of the present invention, at least one sensor may estimate the fluid volume in at least one pump.
4. According to some embodiments of the present invention, at least one sensor may estimate the pressure in at least one pump.
I. 1. According to some embodiments of the present invention, at least one sensor may include a float.
2. According to some embodiments of the present invention, at least one sensor may be an optical sensor.
3. According to some embodiments of the present invention, at least one sensor may be a capacitive sensor.
4. According to some embodiments of the present invention, at least one sensor may be a resistive sensor.
5. According to some embodiments of the present invention, at least one sensor may be an inductive sensor.
6. According to some embodiments of the present invention, at least one sensor may open/close an electrical circuit.
7. According to some embodiments of the present invention, at least one sensor may be an ultrasonic sensor
8. According to some embodiments of the present invention, at least one sensor may include a strain-gage
9. According to some embodiments of the present invention, at least one sensor may include a spring.
10. According to some embodiments of the present invention, at least one sensor may be a pressure sensor.
J. According to some embodiments of the present invention, at least one pump may be a positive displacement pump.
K. 1. According to some embodiments of the present invention, at least one positive displacement pump may be a rotary peristaltic pump.
2. According to some embodiments of the present invention, at least one positive displacement pump may be a linear peristaltic pump.
3. According to some embodiments of the present invention, at least one positive displacement pump may be a reciprocating pump.
4. According to some embodiments of the present invention, at least one positive displacement pump may be a syringe pump.
5. According to some embodiments of the present invention, at least one positive displacement pump may be a piston pump.
6. According to some embodiments of the present invention, at least one positive displacement pump may be a diaphragm pump.
L. According to some embodiments of the present invention, at least a second pump may be of any type (i.e. positive displacement or not).
M. 1. According to some embodiments of the present invention, at least one pump may have an inlet valve.
2. According to some embodiments of the present invention, at least one pump may have an outlet valve.
3. According to some embodiments of the present invention, at least one reservoir may have an inlet valve
4. According to some embodiments of the present invention, at least one reservoir may have an outlet valve.
5. According to some embodiments of the present invention, at least one reservoir may have no valves.
6. According to some embodiments of the present invention, at least one pump may have no valves (e.g. peristaltic pump)
N. 1. According to some embodiments of the present invention, at least one valve may open by the fluid force.
2. According to some embodiments of the present invention, at least one valve may close by the fluid force.
3. According to some embodiments of the present invention, at least one valve may open by a mechanical force (e.g. spring).
4. According to some embodiments of the present invention, at least one valve may close by a mechanical force (e.g. spring).
5. According to some embodiments of the present invention, at least one valve may be electrically operated
6. According to some embodiments of the present invention, at least one valve may be hydraulically operated.
7. According to some embodiments of the present invention, at least one valve may be pneumatically operated.
8. According to some embodiments of the present invention, at least one valve may be mechanically operated.
9. According to some embodiments of the present invention, at least one valve may be unidirectional.
O. 1. According to some embodiments of the present invention, at least one pump may be operated electrically.
2. According to some embodiments of the present invention, at least one pump may be operated hydraulically.
3. According to some embodiments of the present invention, at least one pump may be operated pneumatically.
4. According to some embodiments of the present invention, at least one pump may be operated by a motor.
5. According to some embodiments of the present invention, at least one pump may be operated by a stepper motor.
6. According to some embodiments of the present invention, at least one pump may be operated by a solenoid.
P. 1. According to some embodiments of the present invention, at least one reservoir may be a bucket
2. According to some embodiments of the present invention, at least one reservoir may include a chamber and a diaphragm.
3. According to some embodiments of the present invention, at least one reservoir may include a chamber and a piston.
4. According to some embodiments of the present invention, at least one reservoir's chamber may be constructed from a flexible or elastic material.
5. According to some embodiments of the present invention, at least one reservoir's chamber may be constructed from a rigid material.
6. According to some embodiments of the present invention, part of at least one reservoir's chamber may be constructed from a rigid material and part may be constructed from a flexible or elastic material.
7. According to some embodiments of the present invention, the inside of at least one reservoir's chamber may be open to, or in fluid contact with the atmospheric surrounding.
8. According to some embodiments of the present invention, the inside of at least one reservoir's chamber may be isolated from the atmospheric surrounding.

Q. 1. According to some embodiments of the present invention, the control circuit may receive a signal from at least one sensor indicating a pressure and/or fluid volume.
  2. According to some embodiments of the present invention, the control circuit may control the operation of at least one pump.
  3. According to some embodiments of the present invention, the control circuit may control the operation of at least one valve.
  4. According to some embodiments of the present invention, the control circuit may estimate fluid flow amount.
  5. According to some embodiments of the present invention, the control circuit may estimate fluid flow rate.
  6. According to some embodiments of the present invention, the control circuit may use calibration parameters for adjusting flow volume and/or rate estimation.
  7. According to some embodiments of the present invention, the control circuit may use environmental parameters (e.g. temperature) for adjusting/compensating flow volume and/or rate estimation.
  8. According to some embodiments of the present invention, the control circuit may transmit a signal indicative of the flow amount and/or rate to another device.
  9. According to some embodiments of the present invention, the control circuit may transmit a signal indicating that a pump stroke/cycle has occurred.
R. 1. According to some embodiments of the present invention, at least one pump chamber volume may be adjusted to be substantially near a predefined volume (e.g. by turning a screw).
  2. According to some embodiments of the present invention, at least one pump may be calibrated (e.g. by adjusting a potentiometer)
  3. According to some embodiments of the present invention, at least one pump chamber volume may be estimated, and a calibration parameter reflecting the estimated volume may be extracted and stored.
  4. According to some embodiments of the present invention, the calibration parameter may be stored in a nonvolatile memory.
  5. According to some embodiments of the present invention, the nonvolatile memory may be in the control circuit or functionally associated with the control circuit, or elsewhere.
S. 1. According to some embodiments of the present invention, at least one sensor may be calibrated.
  2. According to some embodiments of the present invention, at least one sensor may be calibrated mechanically (e.g. by turning a screw).
  3. According to some embodiments of the present invention, at least one sensor may be calibrated electrically (e.g. by adjusting a potentiometer).
  4. According to some embodiments of the present invention, at least one sensor parameter may be extracted and stored.
  5. According to some embodiments of the present invention, at least one sensor parameter may be stored in a nonvolatile memory.
  6. According to some embodiments of the present invention, the nonvolatile memory may be in the control circuit or functionally associated with the control circuit, or elsewhere.
T. 1. According to some embodiments of the present invention, a chamber volume of a reservoir directly attached to a pump may be larger than the pump chamber volume.
  2. According to some embodiments of the present invention, a chamber volume of a reservoir directly attached to a pump may be smaller than the pump chamber volume.
  3. According to some embodiments of the present invention, a chamber volume of a reservoir directly attached to a pump may be substantially similar to the pump chamber volume.
U. 1. According to some embodiments of the present invention, the pressure in at least one reservoir may be regulated by controlling the pumping fluid into the reservoir.
  2. According to some embodiments of the present invention, the pressure in at least one reservoir may be regulated by controlling the pumping fluid out of the reservoir.
  3. According to some embodiments of the present invention, the pressure in at least one reservoir may be regulated by controlling a valve to let fluid flow into the reservoir.
  4. According to some embodiments of the present invention, the pressure in at least one reservoir may be regulated by controlling a valve to let fluid flow out of the reservoir.

Implementations of the invention may be used for different applications that can vary from very low flows in the range of ml/hour to very high flow rates of cubic meters/second. High flow rate can be found for example in rivers, sewage tunnels and water channels. Very low flow rates can be found for instance in different industrial applications such as in the semiconductor industry where very precise doses of chemicals are required. In some applications fluid may flow due to pressure in the source side, and in other cases the fluid sink creates a suction force that drives the fluid flow. In some cases the flow rate is determined by the source side, and in other cases the flow rate is determined by the sink side. The force driving the fluid may determine the flow rate, or the flow rate may, in some cases, be determined by other parts of the system.

A few exemplary applications of a flow meter, in accordance with some embodiments of the present invention, will now be discussed.

1. Hot water boiler with a pressure valve—When water is heated in a hot water boiler, the pressure in the boiler increases due to the expansion of the water. When the pressure in the boiler tank reaches the preset relief pressure of the pressure valve, the valve will open and let out a small amount of water until the pressure in the boiler tank equals to the valve preset relief pressure. As long as the boiler is being heated, the water will expand and small amounts of water will escape through the pressure valve. In certain applications there may be a need to measure the amount or flow rate of the water flowing out through the pressure valve. In this application the outlet of the pressure valve may be attached to the inlet of the flow meter, the fluid pressure source is at the inlet of the flow meter and the water flow rate is determined by the amount of water escaping through the pressure valve.

2. Internal combustion engine—An internal combustion engine sucks fuel during the induction (intake) phase, the consumed amount of fuel may need to be measured. In this application the fuel inlet of the engine may be attached to the outlet of the flow meter, the fluid pressure source is the suction force applied by the engine and the fuel flow rate is determined by the engine's fuel consumption rate.

3. Residential water plumbing—In a residential water plumbing system the flow meter may by attached at the entrance of the piping to the home, the municipal side of the plumbing may be connected to the inlet of the flow meter, and the home plumbing may be connected to the outlet of the flow meter. The water pressure may be determined by the municipal water pressure regulation and the water flow rate may be determined by the amount of opening of a faucet at the home and/or by the amount of leaks at the home plumbing.

4. Gas appliance (e.g. oven, stove, drier)—In these applications the flow meter may be connected at its inlet to the gas source (e.g. gas tank) and at its outlet to the appliance. The gas pressure may be determined by pressure in the gas tank and the gas flow rate may be determined by the gas consumption of the appliance.

It should be understood that various features and all of the objectives described in the specification are exemplary, many of which may be altered and some may be completely removed without detracting from the breadth of the present invention.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A fluid flow meter for metering fluid, said meter comprising:
    a connection to an outlet of a fluid reservoir having the outlet and an inlet adapted to connect to a fluid source, which fluid reservoir has at least one flexible component adapted to stretch or contract to increase or decrease a volume of the reservoir, in response to an amount of fluid within said reservoir, such that different states of said flexible component are characterized by different volumes of said reservoir;
    a fluid pump connected to said outlet and adapted to displace metered amounts of fluid, from the reservoir, through said outlet, while said inlet remains connected to the fluid source, wherein each pumping stroke of the pump displaces a known amount of fluid;
    a sensor functionally associated with said fluid reservoir and including: (1) a physical sensor adapted to sense a pressure of fluid within said reservoir, and (2) electronic circuitry adapted to generate a signal when the sensed pressure indicates a pumping condition relating to the fluid within the fluid reservoir has been met; and
    a controller, comprising: (1) communication circuitry communicatively coupled to said sensor and said pump; and (2) control circuitry configured to trigger a pre-defined cycle of one or more strokes of said pump in response to the signal from said sensor, wherein the pre-defined cycle of strokes displaces a known volume of fluid;
    a data storage to store a count of cycles of said pump triggered by said controller;
    processing circuitry configured to calculate a flow into said reservoir, through said inlet, from the fluid source, based on the stored count of cycles of said pump; and second electronic circuitry adapted to generate an electronic signal indicating the calculated flow.

2. A method of metering fluid flow from a fluid source, said method comprising:
    receiving at an inlet of a fluid reservoir fluid from the fluid source and altering a shape of a flexible reservoir component in response to an amount of fluid received within said reservoir, such that different states of said flexible component are characterized by different volumes of said reservoir,
    sensing a pumping condition in the reservoir through a physical sensor adapted to sense a parameter of fluid within the reservoir;
    generating a signal when the sensed parameter indicates a pumping condition relating to the fluid within the fluid reservoir has been met;
    triggering a pre-defined cycle of one or more strokes of a pump in response to the generated signal, wherein each pre-defined cycle of strokes displaces a known amount of fluid;
    each time the pre-defined cycle is triggered, displacing a known amount of fluid from the reservoir through an output of the reservoir while the inlet remains connected to the fluid source;
    storing a count of triggered pre-defined cycles; and
    calculating a fluid flow into the reservoir based on the stored count of triggered cycles and based on the known amount of fluid associated with each triggered cycle of strokes.

3. The method of claim 2, wherein the pumping condition is the fluid amount in said reservoir reaching or exceeding an upper threshold.

4. The method according to claim 3, wherein the sensor is of a type selected from the group consisting of: (a) a pressure sensor, (b) a level sensor, (c) a switch type sensor which closes an electrical circuit, (d) a switch type sensor which opens an electrical circuit, (e) an electro-optical sensor, (f) a strain gauge sensor, (g) a variable resistor sensor, (h) a variable capacitor sensor, (i) a variable inductor sensor, (j) an ultrasonic sensor, and (k) an electromagnetic sensor.

5. The method according to claim 2, wherein the pump is a peristaltic pump.

6. The method according to claim 2, wherein the pump is an electromechanical actuator in contact with a flexible pump chamber.

7. The method according to claim 2, further comprising biasing, with either positive or negative pressure, the fluid within the reservoir.

8. The method according to claim 7, wherein biasing is provided by an element selected from the group consisting of: (a) a diaphragm, (b) a piston, (c) a flexible/elastic/resilient wall, and (d) an elastic tube.

9. The method according to claim 2, further comprising regulating pressure at an outlet of the pump.

10. The method according to claim 2, further comprising regulating pressure at an inlet of the pump.

11. The method according to claim 2, wherein different known amounts of fluid are displaced by different stroke types and each type of triggered stroke types is stored.

12. The method according to claim 2, calculating the fluid flow further comprising, factoring (a) a fluid temperature, (b) fluid pressure, (c) fluid viscosity, and (d) fluid density.

13. A method of metering fluid flow comprising the steps of:
    connecting to an outlet of a fluid reservoir which has its inlet adapted to connect to a fluid source, which said fluid reservoir has at least one flexible component adapted to stretch or contract to increase or decrease a volume of the reservoir, in response to an amount of fluid within said fluid reservoir, such that different states of said flexible component are characterized by different amounts of fluid within said reservoir;
    connecting a fluid pump to said outlet and displacing metered amounts of fluid, from the reservoir, through said outlet, using two or more different types of pumping strokes, while said inlet remains connected to the fluid source, wherein each of the two or more different types of pumping strokes of the pump displaces a different known amount of fluid;

sensing a parameter of fluid in said fluid reservoir with a sensor including: (1) a physical sensor adapted to sense a parameter of fluid within said reservoir, and (2) electronic circuitry adapted to generate a signal when the sensed parameter indicates a pumping condition relating to the fluid within the fluid reservoir has been met;

controlling the fluid pump using a controller, comprising: (1) communication circuitry communicatively coupled to said sensor and said pump; and (2) control circuitry configured to trigger a pre-defined cycle of one or more strokes of said pump in response to the signal from said sensor, wherein the pre-defined cycle of strokes displaces a known volume of fluid;

storing the cycles and type of said pumping strokes triggered by said controller on a data storage;

calculating the fluid flow into said fluid reservoir using processing circuitry configured to calculate a flow into said reservoir, through said inlet, from the fluid source, based on the stored count and type of cycles of said pump;

generating an electronic signal indicating the calculated flow using second electronic circuitry.

* * * * *